(12) United States Patent
Sato

(10) Patent No.: US 10,560,670 B2
(45) Date of Patent: Feb. 11, 2020

(54) IMAGING APPARATUS AND IMAGING CONTROL METHOD

(71) Applicant: SONY SEMICONDUCTOR SOLUTIONS CORPORATION, Kanagawa (JP)

(72) Inventor: Yasushi Sato, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/768,977

(22) PCT Filed: Nov. 21, 2016

(86) PCT No.: PCT/JP2016/084384
§ 371 (c)(1),
(2) Date: Apr. 17, 2018

(87) PCT Pub. No.: WO2017/098897
PCT Pub. Date: Jun. 15, 2017

(65) Prior Publication Data
US 2019/0068929 A1 Feb. 28, 2019

(30) Foreign Application Priority Data

Dec. 7, 2015 (JP) .................................. 2015-238647

(51) Int. Cl.
*H04N 9/04* (2006.01)
*H04N 5/235* (2006.01)

(52) U.S. Cl.
CPC ......... *H04N 9/0451* (2018.08); *H04N 5/2352* (2013.01)

(58) Field of Classification Search
CPC .......................... H04N 9/0451; H04N 5/2352
See application file for complete search history.

(56) References Cited

U.S. PATENT DOCUMENTS

| 7,948,551 B2 | 5/2011 | Hasegawa |
| 2007/0201738 A1* | 8/2007 | Toda ............... H04N 9/045 382/144 |

(Continued)

FOREIGN PATENT DOCUMENTS

| CN | 101385358 A | 3/2009 |
| EP | 1986442 A1 | 10/2008 |

(Continued)

OTHER PUBLICATIONS

International Search Report and Written Opinion of PCT Application No. PCT/JP2016/084384, dated Feb. 7, 2017, 8 pages.

*Primary Examiner* — Thai Q Tran
*Assistant Examiner* — Girumsew Wendmagegn
(74) *Attorney, Agent, or Firm* — Chip Law Group

(57) ABSTRACT

The present technology relates to an imaging apparatus, an imaging control method, and a program capable of obtaining a color image using infrared light without decreasing the frame rate. The imaging apparatus includes an imaging element including a first pixel and a second pixel, and a control unit that controls an exposure period of the imaging element and an emission period of the infrared light from the infrared light emission unit. The control unit controls to provide an exposure period of the first pixel and the second pixel in each of frame periods and provide a single exposure period being a period in which the first pixel alone is exposed, and controls so as to emit the infrared light within the single exposure period. The present technology is applicable to a surveillance camera, for example.

17 Claims, 37 Drawing Sheets

(56) References Cited

U.S. PATENT DOCUMENTS

2013/0002882 A1* 1/2013 Onozawa ............. H04N 5/2353
  348/164
2016/0198103 A1 7/2016 Tanaka et al.

FOREIGN PATENT DOCUMENTS

| JP | 2007-215088 A | 8/2007 |
| JP | 2008-005213 A | 1/2008 |
| JP | 2011-055176 A | 3/2011 |
| JP | 2011-233983 A | 11/2011 |
| JP | 2015-222916 A | 12/2015 |
| WO | 2007/094438 A1 | 8/2007 |
| WO | 2015/178012 A1 | 11/2015 |

* cited by examiner

FIG. 4

| W | G | W | G |
|---|---|---|---|
| B | W | R | W |
| W | G | W | G |
| R | W | B | W |

| Gr | R |
|----|----|
| B | Gb |

IMAGING APPARATUS AND IMAGING CONTROL METHOD

CROSS REFERENCE TO RELATED APPLICATIONS

This application is a U.S. National Phase of International Patent Application No. PCT/JP2016/084384 filed on Nov. 21, 2016, which claims priority benefit of Japanese Patent Application No. JP 2015-238647 filed in the Japan Patent Office on Dec. 7, 2015. Each of the above-referenced applications is hereby incorporated herein by reference in its entirety.

TECHNICAL FIELD

The present technology relates to an imaging apparatus, an imaging control method, and a program, and particularly relates to an imaging apparatus, an imaging control method, and a program suitable for imaging with infrared light.

BACKGROUND ART

Conventionally, there is a certain surveillance camera having two types of modes, a day mode of imaging under illumination of visible light such as natural light in daytime or white light, and a night mode of imaging with emission of the infrared light. With such a surveillance camera, a color image is obtained in the day mode. In contrast, reflected infrared light reflected by a subject is received in the night mode, in which solely the light reception intensity of the reflected light (infrared light) can be obtained and color information such as R, B, and G cannot be obtained. Accordingly, the obtained image is a monochrome image of gray, green, or the like.

In consideration of the use of the surveillance camera, it is desirable that a color image can be obtained also in the night mode. Conventionally, methods have been proposed for generating a color image on the basis of an image obtained by imaging a state in which infrared light is emitted toward an imaging range (subject) (hereinafter referred to as an infrared image).

For example, Patent Document 1 discloses a technique of alternately capturing an infrared image in a state where the infrared light is emitted and a visible image under low illuminance with no emission of the infrared light frame-by-frame so as to generate a color image using the captured images.

CITATION LIST

Patent Document

Patent Document 1: Japanese Patent Application Laid-Open No. 2011-233983

SUMMARY OF THE INVENTION

Problems to be Solved by the Invention

In the invention described in Patent Document 1, however, a color image is generated from images of two frames of the infrared image and the visible image, decreasing the frame rate to ½.

The present technology has been made in view of such a situation and aims to be able to obtain a color image by using infrared light without decreasing the frame rate.

Solutions to Problems

An imaging apparatus according to an aspect of the present technology includes: an imaging element including a first pixel and a second pixel; and a control unit that controls an exposure period of the imaging element and an emission period of infrared light from an infrared light emission unit, in which the control unit controls to provide an exposure period of the first pixel and the second pixel in each of frame periods, provide a single exposure period in which the first pixel alone is exposed, and emit the infrared light within the single exposure period.

It is allowable to further include an image processing unit that generates luminance information mainly on the basis of a first pixel signal from the first pixel and generates color information mainly on the basis of a second pixel signal from the second pixel.

The image processing unit may generate high frequency luminance information mainly on the basis of the first pixel signal and may generate color information and low frequency luminance information mainly on the basis of the second pixel signal.

The first pixel may include a white pixel and the second pixel may include a color pixel used for detecting a predetermined color.

The first pixel may include an IR pixel used for detecting infrared light and the second pixel may include a color pixel used for detecting a predetermined color.

The first pixel may include a first G pixel used for detecting a green color and the second pixel may include an R pixel used for detecting a red color, a second G pixel, and a B pixel used for detecting a blue color.

The exposure period of the first pixel can be set to be longer than the exposure period of the second pixel.

The control unit can be configured to control the exposure period of the imaging element and the emission period of the infrared light from the infrared light emission unit on the basis of surrounding brightness and ambient infrared light intensity being an intensity of the infrared light contained in the ambient light.

The control unit can be configured to control, in a first state where the surrounding brightness is a first threshold or more and below a second threshold and the ambient infrared light intensity is below a third threshold, so as to provide an exposure period of the first pixel and the second pixel for each of frame periods, provide a single exposure period in which the first pixel alone is exposed, and emit infrared light within the single exposure period.

The control unit can be configured to control to suppress emission of the infrared light in a second state in which the surrounding brightness is the second threshold or above.

It is allowable to further include a filter insertable and removable at a portion between a lens and the imaging element and configured to attenuate an infrared light component, in which the first pixel may include a first G pixel used for detecting a green color, and the second pixel may include an R pixel used for detecting a red color, a second G pixel, and a B pixel used for detecting a blue color, and the control unit can be configured to insert the filter between the lens and the imaging element in the second state and can be configured to remove the filter from between the lens and the imaging element in a state different from the second state.

The control unit can set the exposure period of the first pixel to be shorter than the exposure period of the second pixel in the second state.

The control unit can be configured to control to continuously emit the infrared light in a third state being one of a state in which the surrounding brightness is below the first threshold or a state in which the surrounding brightness is the first threshold or above and below the second threshold and the ambient infrared light intensity is the third threshold or above.

It is allowable to further include an image processing unit that generates a monochrome image, in the third state, on the basis of the first pixel signal from the first pixel and the second pixel signal from the second pixel, and that generates a color image, in a state different the third state, on the basis of the first pixel signal and the second pixel signal.

The control unit can match the exposure periods of the first pixel and the second pixel with each other in the third state.

An imaging control method according to an aspect of the present technology includes: an exposure control step of controlling to provide an exposure period of a first pixel and a second pixel of an imaging element in each of frame periods and provide a single exposure period being a period in which the first pixel alone is exposed; and an emission control step of controlling an infrared light emission unit so as to emit infrared light within the single exposure period.

A program according to an aspect of the present technology causes a computer to execute processing including: an exposure control step of controlling to provide an exposure period of a first pixel and a second pixel of an imaging element in each of frame periods and provide a single exposure period being a period in which the first pixel alone is exposed; and an emission control step of controlling an infrared light emission unit so as to emit infrared light within the single exposure period.

According to an aspect of the present technology, provided is an exposure period of a first pixel and a second pixel of an imaging element in each of frame periods and provided is a single exposure period being a period in which the first pixel alone is exposed, and infrared light is emitted within the single exposure period.

Effects of the Invention

According to one aspect of the present technology, it is possible to obtain a color image using infrared light without decreasing the frame rate.

Note that effects described herein are non-limiting. The effects may be any effects described in the present disclosure.

BRIEF DESCRIPTION OF DRAWINGS

FIG. 4 is a diagram illustrating an example of pixel arrangement according to the first embodiment.

FIG. 9 is a diagram illustrating an example of a color signal after infrared ray separation according to the first embodiment.

FIG. 26 is a diagram illustrating an example of pixel arrangement according to the second embodiment.

MODE FOR CARRYING OUT THE INVENTION

Hereinafter, embodiments of the present technology (hereinafter, embodiment(s)) will be described. The description will be given in the following order.

1. First embodiment (example using RGBW array pixels)
2. Second embodiment (example using Bayer array pixels)
3. Modification
4. Application example

1. First Embodiment

First, a first embodiment of the present technology will be described with reference to FIGS. 1 to 24.

{Configuration of Imaging Apparatus 100}

Figure 1:
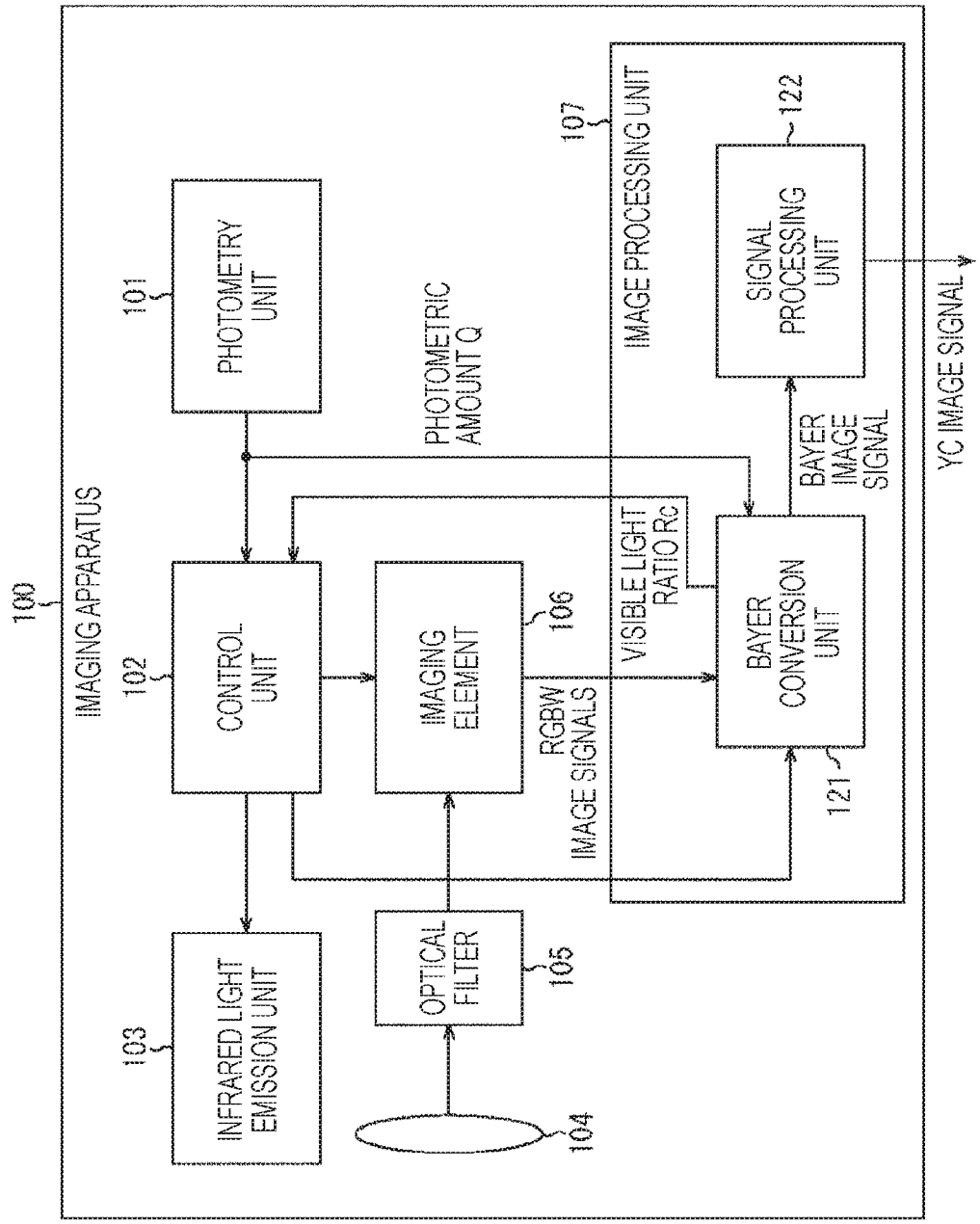
FIG. 1 is a block diagram illustrating an exemplary configuration of an imaging apparatus according to a first embodiment.

FIG. 1 is a block diagram illustrating an exemplary configuration of an imaging apparatus 100 according to the first embodiment of the present technology. The imaging apparatus 100 includes a photometry unit 101, a control unit 102, an infrared light emission unit 103, an imaging lens 104, an optical filter 105, an imaging element 106, and an image processing unit 107. Moreover, the image processing unit 107 includes a Bayer conversion unit 121 and a signal processing unit 122.

The photometry unit 101 measures the brightness around the imaging apparatus 100 and supplies a photometric amount Q indicating a measurement result to the control unit 102 and the Bayer conversion unit 121.

The control unit 102 controls the entire imaging apparatus 100. For example, the control unit 102 obtains a visible light ratio Rc indicating a ratio of a visible light component in an image signal from the Bayer conversion unit 121. Then, the control unit 102 sets an imaging mode of the imaging apparatus 100 on the basis of the photometric amount Q and the visible light ratio Rc. The control unit 102 supplies a mode signal indicating the set imaging mode to the Bayer conversion unit 121.

The imaging mode is divided into three modes, namely, a day mode, a CNV mode, and a night mode, for example. The day mode is a mode used in a case where imaging is performed in a state where the surroundings of the imaging apparatus 100 are bright, for example. The CNV mode is a mode used in a case where imaging is performed in a state where the surroundings of the imaging apparatus 100 are dark and the intensity of infrared light (hereinafter referred to as ambient infrared light) contained in ambient light is low, for example. The night mode is a mode used in a case where imaging is performed in a state where the surroundings of the imaging apparatus 100 are very dark, or in a state where the surroundings of the imaging apparatus 100 are dark and the intensity of the ambient infrared light is high, for example. The day mode and the CNV mode produce a color image, while the night mode produces a monochrome image.

Note that the details of individual imaging modes will be described below.

Moreover, the control unit 102 controls the imaging element 106 in accordance with user's operation or the like to generate an image signal, for example. The control unit 102 generates a vertical synchronization signal VSYNC indicating ab imaging timing and supplies it to the imaging element 106, for example. Moreover, the control unit 102 controls on/off of a pixel-by-pixel shutter of the imaging element 106 in accordance with the imaging mode. The pixel-by-pixel shutter is a function of controlling the exposure periods for individual pixels as described below.

Furthermore, the control unit 102 controls the emission period of the infrared light emission unit 103 in accordance with the imaging mode, for example.

Moreover, the control unit 102 controls on/off of the infrared ray separation unit 303 (FIG. 6) of the Bayer conversion unit 121 in accordance with the imaging mode, for example.

The infrared light emission unit 103 emits infrared light onto an imaging range (subject) under the control of the control unit 102.

The imaging lens 104 condenses light from the subject and guides the light to the imaging element 106 via the optical filter 105.

The optical filter 105 includes a dual bandpass filter that transmits visible light and infrared light among the light from the imaging lens 104, for example.

Figure 2:
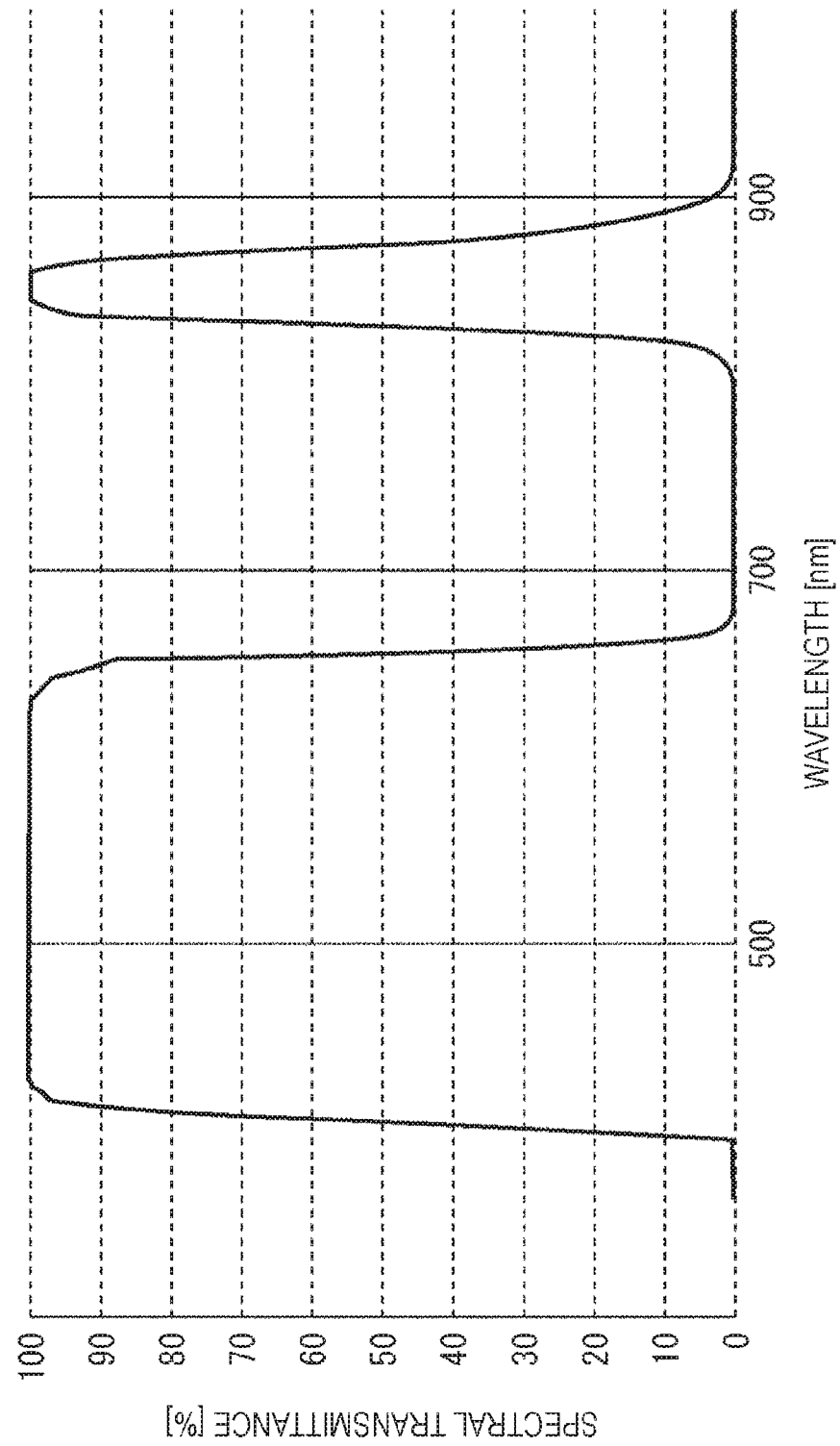
FIG. 2 is a graph illustrating an example of transmission characteristics of the optical filter according to the first embodiment.

FIG. 2 is a graph illustrating an exemplary transmission characteristic of the optical filter 105. In the figure, the vertical axis illustrates a spectral transmittance of the optical filter 105, and the horizontal axis illustrates a wavelength of light. As illustrated in the figure, the optical filter 105 transmits visible light in a wavelength range of 380 to 650 nanometers (nm) and infrared light having a wavelength longer than this range, for example.

Note that while the optical filter 105 need not be provided, it is desirable to provide the optical filter 105 from the viewpoint of separating the infrared light with high accuracy.

The imaging element 106 converts the light received via the imaging lens 104 and the optical filter 105 into an electric signal to generate image data. The imaging element 106 has a two-dimensional matrix of red (R) pixels used for detecting red, green (G) pixels used for detecting green, blue (B) pixels used for detecting blue, and white (W) pixels used for detecting the entire visible light, as will be described below with reference to FIG. 4, for example.

The imaging element 106 performs pixel-by-pixel analog-to-digital (AD) conversion on an analog electric signal photoelectrically converted in each of the pixels, generates a pixel signal being a digital signal, and outputs an image signal (hereinafter referred to as RGBW Image signal)

including the pixel signals. Examples of the applicable imaging element 106 include a charge coupled device (CCD) sensor, and a complementary metal oxide semiconductor (CMOS) sensor. The imaging element 106 supplies the generated RGBW image signal to the Bayer conversion unit 121.

The Bayer conversion unit 121 removes an invisible light component (for example, infrared light component) from the RGBW image signal and converts the RGBW image signal from which the invisible light component has been removed into a Bayer image signal in which the pixel signals are arranged in the Bayer array. The Bayer conversion unit 121 supplies the Bayer image signal to the signal processing unit 122.

The signal processing unit 122 performs predetermined signal processing such as demosaic processing on the Bayer image signal. The signal processing unit 122 converts the demosaiced image signal into a YC image signal including a luminance signal and a chrominance signal for each of pixels, and outputs the YC image signal to a device (for example, a display apparatus) outside the imaging apparatus 100.

Note that while the imaging apparatus 100 outputs the YC image signal to the outside, processing of the signal is not limited to this configuration. For example, the imaging apparatus 100 may further include a recording unit such as a memory, and YC image signal may be recorded in the recording unit. Moreover, the imaging apparatus 100 may further include a display unit such as a liquid crystal monitor, and an image based on the YC image signal may be displayed on the display unit.

Moreover, while FIG. 1 illustrates an example in which all of the photometry unit 101, the control unit 102, the infrared light emission unit 103, the imaging lens 104, the optical filter 105, the imaging element 106, and the image processing unit 107 are provided within the imaging apparatus 100, these may be distributed in a plurality of apparatuses. For example, the photometry unit 101, the control unit 102, the imaging lens 104, the optical filter 105, the imaging element 106, or the like may be provided in the imaging apparatus 100, and the image processing unit 107 may be provided in the image processing apparatus. Moreover, the infrared light emission unit 103 may be provided separately from the imaging apparatus 100, for example.

{Exemplary Configuration of Imaging Element}

Figure 3:
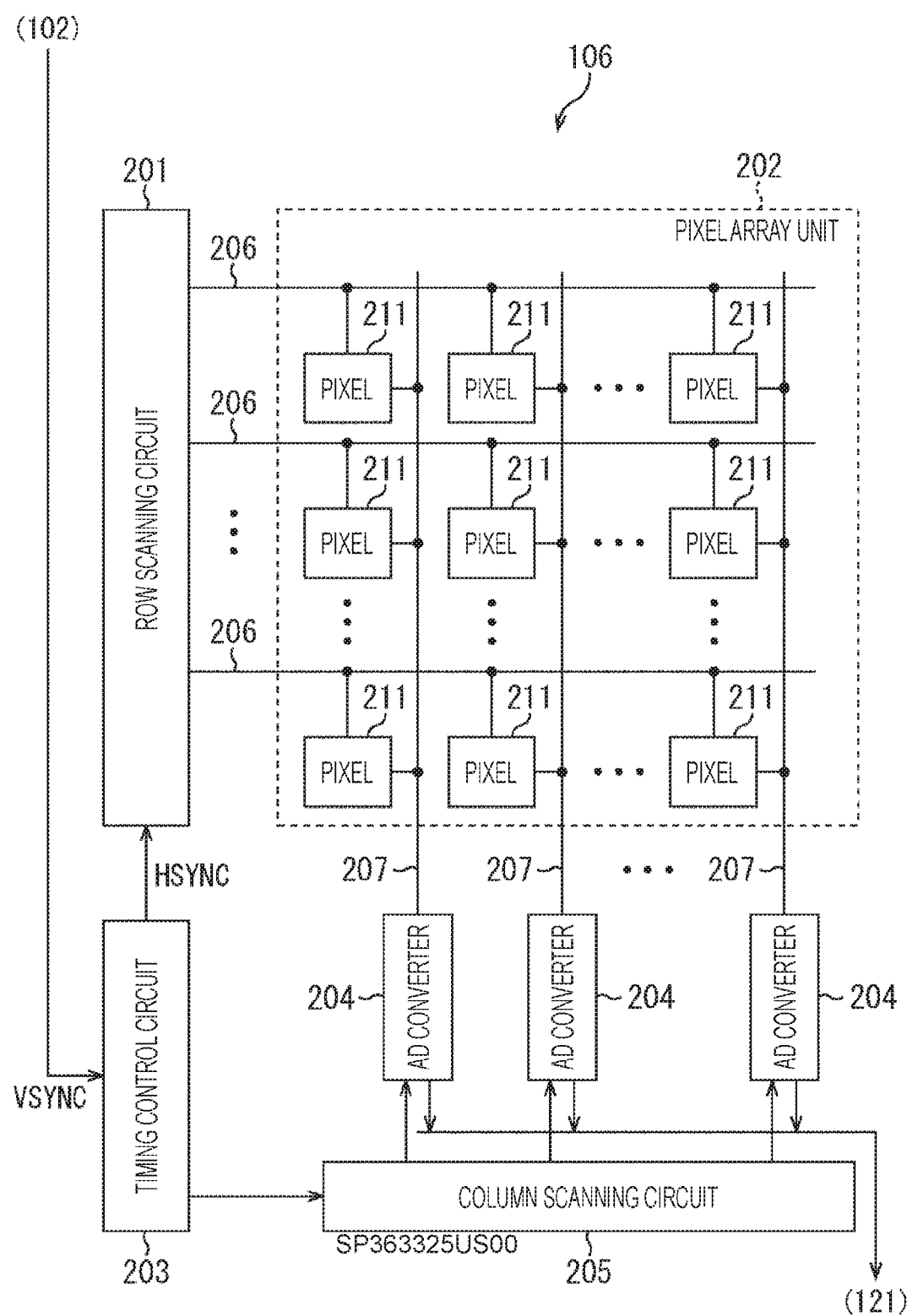
FIG. 3 is a block diagram illustrating an exemplary configuration of an imaging element according to the first embodiment.

FIG. 3 is a block diagram illustrating an exemplary configuration of an imaging element 106. The imaging element 106 includes a row scanning circuit 201, a pixel array unit 202, a timing control circuit 203, an analog-to-digital (AD) converter 204, and a column scanning circuit 205. In the pixel array unit 202, a plurality of pixels 211 is provided in a two-dimensional matrix.

The timing control circuit 203 controls scanning timings of rows and columns. Note that the row is arrangement of the plurality of pixels 211 in certain one direction in the pixel array unit 202, and also referred to as a line. Moreover, the column is arrangement of the plurality of pixels 211 in a direction orthogonal to the row in the pixel array unit 202 The pixel array unit 202 includes pixels 211 arranged in n rows and m columns. Note that n and m are integers.

In synchronization with the vertical synchronization signal VSYNC from the control unit 102, the timing control circuit 203 generates a horizontal synchronization signal HSYNC instructing a row scanning timing and supplies it to the row scanning circuit 201. The timing control circuit 203 further generates a timing signal instructing a column scanning timing in synchronization with the horizontal synchronization signal HSYNC, and supplies the timing signal to the column scanning circuit 205.

The row scanning circuit 201 selects each of the rows in synchronization with the horizontal synchronization signal HSYNC. The row scanning circuit 201 selects rows by sequentially outputting row select signals to each of the rows via signal line 206. In addition, each time the row scanning circuit 201 selects a row, the row scanning circuit 201 exposes the pixel 211 in that row over a predetermined exposure period in accordance with the imaging mode.

The pixel 211 converts incident light into an electric signal and supplies the generated electric signal to the AD converter 204 via the signal line 207 of the corresponding column.

Figure 4:
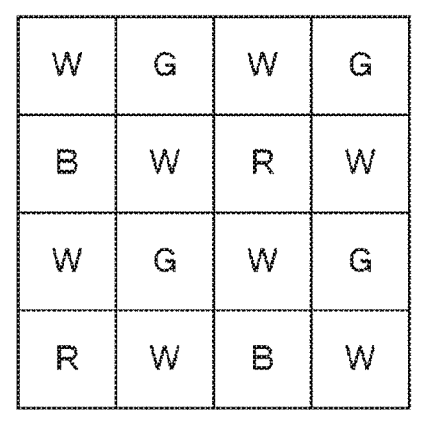

FIG. 4 illustrates an exemplary arrangement of the pixels 211 of the pixel array unit 202. This example illustrates an example of a pixel array in which a pattern of 4 pixels in the vertical direction×4 pixels in the horizontal direction, in which the pixels 211 are arranged with the proportion of R pixel:G pixel:B pixel:W pixel=2:4:2:8. More specifically, W pixels are arranged in a checkered pattern. The R pixel is arranged at column 1 in row 4 and at column 3 in row 2. The B pixel is arranged at column 2 in row 1 and at column 3 in row 4. The G pixel is arranged at the remaining pixel positions. Then, the pattern of the pixel array is repeatedly arranged in the row direction and the column direction on the pixel array unit 202.

Figure 5:
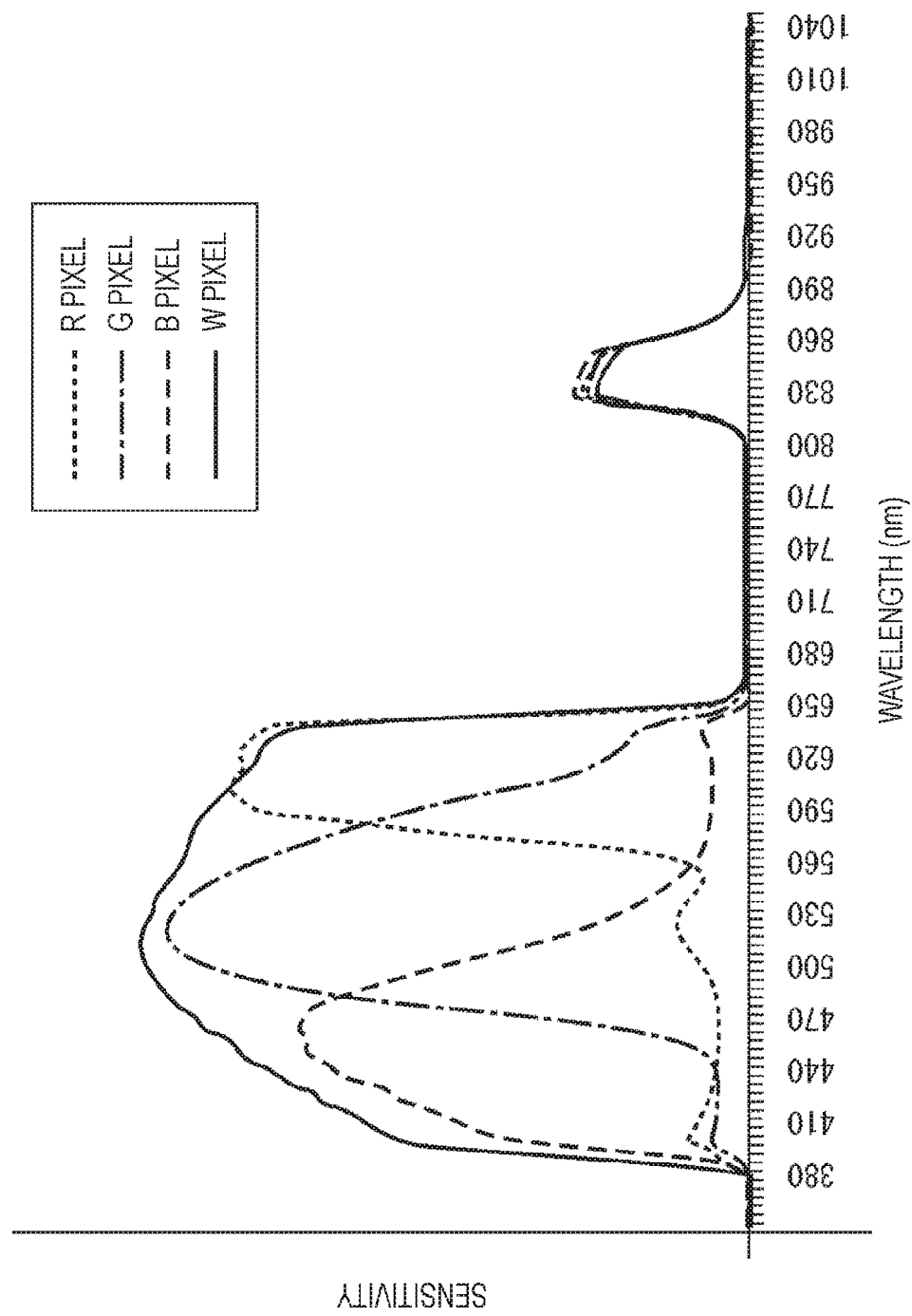
FIG. 5 is a graph illustrating an example of sensitivity characteristics for each of pixels according to the first embodiment.

FIG. 5 is a graph illustrating an example of sensitivity characteristic for each of the pixels 211. In the figure, the horizontal axis illustrates the wavelength of light and the vertical axis illustrates the sensitivity of the pixel 211 to light of that wavelength. Moreover, the solid line illustrates the sensitivity characteristic of the W pixel, and the fine dotted line illustrates the sensitivity characteristic of the R pixel. In addition, the one-dot chain line illustrates the sensitivity characteristic of the G pixel, and the coarse dotted line illustrates the sensitivity characteristic of the B pixel.

The sensitivities of the R pixel, the G pixel and the B pixel each illustrate peaks with respect to the visible light of each of red, green and blue colors. The sensitivity of the W pixel illustrates such a waveform as encompassing the waveforms of the sensitivities of R pixel, G pixel and B pixel. Sensitivity of each of the R, G, B and W pixels to infrared light of is at a similar level.

In addition, as will be described below, the W pixel is set as a pixel for receiving infrared light used for receiving infrared light from the infrared light emission unit 103. In contrast, the R pixel, the G pixel, and the B pixel are set as pixels that are not used for receiving the infrared light from the infrared light emission unit 103.

Returning to FIG. 3, the AD converter 204 is provided for each of columns to perform AD conversion on the electric signal from the pixel 211 to generate a digital signal. Moreover, the AD converter 204 of the column selected by the column scanning circuit 205 supplies the generated digital signal to the Bayer conversion unit 121 of the image processing unit 107 as a pixel signal.

The column scanning circuit 205 sequentially outputs a column selection signal to each of the AD converters 204 in accordance with the timing signal, thereby selecting a column.

{Exemplary Configuration of Bayer Conversion Unit}

Figure 6:
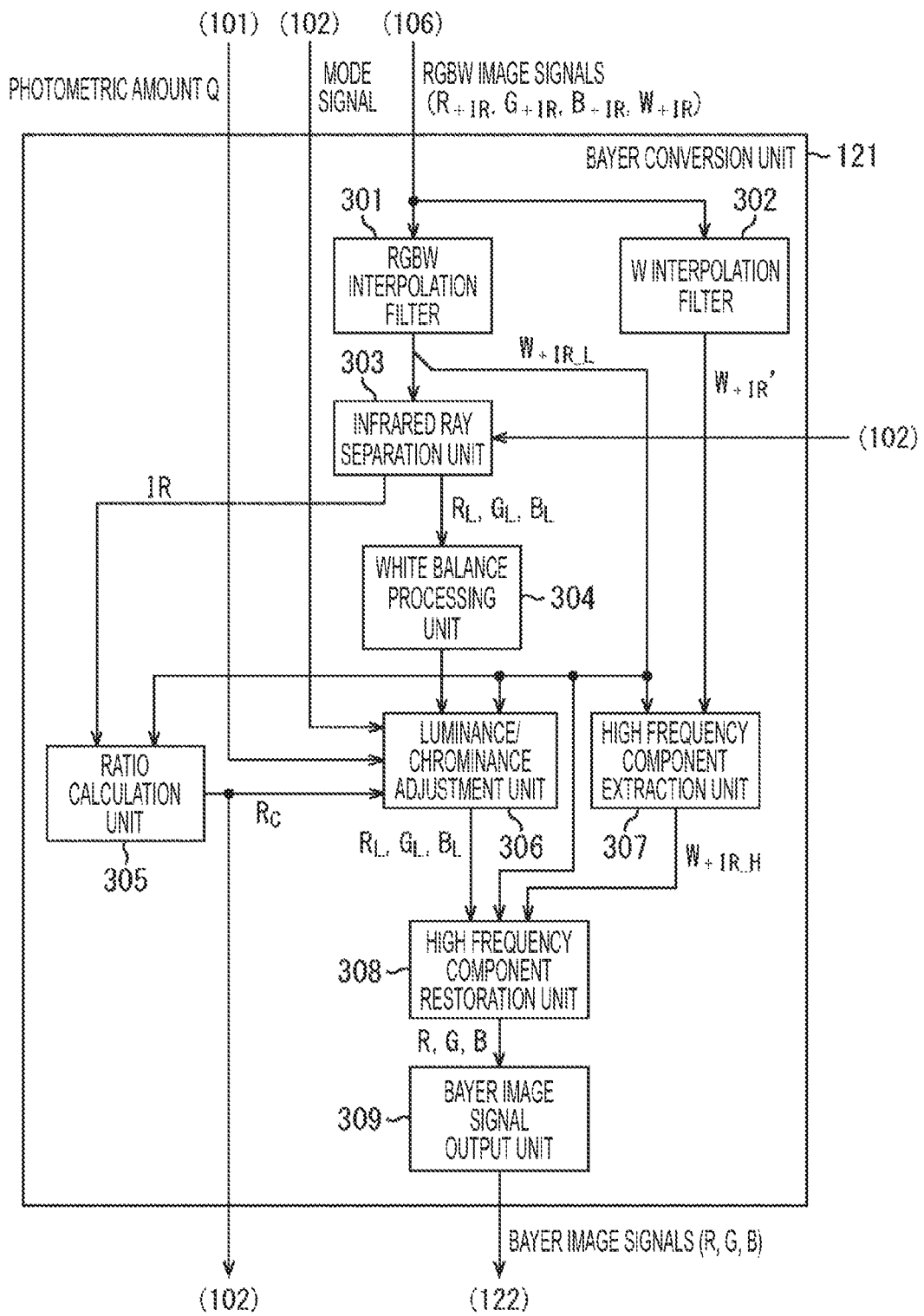
FIG. 6 is a block diagram illustrating an exemplary configuration of a Bayer conversion unit according to the first embodiment.

FIG. 6 is a block diagram illustrating an exemplary configuration of the Bayer conversion unit 121. The Bayer conversion unit 121 includes an RGBW interpolation filter 301, a W interpolation filter 302, an infrared ray separation unit 303, a white balance processing unit 304, a ratio calculation unit 305, a luminance/chrominance adjustment unit 306, a high frequency component extraction unit 307, a high frequency component restoration unit 308, and a Bayer image signal output unit 309.

The RGBW interpolation filter 301 interpolates all of the color signals for each of pixels signal in the RGBW image signal.

Note that each of the R pixel, the G pixel, the B pixel, and the W pixel receives infrared light together with visible light, and generates a pixel signal containing one color signal from the light. Accordingly, the color signals of these pixels contain a visible light component being a signal photoelectrically converted from the visible light and an infrared light component being a signal photoelectrically converted from the infrared light. Accordingly, color signals of the R pixel, the G pixel, the B pixel, and the W pixel before separation of the infrared light component are respectively referred to as "$R_{+IR}$", "$G_{+IR}$", "$B_{+IR}$" and "$W_{+IR}$". The suffix "$_{+IR}$" indicates that the infrared light component is included in the color signal.

The RGBW interpolation filter 301 sequentially focuses on the pixel signals, for example, interpolates the color signals by the following Formulas (1) to (4) using pixel signals surrounding the focused pixel signal as an interpolation target.

[Mathematical Expression 1]

$$R_{+IR\_L} = \sum_{i=0}^{M-1} R_{+IR\_i} \times k_i \quad (1)$$

$$G_{+IR\_L} = \sum_{i=0}^{M-1} G_{+IR\_i} \times k_i \quad (2)$$

$$B_{+IR\_L} = \sum_{i=0}^{M-1} B_{+IR\_i} \times k_i \quad (3)$$

$$W_{+IR\_L} = \sum_{i=0}^{M-1} W_{+IR\_i} \times k_i \quad (4)$$

In the Formulas (1) to (4), M is the number of pixel signals used for interpolation and will be hereinafter referred to as a tap number. i is an integer ranging from 0 to M−1 and indicates a number for identifying the pixel signals used for interpolation. $k_i$ is a coefficient of a real number. The shorter the distance from the pixel signal related to i to the interpolation target, the greater the coefficient $k_i$ is set. The coefficient $k_i$ is set to a same value when the distances are the same. For example, in a case where $R_{+IR\_0}$ to $R_{+IR\_3}$ in upper, lower, left, and right positions surrounding the interpolation target are to be used for interpolation, ¼ is set for all the coefficients $k_0$ to $k_3$ since the distances to these interpolation targets are the same.

The RGBW interpolation filter 301 supplies an $R_{+IR\_L}$ signal, a $G_{+IR\_L}$ signal, and a $B_{+IR\_L}$ signal after interpolation to the infrared ray separation unit 303, while supplying a $W_{+IR\_L}$ signal after interpolation to the infrared ray separation unit 303, the ratio calculation unit 305, the luminance/chrominance adjustment unit 306, the high frequency component extraction unit 307, and the high frequency component restoration unit 308.

Figure 7:
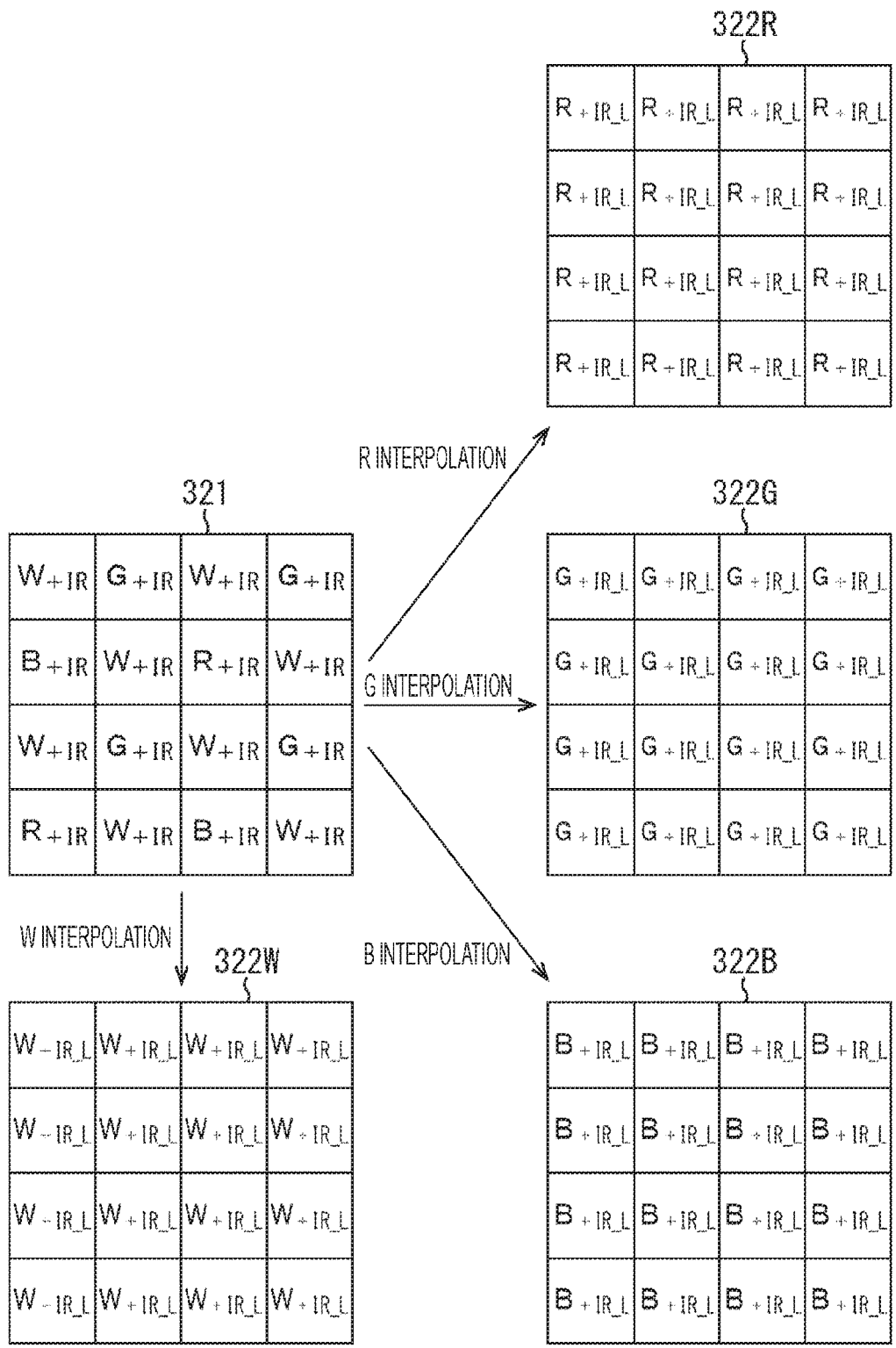
FIG. 7 is a diagram illustrating an example of image signals before and after interpolation according to the first embodiment.

FIG. 7 illustrates an example of image signals before and after interpolation by the RGBW interpolation filter 301. In the RGBW image signal 321 before interpolation, the $R_{+IR}$ signal, the $G_{+IR}$ signal, the $B_{+IR}$ signal, and the $W_{+IR}$ signal are arranged in an arrangement similar to that in FIG. 4 described above.

Data 322W illustrates an example of data containing the $W_{+IR\_L}$ signals after interpolation. Data 322R illustrates an example of data containing the $R_{+IR\_L}$ signals after interpolation. Data 322G illustrates an example of data containing the $G_{+IR\_L}$ signals after interpolation. Data 322B illustrates an example of data containing the $B_{+IR\_L}$ signals after interpolation. As indicated by these data examples 322W to 322G, all the color signals are interpolated for each of pixels.

The W interpolation filter 302 interpolates the $W_{+IR}$ for each of pixels in the RGBW image signal using the above-described Formula (4) or the like. The W pixel, however, does not need interpolation from surrounding pixel signals.

Moreover, the value of a tap number M of the W interpolation filter 302 is set to a value smaller than the tap number of the RGBW interpolation filter 301. For example, the tap number M is set to 81 (=9 rows×9 columns) in the RGBW interpolation filter 301. In contrast, the tap number M is set to 25 (=5 rows×5 columns) in the W interpolation filter 302. W interpolation filter 302 supplies a $W_{+IR}'$ signal after interpolation to the high frequency component extraction unit 307.

Note that the W interpolation filter 302 may detect an edge in a specific direction and perform interpolation by preferentially using the pixel signal along the direction of the edge. For example, the W interpolation filter 302 detects edges in the horizontal direction and the vertical direction. Then, in a case where an edge in the horizontal direction is detected, the W interpolation filter 302 performs interpolation by an average of the pixel signals above and below the interpolation target, and in a case where an edge in the vertical direction is detected, the W interpolation filter 302 performs interpolation by an average of the pixel signals left and right of the interpolation target. Note that the RGBW interpolation filter 301 may also detect an edge in a specific direction and perform interpolation by preferentially using the pixel signal along the direction of the edge in a similar manner.

The infrared ray separation unit 303 is turned on or off under the control of the control unit 102. In a case where the infrared ray separation unit 303 is turned on, the infrared light component is separated and removed from each of the $R_{+IR\_L}$ signal, the $G_{+IR\_L}$ signal, and the $B_{+IR\_L}$ signal. For example, the infrared ray separation unit 303 separates and removes infrared light components using the following Formulas (5) to (8).

$$IR = (R_{+IR\_L} + G_{+IR\_L} + B_{+IR\_L} - W_{+IR\_L})/2 \quad (5)$$

$$R_L = R_{+IR\_L} - IR \quad (6)$$

$$G_L = G_{+IR\_L} - IR \quad (7)$$

$$B_L = B_{+IR\_L} - IR \quad (8)$$

In the Formulas (5) to (8), IR represents an infrared light component. Moreover, $R_L$, $G_L$, and $B_L$ each indicate color signals from which infrared light components have been removed.

Note that formulas (5) to (8) are examples of mathematical expressions for separating and removing infrared light components, and the infrared ray separation unit 303 can separate and remove the infrared light components using another mathematical expression.

The infrared ray separation unit 303 supplies the $R_L$ signal, the $G_L$ signal, and the $B_L$ signal to the white balance processing unit 304. Moreover, the infrared ray separation unit 303 supplies the separated infrared light component IR to the ratio calculation unit 305.

Figure 8:
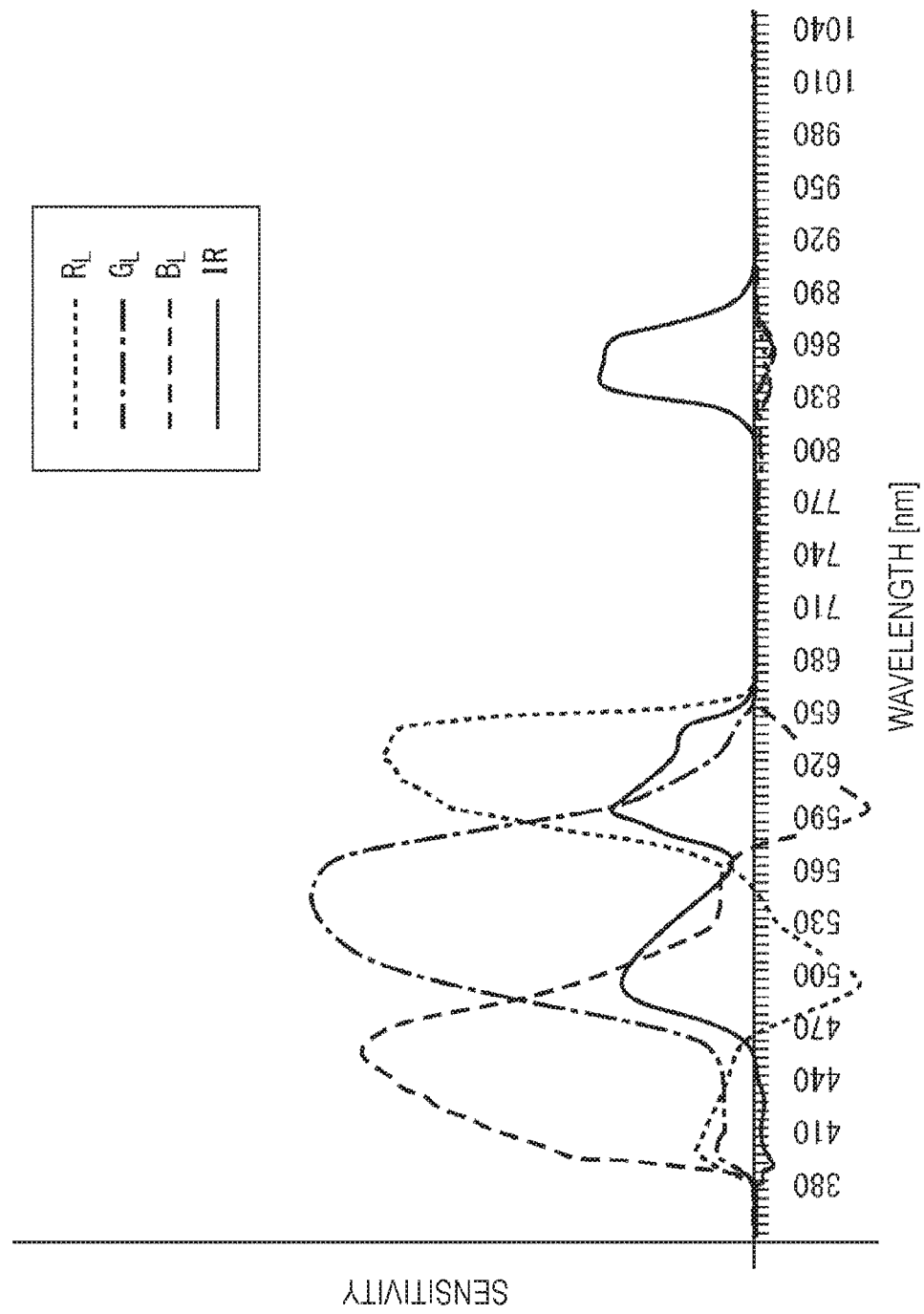
FIG. 8 is a diagram illustrating an example of sensitivity characteristics after infrared ray separation according to the first embodiment.

FIG. 8 is a graph illustrating an example of sensitivity characteristics after separation of infrared lights. In the figure, the horizontal axis illustrates the wavelength of light and the vertical axis illustrates the sensitivity of the pixel to light of that wavelength. While actual cases involves separation of the infrared light component and the visible light component from the pixel signal rather than the sensitivity, the figure illustrates these components being replaced by the sensitivities. The solid line in the figure illustrates the sensitivity characteristic of the infrared light component IR and the fine dotted line illustrates the sensitivity characteristic of the $R_L$ signal. In addition, the one-dot chain line illustrates the sensitivity characteristic of the $G_L$ signal, and the coarse dotted line illustrates the sensitivity characteristic of the $B_L$ signal. As illustrated in the figure, the infrared light component IR is removed to some extent in each of the color signals.

Figure 9:
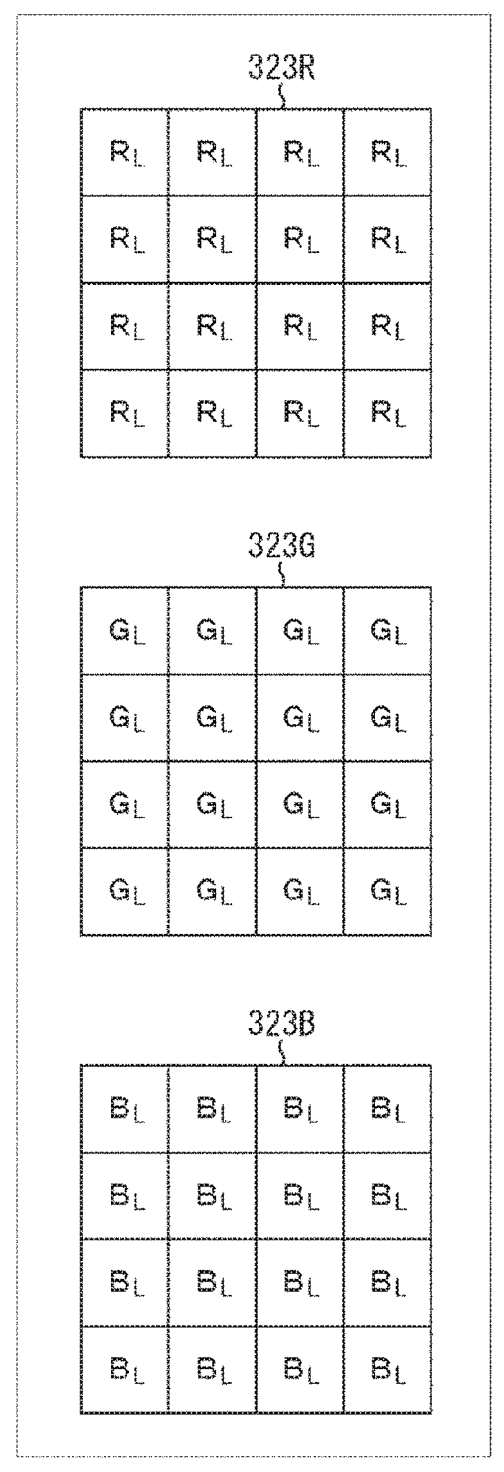

FIG. 9 illustrates an example of a color signal after infrared ray separation. The data 323R is an example of data containing $R_L$ signals after infrared ray separation has been performed on the data 322R in FIG. 7. The data 323G is an example of data containing $G_L$ signals after infrared ray separation has been performed on the data 322G in FIG. 7. The data 323B is an example of data containing $B_L$ signals after infrared ray separation has been performed on the data 322B in FIG. 7. As illustrated in these data examples of 323R to 323B, infrared light components are removed from each of the color signals.

In contrast, in a case where the infrared ray separation unit 303 is turned off, the unit directly supplies each of the $R_{+IR\_L}$ signal, the $G_{+IR\_L}$ signal and the $B_{+IR\_L}$ signal as the $R_L$ signal, the $G_L$ signal and $B_L$ signal, respectively, to the white balance processing unit 304 without performing separation or removal of infrared light components from each of these signals. In this case, the relationship of each of the $R_{+IR\_L}$ signal, the $G_{+IR\_L}$ signal, and the $B_{+IR\_L}$ signal, with each of the $R_L$ signal, $G_L$ signal, and the $B_L$ signal is to be as illustrated in the following Formulas (9) to (11).

$$R_L = R_{+IR\_L} \quad (9)$$

$$G_L = G_{+IR\_L} \quad (10)$$

$$B_L = B_{+IR\_L} \quad (11)$$

The white balance processing unit 304 adjusts the white balance in the $R_L$ signal, the $G_L$ signal, and the $B_L$ signal. For example, the white balance processing unit 304 adjusts the white balance by multiplying each of the $R_L$ signal and the $B_L$ signal by a gain. The white balance processing unit 304 supplies the $R_L$ signal, the $G_L$ signal, and the $B_L$ signal with the white balance adjusted, to the luminance/chrominance adjustment unit 306.

The ratio calculation unit 305 calculates the visible light ratio Rc using the following Formulas (12) to (14), for example, and supplies a result to the control unit 102 and the luminance/chrominance adjustment unit 306.

[Mathematical Expression 2]

$$IR_{av} = \frac{\sum_{j=0}^{N-1} IR_j}{N} \quad (12)$$

$$W_{+IR\_av} = \frac{\sum_{j=0}^{N-1} W_{+IR\_L\_j}}{N} \quad (13)$$

$$Rc = (W_{+IR\_av} - IR_{av})/W_{+IR\_av} \quad (14)$$

In Formula (12), N is the number of pixel signals in the image signal. $IR_j$ denotes the infrared light component in j (j is an integer from 0 to N−1) th pixel signal. $IR_{av}$ is an average value of infrared light components. Moreover, $W_{+IR\_L\_j}$ represents the jth $W_{+IR\_L}$ signal in Formula (13). $W_{+IR\_L\_av}$ is an average value of the $W_{+IR\_L}$ signal.

The luminance/chrominance adjustment unit 306 adjusts the luminance signal and the chrominance signal on the basis of the visible light ratio Rc and the photometric amount Q in accordance with the imaging mode. Specifically, the luminance/chrominance adjustment unit 306 converts the $R_L$ signal, the $G_L$ signal, and the $B_L$ signal in the pixel signal into a luminance signal and a chrominance signal for each of the pixels signals. Then, the luminance/chrominance adjustment unit 306 adjusts the luminance signal and the chrominance signal on the basis of the visible light ratio Rc and the photometric amount Q in accordance with the imaging mode. Subsequently, the luminance/chrominance adjustment unit 306 returns the signals to the $R_L$ signal, the $G_L$ signal, and the $B_L$ signal, and then supplies the signals to the high frequency component restoration unit 308.

The high frequency component extraction unit 307 extracts a difference between the $W_{+IR\_L}$ signal from the RGBW interpolation filter 301 and the $W_{+IR}'$ signal from the W interpolation filter 302 as a high frequency component $W_{+IR\_H}$. As described above, the tap number M of the W interpolation filter 302 is smaller than the tap number of the RGBW interpolation filter 301. Accordingly, the $W_{+IR}'$ signal from the W interpolation filter 302 contains a frequency component higher than the $W_{+IR\_L}$ signal from the RGBW interpolation filter 301. Therefore, by taking the difference between them, it is possible to extract the high frequency component $W_{+IR\_H}$. The high frequency component extraction unit 307 supplies the extracted high frequency component $W_{+IR\_H}$ to the high frequency component restoration unit 308.

The high frequency component restoration unit 308 restores the high frequency component $W_{+IR\_H}$ in the $R_L$ signal, the $G_L$ signal and the $B_L$ signal. The high frequency component restoration unit 308 restores the high frequency component $W_{+IR\_H}$ using the following Formulas (15) to (17), for example.

$$R = R_L + W_{+IR\_H} \times R_L / W_{+IR\_L} \quad (15)$$

$$G = G_L + W_{+IR\_H} \times G_L / W_{+IR\_L} \quad (16)$$

$$B = B_L + W_{+IR\_H} \times B_L / W_{+IR\_L} \quad (17)$$

In Formulas (15) to (17), R, G and B are color signals after restoration. The high frequency components of the individual color signals are lost by the interpolation in the RGBW interpolation filter 301, leading to degradation of the image quality of the image deteriorates with no processing. However, with restoration of the high frequency component by the high frequency component restoration unit 308, image quality is enhanced as compared with the case with no restoration. The high frequency component restoration unit 308 supplies the restored R signal, G signal, and B signal to the Bayer image signal output unit 309.

The Bayer image signal output unit 309 arranges the R signal, the G signal and the B signal in the Bayer array and outputs the signals as the Bayer image signal to the signal processing unit 122.

Figure 10:
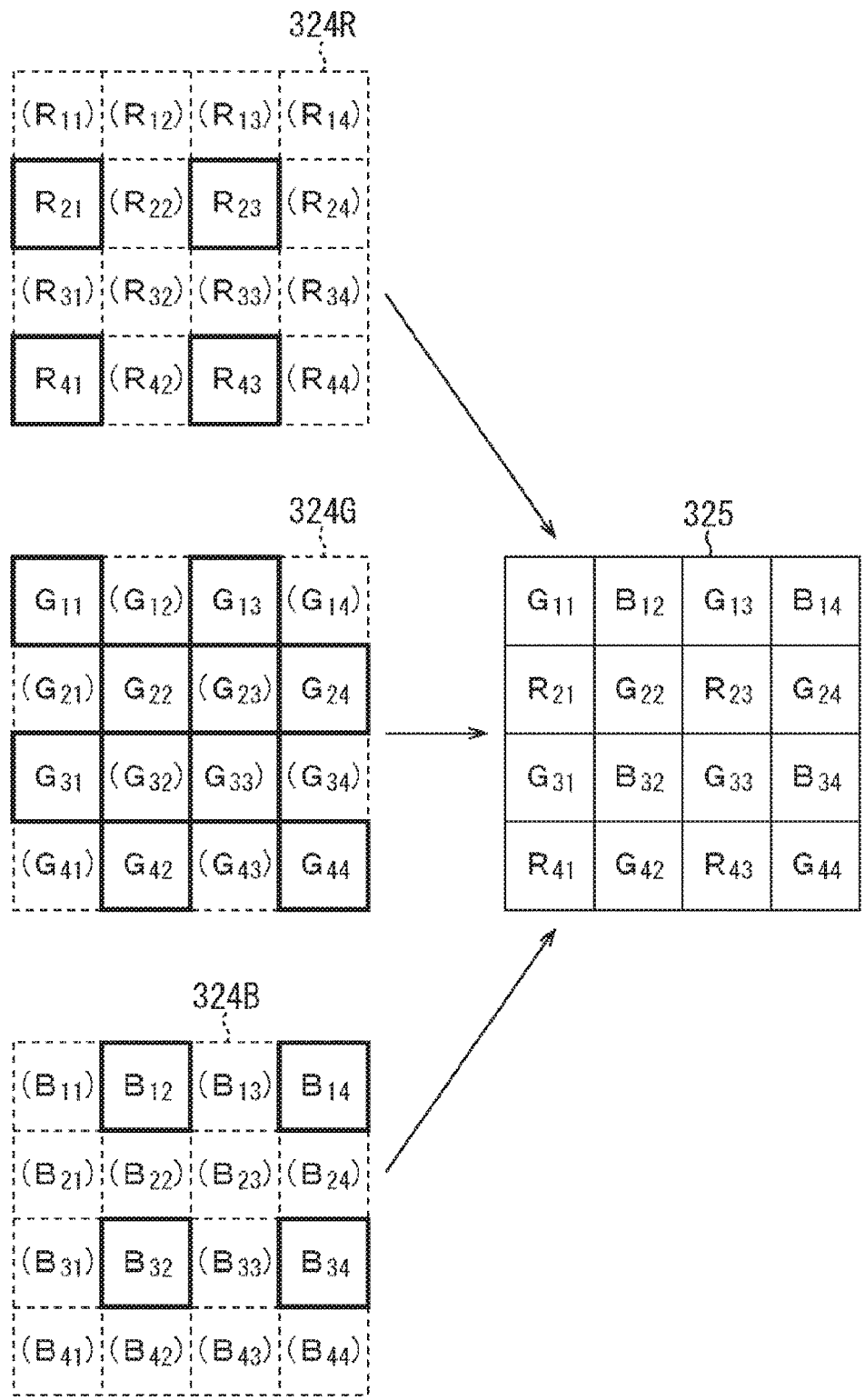
FIG. 10 is a diagram illustrating an example of image signals before and after Bayer conversion according to the first embodiment.

FIG. 10 illustrates an example of image signals before and after Bayer conversion. The data 324R illustrates an example of data containing the R signal after restoration of the high frequency component. The data 324G illustrates an example of data containing the G signal after restoration of the high frequency component. The data 324B illustrates an example of data containing the B signal after restoration of the high frequency component. Note that in each of the data 324R to 324B, the suffix of each of the R signal, the G signal, and the B signal indicates the row and column positions at which the pixel signals are arranged. For example, the R signal at row 1 column 1 is denoted as $R_{11}$, while the R signal at row 1 column 2 is denoted as $R_{12}$.

Then, the R signal, the G signal, and the B signal after the high frequency component restoration are arranged in the Bayer array, so as to generate a Bayer image signal 325. For example, $R_{21}$, $R_{23}$, $R_{41}$ and $R_{43}$ are selected from the 4×4 R signals of the data 324R and arranged in the Bayer image signal 325 with the original row and column positions. Moreover, for example, $G_{11}$, $G_{13}$, $G_{22}$, $G_{24}$, $G_{31}$, $G_{33}$, $G_{42}$, and $G_{44}$ are selected from the 4×4 G signals of the data 324G and arranged in the Bayer image signal 325 with the original row and column positions. Moreover, for example, $B_{12}$, $B_{14}$, $B_{32}$, and $B_{34}$ are selected from the 4×4 B signals of the data 324B and arranged in the Bayer image signal 325 with the original row and column positions. This generates the Bayer image signal 325 in which the R signal, the G signal, and the B signal are arranged in the Bayer array.

Note that while the high frequency components are extracted and restored by the W interpolation filter 302, the high frequency component extraction unit 307, and the high frequency component restoration unit 308, it is allowable to omit these components. Still, from the viewpoint of enhancing the image quality, it is desirable to provide the W interpolation filter 302, the high frequency component extraction unit 307, and the high frequency component restoration unit 308.

Moreover, while the ratio calculation unit 305 and the luminance/chrominance adjustment unit 306 are provided in the Bayer conversion unit 121, they may be provided in the signal processing unit 122 in a subsequent stage. Still, from the viewpoint of enhancing the image quality, it is desirable to provide the ratio calculation unit 305 and the luminance/chrominance adjustment unit 306 in the Bayer conversion unit 121.

Furthermore, it is also allowable to omit the Bayer image signal output unit 309 and the image signal may be supplied to the signal processing unit 122 without undergoing Bayer conversion.

{Exemplary Configuration of Luminance/Chrominance Adjustment Unit}

Figure 11:
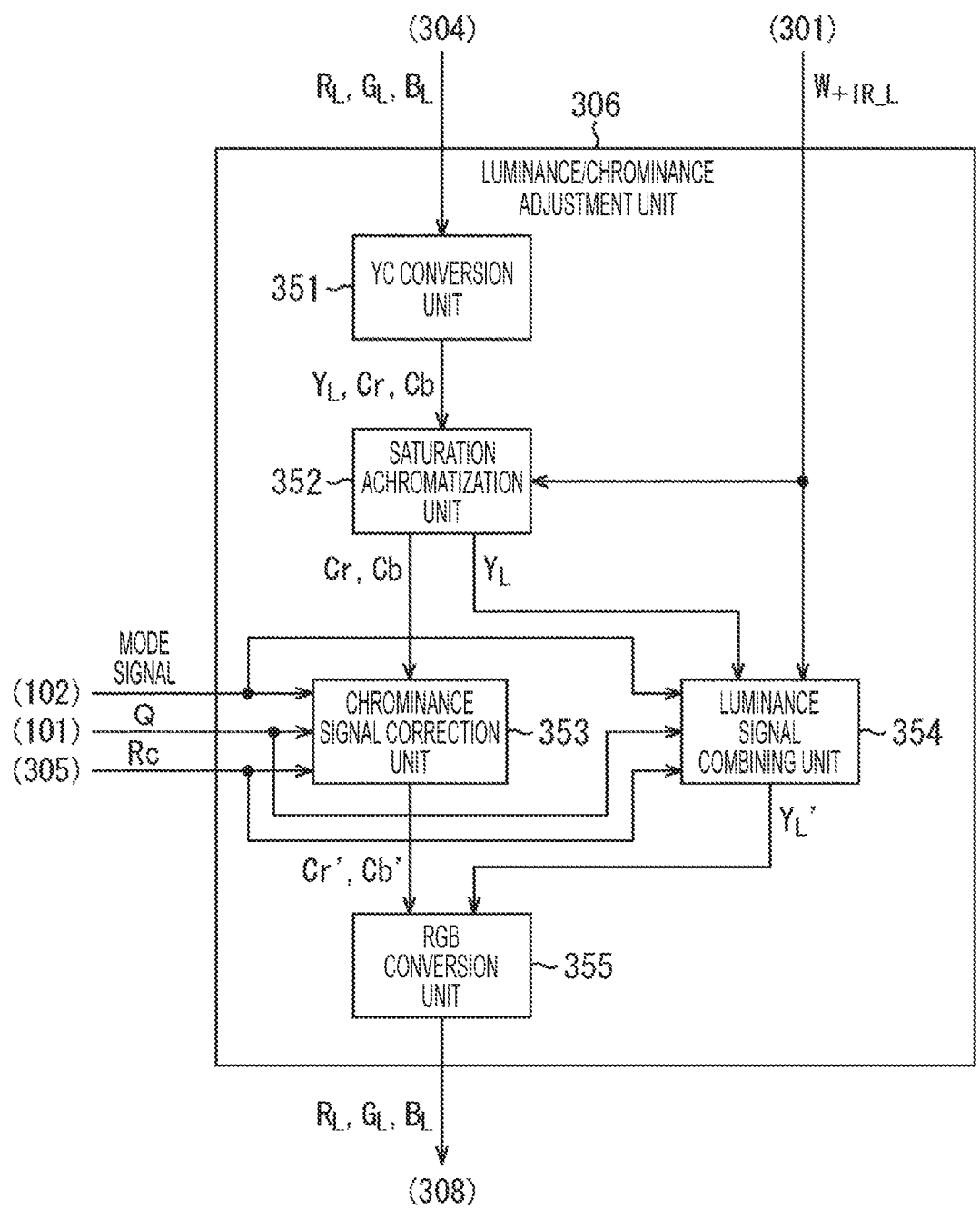
FIG. 11 is a block diagram illustrating an exemplary configuration of a luminance/chrominance adjustment unit according to the first embodiment.

FIG. 11 is a block diagram illustrating an exemplary configuration of a luminance/chrominance adjustment unit 306. The luminance/chrominance adjustment unit 306 includes a YC conversion unit 351, a saturation achromatization unit 352, a chrominance signal correction unit 353, a luminance signal combining unit 354, and an RGB conversion unit 355.

The YC conversion unit 351 converts the $R_L$ signal, the $G_L$ signal, and the $B_L$ signal into a luminance signal $Y_L$ and chrominance signals Cr and Cb, for each of pixels. The YC conversion unit 351 performs conversion by the following Formulas (18) to (20), for example, on the basis of the International Telecommunication Union Radiocommunication Sector (ITU-R) BT. 601 standard. The YC conversion unit 351 supplies the luminance signal $Y_L$ and the chrominance signals Cr and Cb to the saturation achromatization unit 352.

$$Y_L = 0.299 \times R_L + 0.587 \times G_L + 0.144 \times B_L \quad (18)$$

$$Cb = -0.168736 \times R_L - 0.331264 \times G_L + 0.5 \times B_L \quad (19)$$

$$Cr = 0.5 \times R_L - 0.418688 \times G_L - 0.081312 \times B_L \quad (20)$$

The saturation achromatization unit 352 is applied to prevent a case where any of the input signals ($R_{+IR}$, $G_{+IR}$, $B_{+IR}$, and $W_{+IR}$) is saturated to hinder proper operation of the infrared ray separation to produce an improper color. For example, a signal level of $W_{+IR\_L}$ is used as a saturation level. When the signal level of $W_{+IR\_L}$ exceeds the saturation level, the saturation achromatization unit 352 multiplies the signal by a gain below one to perform achromatization for the degree of saturation. The saturation achromatization unit 352 supplies the chrominance signals Cr and Cb after achromatization to the chrominance signal correction unit 353 and supplies the luminance signal $Y_L$ after achromatization to the luminance signal combining unit 354.

The chrominance signal correction unit 353 corrects the chrominance signals Cr and Cb. Specifically, the chrominance signal correction unit 353 sets a chroma gain Gc on the basis of the imaging mode, the photometric amount Q, and the visible light ratio Rc. Then, the chrominance signal correction unit 353 performs correction of multiplying each of the chrominance signals Cr and Cb by the set gain, and supplies the corrected chrominance signals Cr' and Cb' to the RGB conversion unit 355. The details of the chroma gain setting method will be described below.

The luminance signal combining unit 354 combines the luminance signal $Y_L$ and the color signal $W_{+IR\_L}$. Specifically, the luminance signal combining unit 354 sets a combining ratio α on the basis of the imaging mode, the photometric amount Q, and the visible light ratio Rc. Then, the luminance signal combining unit 354 combines the luminance signal $Y_L$ and the color signal $W_{+IR\_L}$ with the set combining ratio α to generate a luminance signal $Y_L'$, and supplies the luminance signal $Y_L'$ to the RGB conversion unit 355. Details of the combining ratio setting method will be described below.

The RGB conversion unit 355 converts the luminance signal $Y_L'$ and the chrominance signals Cr' and Cb' into the $R_L$ signal, the $G_L$ signal and the $B_L$ signal for each of pixels and supplies the signals to the high frequency component restoration unit 308. The RGB conversion unit 355 performs conversion using the following Formulas (21) to (23) on the basis of the ITU-R BT. 601 standard, for example.

$$R_L = Y_L' + 1.402 \times Cr' \quad (21)$$

$$G_L = Y_L' - 0.344136 \times Cr' - 0.714136 \times Cb' \quad (22)$$

$$B_L = Y_L' + 1.772 \times Cb' \quad (23)$$

{Exemplary Configuration of Chrominance Signal Correction Unit}

Figure 12:
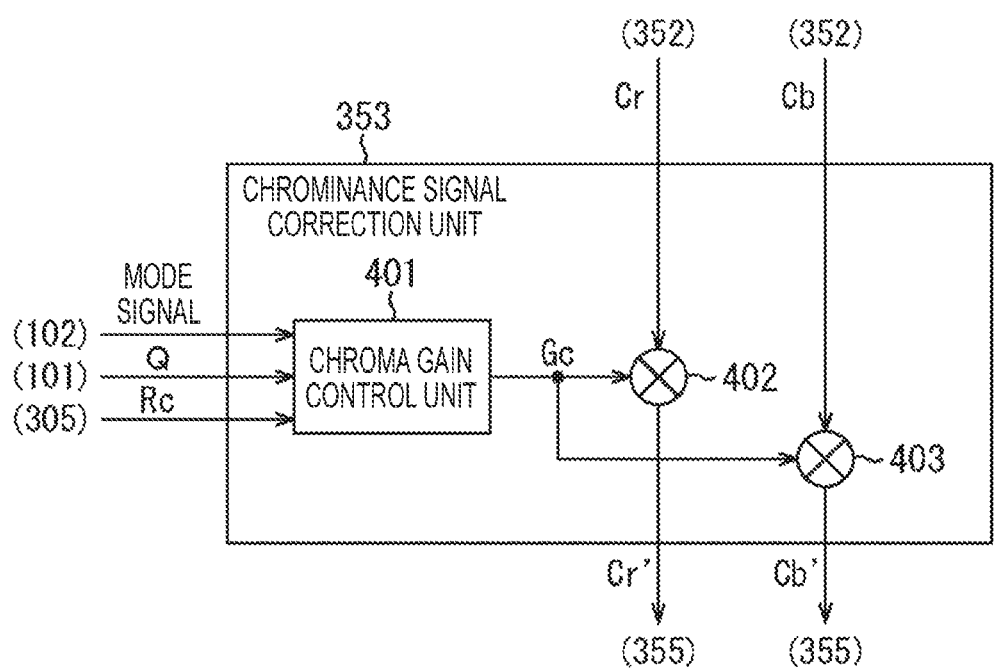
FIG. 12 is a block diagram illustrating an exemplary configuration of a chrominance signal correction unit according to the first embodiment.

FIG. 12 is a block diagram illustrating an exemplary configuration of the chrominance signal correction unit 353. The chrominance signal correction unit 353 includes a chroma gain control unit 401 and multipliers 402 and 403.

The chroma gain control unit 401 controls the chroma gain Gc, which is a gain to be multiplied to the chrominance signal, on the basis of the imaging mode, the photometric amount Q, and the visible light ratio Rc.

Figure 13:
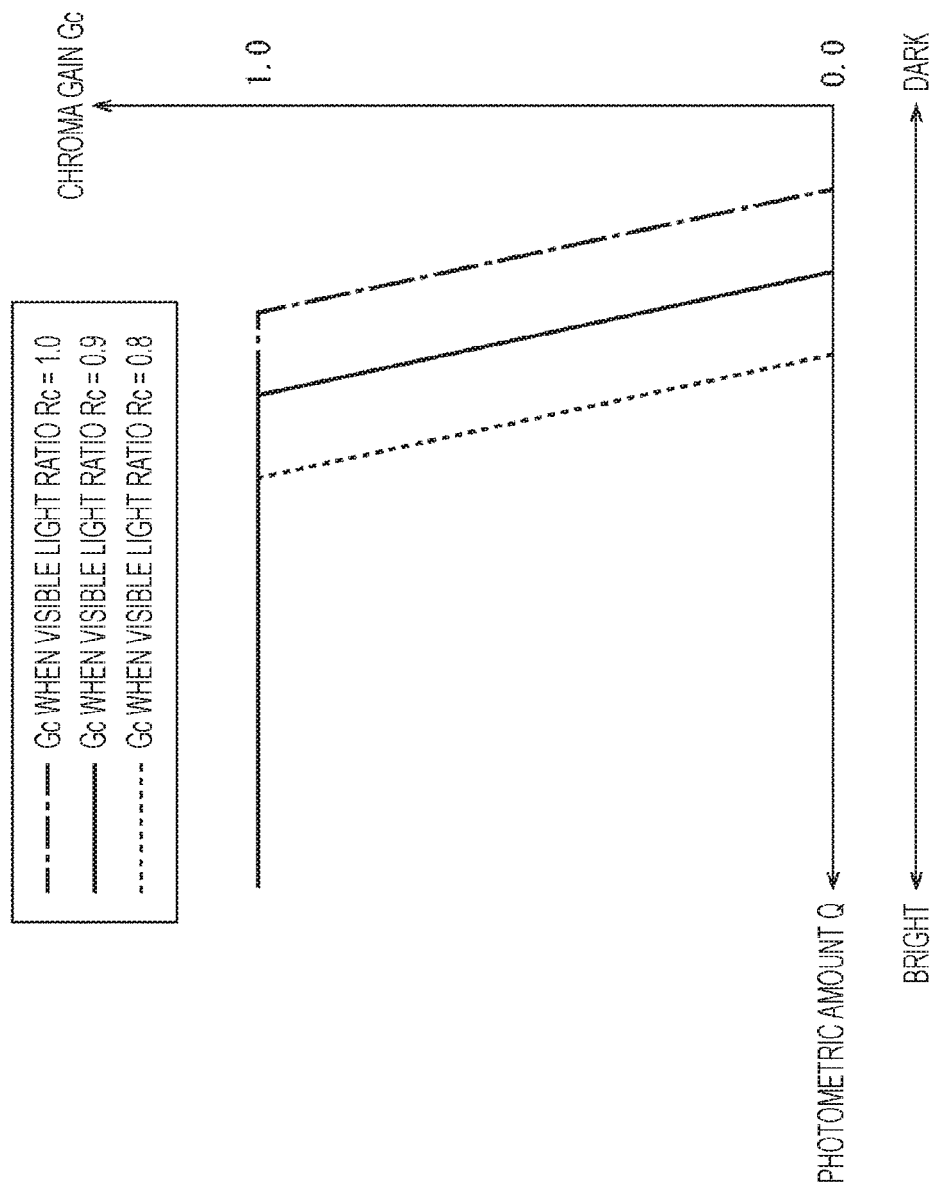
FIG. 13 is a graph illustrating a chroma gain setting example according to the first embodiment.

For example, in a case where the day mode or the CNV mode is set, the chroma gain control unit 401 uses the graph of FIG. 13 to set the chroma gain Gc.

In FIG. 13, the vertical axis represents the chroma gain Gc and the horizontal axis represents the photometric amount Q. In addition, the one-dot chain line in the figure is an example of setting the chroma gain Gc in a case where the visible light ratio Rc is 1.0, and the solid line is an example of setting the chroma gain Gc in a case where the visible light ratio Rc is 0.9. In addition, the dotted line is an example of setting the chroma gain Gc in a case where the visible light ratio Rc is 0.8. As illustrated in the figure, the smaller the photometric amount Q or the lower the visible light ratio Rc (that is, the higher the proportion of the infrared light component), the smaller chroma gain Gc is set. As a result, the darker the surroundings of the imaging apparatus 100, or the higher the proportion of the infrared light component, it is possible to bring the image close to a monochrome image and maintain the Signal-to-Noise (S/N) ratio of the image signal better.

In contrast, in a case where the mode is set to the night mode, the chroma gain control unit 401 sets the value of the chroma gain Gc to zero.

The chroma gain control unit 401 supplies the set chroma gain Gc to the multipliers 402 and 403.

Note that while the chroma gain control unit 401 is provided in the image processing unit 107, it is also allowable to provide the chroma gain control unit 401 in the control unit 102, for example.

The multiplier 402 multiplies the chrominance signal Cr by the chroma gain Gc and supplies the chrominance signal Cr' as a result of multiplication to the RGB conversion unit 355.

The multiplier 403 multiplies the chrominance signal Cb by the chroma gain Gc, and supplies the chrominance signal Cb' as a result of multiplication to the RGB conversion unit 355.

Accordingly, in a case where the mode is set to the day mode or the CNV mode, the chrominance signals Cr' and Cb' are expressed by the following Formulas (24) and (25).

$$Cr'=Gc \times Cr \quad (24)$$

$$Cb'=Gc \times Cb \quad (25)$$

In contrast, in a case where the mode is set to the night mode, the chrominance signals Cr' and Cb' are expressed by the following Formulas (26) and (27).

$$Cr'=0 \quad (26)$$

$$Cb'=0 \quad (27)$$

Therefore, in a case where the mode is set to the night mode, the $R_L$ signal, the $G_L$ signal, and the $B_L$ signal output from the RGB conversion unit 355 each contains the luminance signal $Y_L'$ alone and become a monochrome image signal.

{Exemplary Configuration of Luminance Signal Combining Unit}

Figure 14:
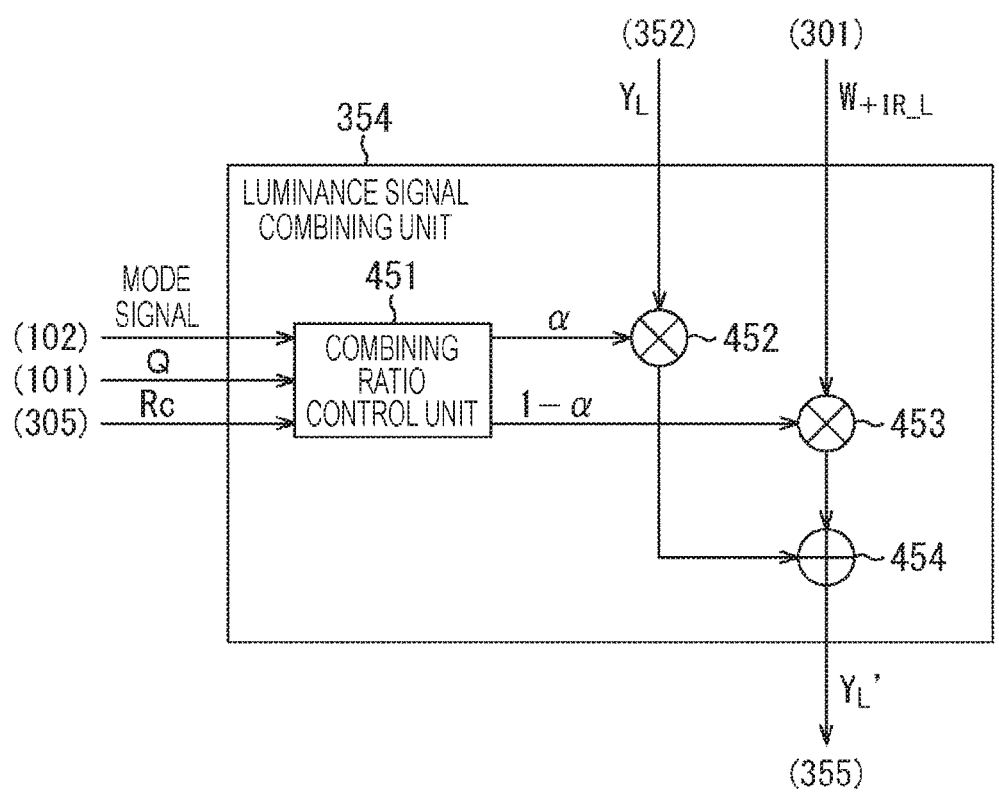
FIG. 14 is a block diagram illustrating an exemplary configuration of a luminance signal combining unit according to the first embodiment.

FIG. 14 is a block diagram illustrating an exemplary configuration of the luminance signal combining unit 354. The luminance signal combining unit 354 includes a combining ratio control unit 451, multipliers 452 and 453, and an adder 454.

The combining ratio control unit 451 controls the combining ratio α on the basis of the imaging mode, the photometric amount Q, and the visible light ratio Rc.

Figure 15:
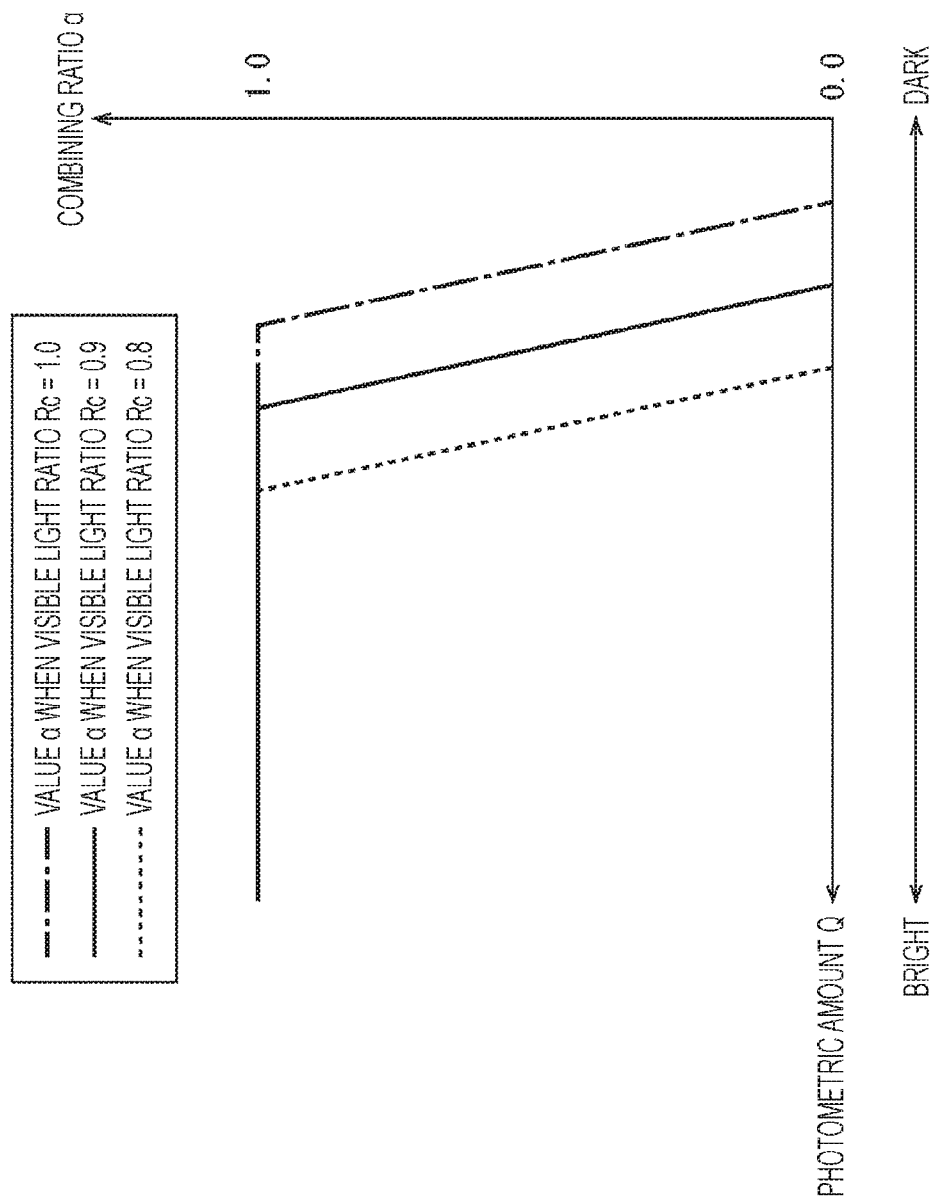
FIG. 15 is a graph illustrating a combining ratio setting example according to the first embodiment.

For example, in a case where the mode is set to the day mode or the CNV mode, the combining ratio control unit 451 uses the graph of FIG. 15 to set the combining ratio α.

In FIG. 15, the vertical axis represents the combining ratio α, and the horizontal axis represents the photometric amount Q. In addition, the one-dot chain line in the figure is an example of setting the combining ratio α in a case where the visible light ratio Rc is 1.0, and the solid line is an example of setting the combining ratio α in a case where the visible light ratio Rc is 0.9. In addition, the dotted line is an example of setting the combining ratio α in a case where the visible light ratio Rc is 0.8.

As illustrated in the figure, the smaller the photometric amount Q or the higher the proportion of the infrared light component, the smaller combining ratio α is set. As a result, the darker the surroundings of the imaging apparatus 100, or the higher the ratio of the infrared light component, it is possible to increase the proportion of the $W_{+IR\_L}$ signal with good S/N ratio. Therefore, this makes it possible to enhance the quality of the image.

In contrast, in a case where the mode is set to the night mode, the combining ratio control unit 451 sets the value of the combining ratio α to zero.

The combining ratio control unit 451 supplies the set combining ratio α to the multiplier 452, and supplies the subtraction result 1−α obtained by subtracting the combining ratio α from one to the multiplier 453.

Note that while the combining ratio control unit 451 is provided in the image processing unit 107, it is also allowable to provide the combining ratio control unit 451 in the control unit 102, for example.

The multiplier 452 multiplies the luminance signal $Y_L$ by the combining ratio α and supplies the multiplication result to the adder 454.

The multiplier 453 multiplies the $W_{+IR\_L}$ signal by the subtraction result 1−α from the combining ratio control unit 451, and supplies the multiplication result to the adder 454.

The adder 454 adds individual multiplication results of the multipliers 452 and 453, and supplies the addition result to the RGB conversion unit 355 as the luminance signal $Y_L'$.

Accordingly, in a case where the mode is set to the day mode or the CNV mode, the luminance signal $Y_L'$ is expressed by the following Formula (28).

$$Y_L'=\alpha \times Y_L+(1-\alpha) \times W_{+IR\_L} \quad (28)$$

As illustrated in FIG. 15 described above, in a case where the photometric amount Q is a predetermined level or above, the combining ratio α is set to one. Therefore, the luminance signal $Y_L'$ includes solely the luminance signal $Y_L$ generated from the pixel signals of the R pixel, the G pixel, and the B pixel.

In contrast, the smaller the photometric amount Q or the higher the proportion of the infrared light component, the smaller combining ratio α is set. As a result, the darker the surroundings of the imaging apparatus 100, or the higher the ratio of the infrared light component, it is possible to increase the proportion of the $W_{+IR\_L}$ signal with good S/N ratio in the luminance signal $Y_L'$.

In contrast, in a case where the mode is set to the night mode, the luminance signal $Y_L'$ is given by the following Formula (29).

$$Y_L'=W_{+IR\_L} \quad (29)$$

That is, in a case where the mode is set to the night mode, the luminance signal $Y_L'$ includes solely the $W_{+IR\_L}$ signal having a good S/N ratio.

Therefore, reproducibility of low frequency luminance information is enhanced in particular and image quality is enhanced in any imaging mode.

{Exemplary Configuration of Signal Processing Unit}

Figure 16:
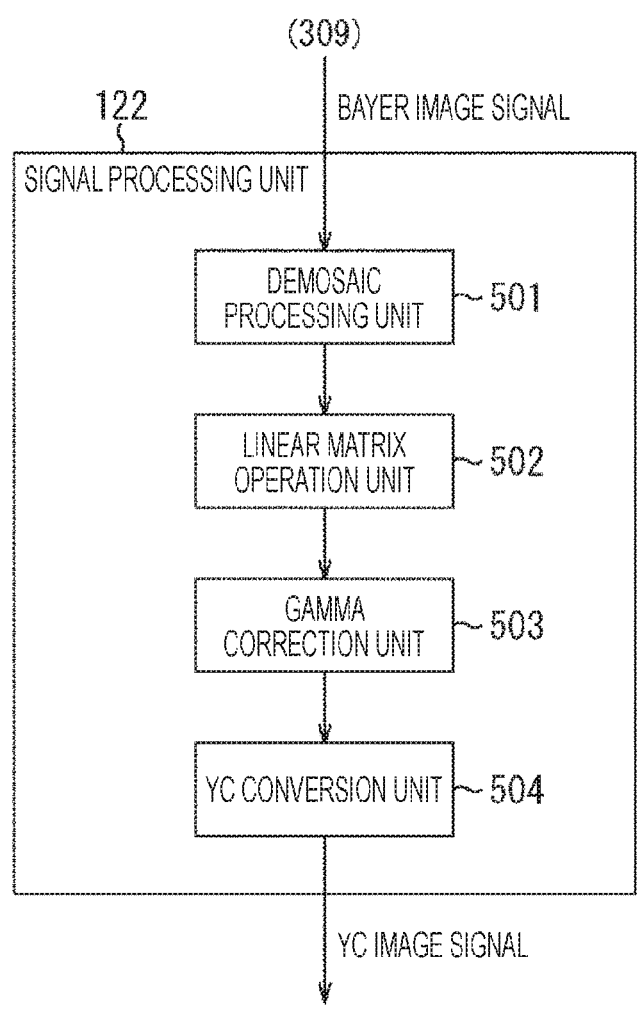
FIG. 16 is a block diagram illustrating an exemplary configuration of a signal processing unit according to the first embodiment.

FIG. 16 is a block diagram illustrating an exemplary configuration of the signal processing unit 122. The signal processing unit 122 includes a demosaic processing unit 501, a linear matrix operation unit 502, a gamma correction unit 503, and a YC conversion unit 504.

The demosaic processing unit 501 converts a Bayer image signal into a demosaiced image signal including an R signal, a G signal, and a B signal for each of image signals using a predetermined demosaicing algorithm. The demosaic processing unit 501 supplies the converted demosaiced image signal to the linear matrix operation unit 502.

The linear matrix operation unit 502 performs linear matrix operation for the purpose of enhancing color reproducibility. The linear matrix operation unit 502 performs, for example, the linear matrix operation expressed by the following Formulas (30) to (32).

$$R' = R + k_a \times (R-G) + k_b \times (R-B) \quad (30)$$

$$G' = R + k_c \times (G-R) + k_d \times (G-B) \quad (31)$$

$$B' = B + k_e \times (B-R) + k_f \times (B-G) \quad (32)$$

In Formulas (30) to (32), $k_a$, $k_b$, $k_c$, $k_d$, $k_e$ and $k_f$ are coefficients of real numbers.

The linear matrix operation unit 502 supplies the R' signal, the G' signal and the B' signal after operation to the gamma correction unit 503. The linear matrix operation changes the signal levels of the luminance signal and the chrominance signal. Therefore, it is desirable to perform correction of the color signal in the chrominance signal correction unit 353 and combining of the luminance signal in the luminance signal combining unit 354 before performing the linear matrix operation. With these correction and combining in the Bayer conversion unit 121 as described above, it is possible to enhance image quality.

The gamma correction unit 503 performs gamma correction corresponding to the characteristics of the display. The gamma correction unit 503 supplies the corrected demosaic image signal to the YC conversion unit 504.

The YC conversion unit 504 converts the R' signal, the G' signal and the B' signal into a luminance signal and a chrominance signal in the demosaiced image. The YC conversion unit 504 performs conversion using, for example, the above-described Formulas (18) to (20), and outputs the converted image signal as a YC image signal. Note that the YC conversion unit 504 uses the R' signal, the G' signal and the B' signal instead of the $R_L$ signal, the $G_L$ signal, and the $B_L$ signal respectively, in the Formulas (18) to (20).

Note that, in a case where the Bayer conversion unit 121 does not include the Bayer image signal output unit 309 as described above, the signal processing unit 122 may be configured without the demosaic processing unit 501.

{Processing of Imaging Apparatus 100}

Next, processing of the imaging apparatus 100 will be described with reference to FIGS. 17 to 24.

(Imaging Mode Setting Processing)

First, imaging mode setting processing executed by the imaging apparatus 100 will be described with reference to a flowchart in FIG. 17. This processing is executed at a predetermined timing, for example, at the time of starting imaging, every predetermined interval during imaging or the like.

In step S1, the imaging apparatus 100 turns off the emission of infrared light and the pixel-by-pixel shutter. Specifically, the control unit 102 controls the infrared light emission unit 103 to turn off the light. In addition, the control unit 102 controls the imaging element 106 to turn off the pixel-by-pixel shutter.

In step S2, the control unit 102 turns on the infrared ray separation unit 303.

Figure 18:
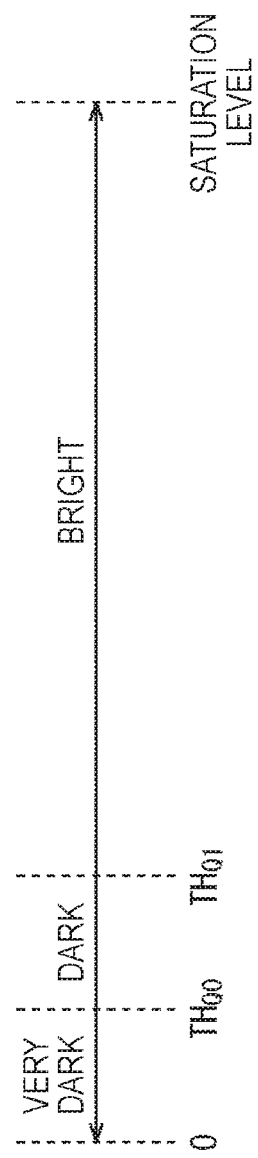
FIG. 18 is a diagram illustrating an exemplary threshold used for a surrounding brightness determination processing.

In step S3, the control unit 102 determines the surrounding brightness. For example, as illustrated in FIG. 18, the control unit 102 divides the surrounding brightness into three stages of "bright", "dark", and "very dark" on the basis of the photometric amount Q by the photometry unit 101. Specifically, a threshold $TH_{Q0}$ and a threshold $TH_{Q1}$ are preset within a range from the photometric amount Q of zero to a level at which the photoelectric conversion element of the imaging element 106 is saturated. Then, in a case where the photometric amount Q≥ the threshold $TH_{Q1}$, the control unit 102 determines that the surroundings are bright. In a case where the threshold $TH_{Q0}$≤ the photometric amount Q< the threshold $TH_{Q1}$, the control unit 102 determines that the surroundings are dark. In a case where the photometric amount Q< the threshold $TH_{Q0}$, the control unit 102 determines that the surroundings are very dark. Then, in a case where it is determined that the surroundings are dark, the processing proceeds to step S4.

In step S4, the control unit 102 determines the intensity of the ambient infrared light. Specifically, as described above, the ratio calculation unit 305 calculates the visible light ratio Rc using Formulas (12) to (14), and supplies the calculated ratio to the control unit 102.

Figure 19:
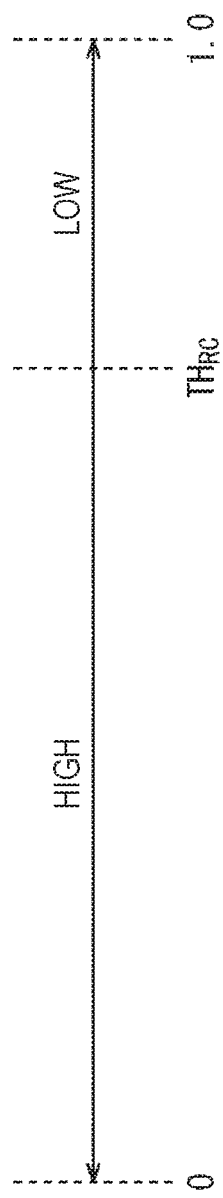
FIG. 19 is a diagram illustrating exemplary threshold used for ambient infrared light intensity determination processing.

The control unit 102 determines the intensity of the ambient infrared light on the basis of the visible light ratio Rc. For example, as illustrated in FIG. 19, the threshold $TH_{Rc}$ is preset within the range of 0 to 1 of the visible light ratio Rc. In a case where the visible light ratio Rc≥$TH_{Rc}$, the control unit 102 determines that the intensity of the ambient infrared light is low, and determines that the intensity of the ambient infrared light is high in a case where the visible light ratio Rc<$TH_{Rc}$. Then, in a case where it is determined that the intensity of the ambient infrared light is high, the processing proceeds to step S5.

In contrast, in a case where it is determined in step S3 that the surroundings are very dark, the processing of step S4 is skipped and the processing proceeds to step S5.

In step S5, the control unit 102 sets the mode to the night mode. That is, the control unit 102 sets the mode to the night mode in a case where the surroundings are in a very dark state, or in a case where the environment is dark and the intensity of the ambient infrared light is high. The control unit 102 supplies a mode signal indicating that the mode is set to the night mode to the chroma gain control unit 401 and the combining ratio control unit 451.

In step S6, the infrared light emission unit 103 starts continuous emission of infrared light under the control of the control unit 102. At this time, the pixel-by-pixel shutter remains turned off.

Note that examples of the emission period of the infrared light and the exposure period of each of pixels in a case where the mode is set to the night mode will be described below with reference to FIG. 24.

In step S7, the control unit 102 turns off the infrared ray separation unit 303.

Thereafter, the imaging mode setting processing is finished.

In contrast, in a case where it is determined in step S4 that the intensity of the ambient infrared light is low, the processing proceeds to step S8.

In step S8, the control unit 102 sets the mode to the CNV mode. That is, in a case where the surroundings are dark and the intensity of the ambient infrared light is low, the control unit 102 sets the mode to the CNV mode. The control unit 102 supplies a mode signal indicating that the mode is set to the CNV mode to the chroma gain control unit 401 and the combining ratio control unit 451.

In step S9, the imaging apparatus 100 starts intermittent emission of the infrared light and turns on the pixel-by-pixel shutter. Specifically, the imaging apparatus 100 controls the infrared light emission unit 103 to start intermittent emission of infrared light. In addition, the control unit 102 controls the imaging element 106 to turn on the pixel-by-pixel shutter.

Note that examples of the emission period of the infrared light and the exposure period of each of pixels in a case where the mode is set to the CNV mode will be described below with reference to FIG. 23.

In step S10, the control unit 102 turns off the infrared ray separation unit 303.

Thereafter, the imaging mode setting processing is finished.

In contrast, in a case where it is determined in step S3 that the surroundings are bright, the processing proceeds to step S11.

In step S11, the control unit 102 sets the mode to the day mode. The control unit 102 supplies a mode signal indicating that the mode is set to the day mode to the chroma gain control unit 401 and the combining ratio control unit 451.

In step S12, the control unit 102 controls the imaging element 106 to turn on the pixel-by-pixel shutter. At this time, the infrared light emission unit 103 remains turned off. In addition, the infrared ray separation unit 303 remains turned on.

Note that examples of the emission period of infrared light and the exposure period of each of pixels in a case where the mode is set to the day mode will be described below with reference to FIG. 22.

Thereafter, the imaging mode setting processing is finished.

(Imaging Processing)

First, imaging processing executed by the imaging apparatus 100 will be described with reference to a flowchart in FIG. 20.

In step S101, the imaging element 106 captures an RGBW image. Specifically, the imaging element 106 captures an image of the light received through the imaging lens 104 and the optical filter 105, supplies the RGBW image signal obtained as a result of the imaging to the RGBW interpolation filter 301 and the W interpolation filter 302.

In step S102, the imaging apparatus 100 executes Bayer conversion processing. Now, details of the Bayer conversion processing will be described with reference to the flowchart of FIG. 21.

In step S151, the RGBW interpolation filter 301 and the W interpolation filter 302 perform pixel interpolation.

More specifically, as described above, the RGBW interpolation filter 301 interpolates all of the color signals for each of pixels in the RGBW image signal. The RGBW interpolation filter 301 supplies an $R_{+IR\_L}$ signal, a $G_{+IR\_L}$ signal, and a $B_{+IR\_L}$ signal after interpolation to the infrared ray separation unit 303, while supplies a $W_{+IR\_L}$ signal after interpolation to the infrared ray separation unit 303, the ratio calculation unit 305, the high frequency component extraction unit 307, the high frequency component restoration unit 308, the saturation achromatization unit 352, and the multiplier 453.

The W interpolation filter 302 interpolates the $W_{+IR}$ signal for each of pixels in the RGBW image signal as described above. W interpolation filter 302 supplies a $W_{+IR}'$ signal after interpolation to the high frequency component extraction unit 307.

In step S152, it is determined whether the infrared ray separation unit 303 is turned on. In a case where it is determined that the infrared ray separation unit 303 is turned on, the processing proceeds to step S153.

In step S153, the infrared ray separation unit 303 separates and removes infrared light components. Specifically, as described above, the infrared ray separation unit 303 separates and removes infrared light components from each of the $R_{+IR\_L}$ signal, the $G_{+IR\_L}$ signal, and the $B_{+IR\_L}$ signal. The infrared ray separation unit 303 supplies the $R_L$ signal, the $G_L$ signal, and the $B_L$ signal from which the infrared light components have been removed, to the white balance processing unit 304. Moreover, the infrared ray separation unit 303 supplies the separated infrared light component IR to the ratio calculation unit 305.

As described above, the white balance processing unit 304 adjusts the white balance in the $R_L$ signal, the $G_L$ signal, and the $B_L$ signal, and supplies the $R_L$ signal, the $G_L$ signal, and the $B_L$ signal having the adjusted white balance to the YC conversion unit 351.

Thereafter, the processing proceeds to step S154.

In contrast, in a case where it is determined in step S152 that the infrared ray separation unit 303 is turned off, the processing in step S153 is skipped and the processing proceeds to step S154. At this time, the $R_{+IR\_L}$ signal, the $G_{+IR\_L}$ signal, and the $B_{+IR\_L}$ signal input to the infrared ray separation unit 303 are directly supplied to the YC conversion unit 351 as the $R_L$ signal, the $G_L$ signal and the $B_L$ signal without separating or removing the infrared light component.

In step S154, the chroma gain control unit 401 and the combining ratio control unit 451 determine whether the mode is set to the night mode. In a case where it is determined that the mode is set to the night mode, the processing proceeds to step S155.

In step S155, the luminance/chrominance adjustment unit 306 adjusts the luminance and chrominance for the night mode.

Specifically, as described above, the YC conversion unit 351 converts the $R_L$ signal, the $G_L$ signal, and the $B_L$ signal into a luminance signal $Y_L$ and chrominance signals Cr and Cb for each of pixels. The YC conversion unit 351 supplies the luminance signal $Y_L$ and the chrominance signals Cr and Cb to the saturation achromatization unit 352.

As described above, the saturation achromatization unit 352 performs achromatization of the luminance signal $Y_L$ and the chrominance signals Cr and Cb. The saturation achromatization unit 352 supplies the achromatized chrominance signal Cr to the multiplier 402 and supplies the achromatized chrominance signal Cb to the multiplier 403. In addition, the saturation achromatization unit 352 supplies the achromatized luminance signal $Y_L$ to the multiplier 452.

The chroma gain control unit 401 sets the chroma gain Gc to zero. The chroma gain control unit 401 supplies the set chroma gain Gc to the multipliers 402 and 403.

The multiplier 402 multiplies the chrominance signal Cr by the chroma gain Gc (=0), and supplies the chrominance signal Cr' as a multiplication result to the RGB conversion unit 355.

The multiplier 403 multiplies the chrominance signal Cb by the chroma gain Gc (=0), and supplies the chrominance signal Cb' as a multiplication result to the RGB conversion unit 355.

The combining ratio control unit 451 sets the combining ratio α to zero. The combining ratio control unit 451 supplies the set combining ratio α to the multiplier 452, and supplies the subtraction result 1−α obtained by subtracting the combining ratio α from one to the multiplier 453.

The multiplier 452 multiplies the luminance signal $Y_L$ by the combining ratio α (=0), and supplies a multiplication result to the adder 454.

The multiplier 453 multiplies the $W_{+IR\_L}$ signal by the subtraction result 1−α (=1) from the combining ratio control unit 451 and supplies a multiplication result to the adder 454.

The adder 454 adds individual multiplication results of the multipliers 452 and 453, and supplies the addition result to the RGB conversion unit 355 as the luminance signal $Y_L'$.

As described above, the RGB conversion unit 355 converts the luminance signal $Y_L'$ and the chrominance signals Cr' and Cb' into the $R_L$ signal, the $G_L$ signal, and the $B_L$ signal for each of pixels, and supplies the signals to the high frequency component restoration unit 308.

Note that the image containing the $R_L$ signal, the $G_L$ signal, and the $B_L$ signal is a monochrome image since the chrominance signals Cr' and Cb' are zero.

Thereafter, the processing proceeds to step S157.

In contrast, in a case where it is determined in step S154 that the mode is set to the day mode or the CNV mode, the processing proceeds to step S156.

In step S156, the luminance/chrominance adjustment unit 315 adjusts the luminance and chrominance for the day mode and the CNV mode.

Specifically, as described above, the YC conversion unit 351 converts the $R_L$ signal, the $G_L$ signal, and the $B_L$ signal into a luminance signal $Y_L$ and chrominance signals Cr and Cb for each of pixels. The YC conversion unit 351 supplies the luminance signal $Y_L$ and the chrominance signals Cr and Cb to the saturation achromatization unit 352.

As described above, the saturation achromatization unit 352 performs achromatization of the luminance signal $Y_L$ and the chrominance signals Cr and Cb. The saturation achromatization unit 352 supplies the achromatized chrominance signal Cr to the multiplier 402 and supplies the achromatized chrominance signal Cb to the multiplier 403. In addition, the saturation achromatization unit 352 supplies the achromatized luminance signal $Y_L$ to the multiplier 452.

As described above, the ratio calculation unit 305 calculates the visible light ratio Rc, and supplies the calculated ratio to the control unit 102, the chroma gain control unit 401, and the combining ratio control unit 451.

As described above, the chroma gain control unit 401 sets the chroma gain Gc using the graph of FIG. 13 on the basis of the photometric amount Q and the visible light ratio Rc. The chroma gain control unit 401 supplies the set chroma gain Gc to the multipliers 402 and 403.

The multiplier 402 multiplies the chrominance signal Cr by the chroma gain Gc and supplies the chrominance signal Cr' as a result of multiplication to the RGB conversion unit 355.

The multiplier 403 multiplies the chrominance signal Cb by the chroma gain Gc, and supplies the chrominance signal Cb' as a result of multiplication to the RGB conversion unit 355.

As described above, the combining ratio control unit 451 sets the combining ratio α using the graph of FIG. 15 on the basis of the photometric amount Q and the visible light ratio Rc. The combining ratio control unit 451 supplies the set combining ratio α to the multiplier 452, and supplies the subtraction result 1−α obtained by subtracting the combining ratio α from one to the multiplier 453.

The multiplier 452 multiplies the luminance signal $Y_L$ by the combining ratio α and supplies the multiplication result to the adder 454.

The multiplier 453 multiplies the $W_{+IR\_L}$ signal by the subtraction result 1−α from the combining ratio control unit 451, and supplies the multiplication result to the adder 454.

The adder 454 adds individual multiplication results of the multipliers 452 and 453, and supplies the addition result to the RGB conversion unit 355 as the luminance signal $Y_L'$.

As described above, the RGB conversion unit 355 converts the luminance signal $Y_L'$ and the chrominance signals Cr' and Cb' into the $R_L$ signal, the $G_L$ signal, and the $B_L$ signal for each of pixels, and supplies the signals to the high frequency component restoration unit 308.

Thereafter, the processing proceeds to step S157.

In step S157, the high frequency component extraction unit 307 extracts the high frequency component $W_{+IR\_H}$ on the basis of the $W_{+IR\_L}$ signal and the $W_{+IR'}$ signal as described above. The high frequency component extraction unit 307 supplies the extracted high frequency component $W_{+IR\_H}$ to the high frequency component restoration unit 308.

In step S158, the high frequency component restoration unit 308 restores the high frequency component $W_{+IR\_H}$ on the basis of the $R_L$ signal, the $G_L$ signal, and the $B_L$ signal as described above. The high frequency component restoration unit 308 supplies the restored R signal, G signal, and B signal in which the high frequency components have been restored to the Bayer image signal output unit 309.

In step S159, the Bayer image signal output unit 309 arranges the R signal, the G signal, and the B signal in the Bayer array and supplies the B signal as a Bayer image signal to the demosaic processing unit 501.

Thereafter, the Bayer conversion processing is finished.

Returning to FIG. 20, in step S103, the signal processing unit 122 performs signal processing.

More specifically, as described above, the demosaic processing unit 501 converts the Bayer image signal into a demosaic image signal containing the R signal, the G signal, and the B signal for each image signal, and supplies the converted demosaic image signal to the linear matrix operation unit 502.

As described above, the linear matrix operation unit 502 performs linear matrix operation on the demosaic image signal and supplies the demosaic image signal after the operation to the gamma correction unit 503.

The gamma correction unit 503 performs gamma correction of the demosaic image signal corresponding to the characteristics of the display, and supplies the corrected demosaic image signal to the YC conversion unit 504.

As described above, the YC conversion unit 504 converts the demosaic image signal into a YC image signal, and outputs the converted YC image signal.

In step S104, the control unit 102 determines whether to stop imaging. In a case where it is determined that imaging is not to be stopped, the processing returns to step S101, and the processing of steps S101 to S104 is repeatedly executed until it is determined in step S104 that imaging is to be stopped.

In contrast, in step S104, the control unit 102 determines that imaging is to be stopped, for example, in a case where predetermined operation is performed by the user, in a case where the imaging continuation time has elapsed, or the like, and the imaging processing is finished.

Note that an example of the emission period of infrared light and the exposure period of each of pixels in each of the imaging modes will be described with reference to FIGS. 22 to 24. Note that in FIGS. 22 to 24, the period from time t0 to t4, the period from time t4 to time t8 is one frame period.

Figure 22:
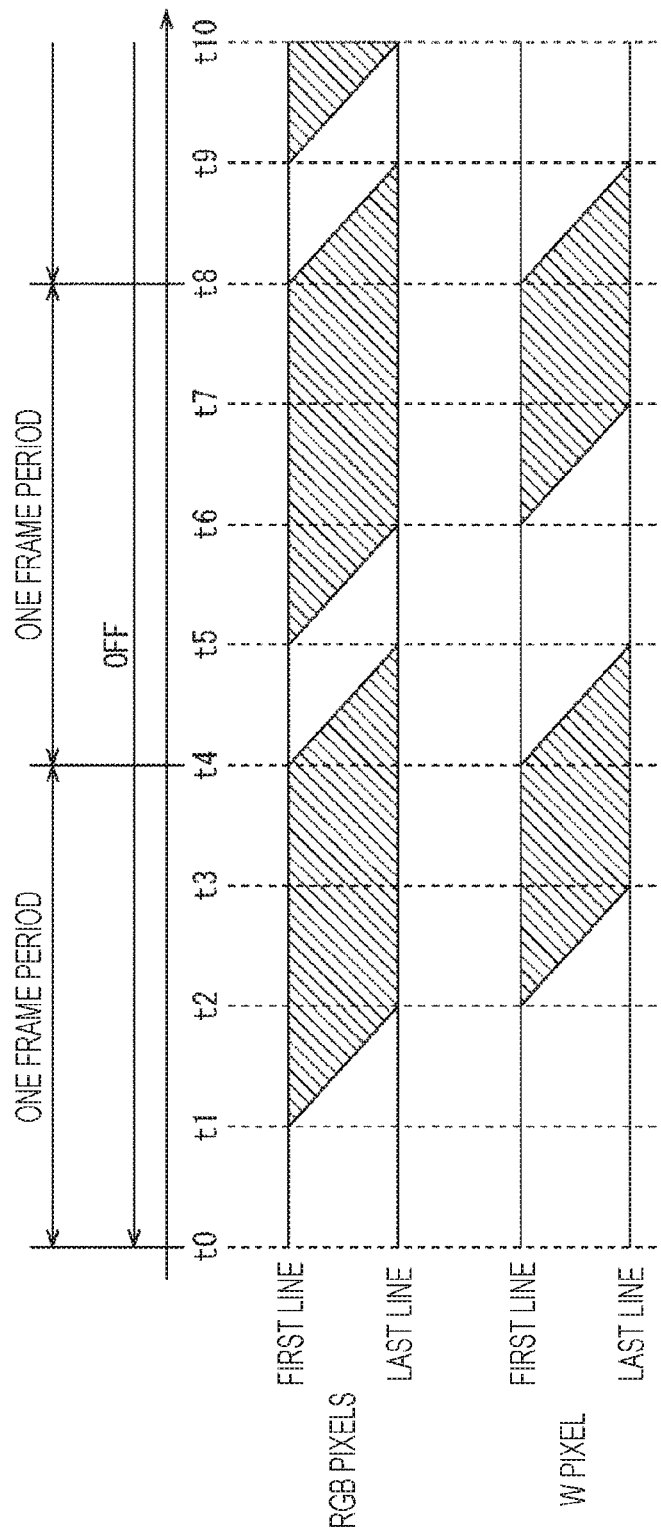
FIG. 22 is a diagram illustrating an example of the emission period of infrared light and the exposure period of each of pixels in a day mode according to the first embodiment.

FIG. 22 illustrates an example of an emission period of infrared light and an exposure period of each of pixels in a case where the mode is set to the day mode. In a case where the mode is set to the day mode, the exposure period is shifted row by row in accordance with a sweep direction from the first row to the last row of the pixel array unit 202 of the imaging element 106. Moreover, by turning on the pixel-by-pixel shutter, different exposure periods are set for R pixel, G pixel and B pixel (hereinafter referred to as color pixel) and W pixel, even for pixels on the same row.

For example, the exposure period of the color pixels of the first row of the pixel array unit 202 is started at time t1. Thereafter, at predetermined time intervals, the exposure period of the color pixels of each of the rows of the pixel array unit 202 is started in the order of the sweep direction. Then, the exposure period of the color pixels of the last row of the pixel array unit 202 is started at the time t2. In this manner, the exposure periods of the color pixels are started in the order of the sweep direction at predetermined time intervals in the period from time t1 to time t2.

Next, at time t4, the exposure period of the color pixels of the first row of the pixel array unit 202 is finished and the charge signals obtained during the exposure period are read. Thereafter, at predetermined time intervals, the exposure period of the color pixels of each of rows of the pixel array unit 202 is finished in the order of the sweep direction, and the charge signal obtained during the exposure period is read. Next, at time t5, the exposure period of the color pixels of the last row of the pixel array unit 202 is finished and the charge signals obtained during the exposure period are read. In this manner, in the period from time t4 to time t5, the exposure period of the color pixels is finished in the order of the sweep direction at a predetermined time interval, and the charge signal obtained during the exposure period is read.

Next, in the period from time t5 to time t6, the exposure periods of the color pixels are started in the order of the sweep direction at predetermined time intervals, similarly to the period from time t1 to time t2.

Next in the period from time t8 to time t9, the exposure period of the color pixels is finished in the order of the sweep direction at a predetermined time interval, and the charge signal obtained during the exposure period is read, similarly to the period from time t4 to time t5.

After this, similar processing is repeated.

In contrast, the exposure period of the W pixel of the first row of the pixel array unit 202 is started at time t2. Thereafter, at predetermined time intervals, the exposure period of the W pixels of each of the rows of the pixel array unit 202 is started in the order of the sweep direction. Then, the exposure period of the W pixel of the last row of the pixel array unit 202 is started at time t3. In this manner, the exposure periods of the W pixels are started in the order of the sweep direction at predetermined time intervals in the period from time t2 to time t3.

Next, at time t4, the exposure period of the W pixels of the first row of the pixel array unit 202 is finished and the charge signals obtained during the exposure period are read. Thereafter, at predetermined time intervals, the exposure period of the W pixels of each of rows of the pixel array unit 202 is finished in the order of the sweep direction, and the charge signal obtained during the exposure period is read. Then, at time t5, the exposure period of the W pixels of the last row of the pixel array unit 202 is finished and the charge signals obtained during the exposure period are read. In this manner, in the period from time t4 to time t5, the exposure period of the W pixels is finished in the order of the sweep direction at a predetermined time interval, and the charge signal obtained during the exposure period is read.

Next, in the period from time t6 to time t7, the exposure periods of the W pixels are started in the order of the sweep direction at predetermined time intervals similar to the period from time t2 to time t3.

Next in the period from time t8 to time t9, the exposure period of the W pixels is finished in the order of the sweep direction at a predetermined time interval, and the charge signal obtained during the exposure period is read, similarly to the period from time t4 to time t5.

After this, similar processing is repeated.

Note that in a case where the mode is set to day mode, the intensity of ambient light is sufficient, and thus, emission of infrared light is not performed.

As described above, in a case where the mode is set to the day mode, exposure periods of color pixels and W pixels are set within each of frame periods.

In addition, the exposure period of the color pixel is set longer than the exposure period of the W pixel in consideration that the sensitivity of the W pixel is higher than that of the color pixel. This optimizes the S/N ratio of the image.

Note that it is also possible to set exposure periods of color pixels and W pixels to the same length.

Figure 23:
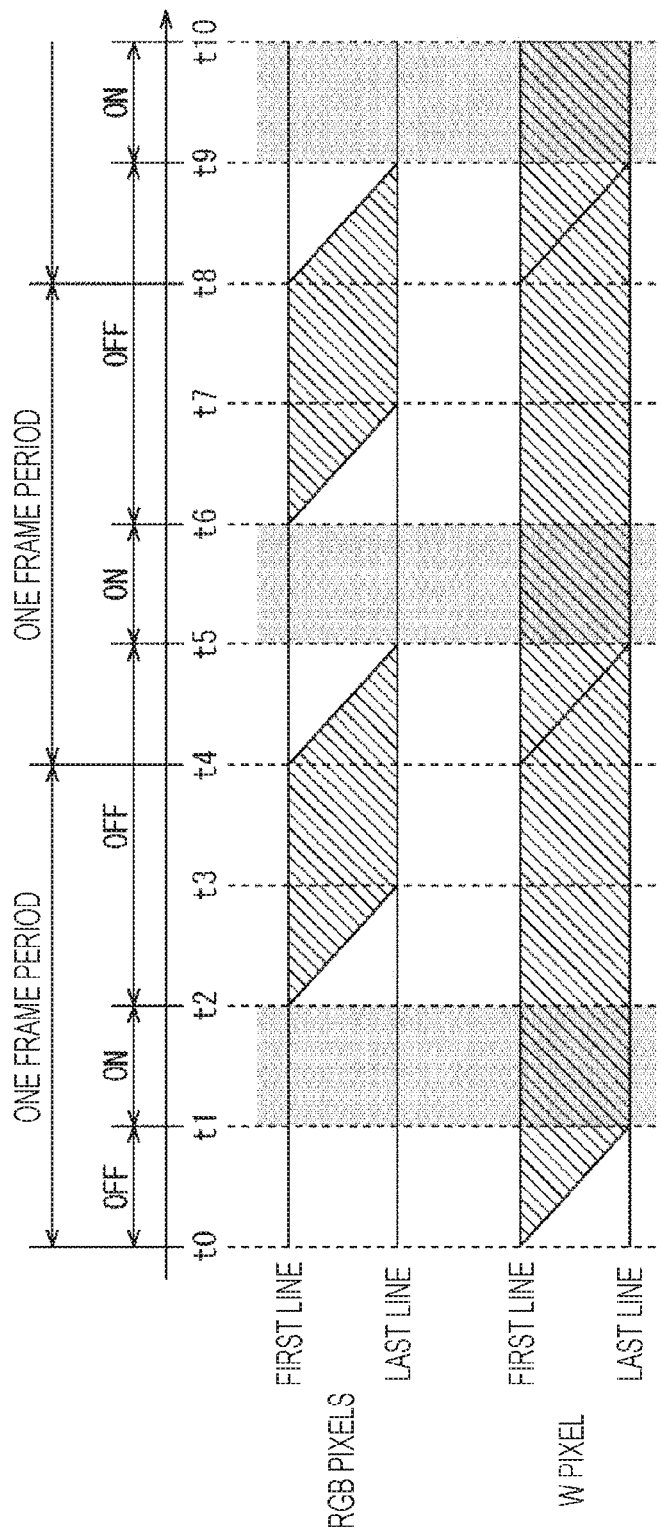
FIG. 23 is a diagram illustrating an example of an emission period of infrared light and an exposure period of each of pixels in the CNV mode according to the first embodiment.

FIG. 23 illustrates an example of the emission period of infrared light and the exposure period of each of pixels in a case where the mode is set to the CNV mode. In a case where the mode is set to the CNV mode, the exposure period is shifted row by row in accordance with a sweep direction from the first row to the last row of the pixel array unit 202 of the imaging element 106, similarly to the case where the mode is set to the day mode. In addition, with the pixel-by-pixel shutter turned on, the exposure periods of the pixels of the same row are shifted between the color pixels and the W pixels.

For example, the exposure periods of the color pixels are started at predetermined time intervals in the order of the sweep direction in the period from time t2 to time t3.

Next, in the period from time t4 to time t5, the exposure period of the color pixels is finished in the order of the sweep direction at a predetermined time interval, and the charge signal obtained during the exposure period is read.

Next, in this manner, the exposure periods of the color pixels are started in the order of the sweep direction at predetermined time intervals in the period from time t6 to time t7.

Next, in the period from time t8 to time t9, the exposure period of the color pixels is finished in the order of the sweep direction at a predetermined time interval, and the charge signal obtained during the exposure period is read.

After this, similar processing is repeated.

In contrast, the exposure periods of the W pixels are started in the order of the sweep direction at predetermined time intervals in the period from time t0 to time t1.

Next, at time t4, the exposure period of the W pixels of the first row of the pixel array unit 202 is finished and the charge signals obtained during the exposure period are read. After reading the charge signal, a new exposure period of W pixels in the first row of the pixel array unit 202 is started. Thereafter, at predetermined time intervals, the exposure period of the W pixels of each of rows of the pixel array unit 202 is finished in the order of the sweep direction, and the charge signal obtained during the exposure period is read to start a new exposure period. Then, at time t5, the exposure period of the W pixels of the last row of the pixel array unit 202 is finished and the charge signals obtained during the exposure period are read, and a new exposure period is started. In this manner, in the period from time t4 to time t5, the exposure period of the W pixels is finished in the order of the sweep direction and the charge signal obtained during the exposure period is read, and then, and a new exposure period is started.

Next in the period from time t8 to time t9, the exposure period of the W pixels is finished in the order of the sweep direction and the charge signal obtained during the exposure period is read, similarly to the period from time t4 to time t5, and then, and a new exposure period is started.

After this, similar processing is repeated.

As described above, the exposure periods of color pixels and W pixels are set within each of frame periods. In addition, the exposure period of the W pixels for receiving infrared light is set longer than the exposure period of color pixels not used for receiving infrared light. Furthermore, each of the frame periods includes a period in which the exposure periods of the W pixel and the color pixel do not overlap, such as the period from time t1 to time t2, the period from time t5 to time t6, and the period from time t9 to time t10, more specifically, a period during which all the W pixels are exposed and none of the color pixels are exposed (hereinafter referred to as a single exposure period).

Meanwhile, the infrared light is emitted in a portion of each of frame periods. Specifically, infrared light is intensively emitted within the single exposure period of each of the frame periods.

Note that there is no need to emit the infrared light in the entire period of the single exposure period, and infrared light may be emitted in a portion of the single exposure period.

As described above, in a case where the mode is set to the CNV mode, the W pixel alone receives the infrared light from the infrared light emission unit 103, and the color pixel does not receive the infrared light from the infrared light emission unit 103.

Note that as described above, the color information is generated from the pixel signal of the color pixel, and with a configuration in which the color pixel does not receive the emitted infrared light, it is possible to prevent reduction of color reproducibility.

In contrast, as described above, luminance information is generated mainly from pixel signals of W pixels. More precisely, the high frequency component of the luminance information is generated mainly from the pixel signal of the W pixel, while the low frequency component of the luminance information is generated mainly from the pixel signal of the color pixel. Then, with a configuration in which W pixel receives the infrared light, the reproducibility of the luminance component, the high frequency component thereof, in particular, is enhanced even when the surroundings are dark.

This results in enhancement of the image quality of the image generated by the imaging apparatus 100.

Figure 24:
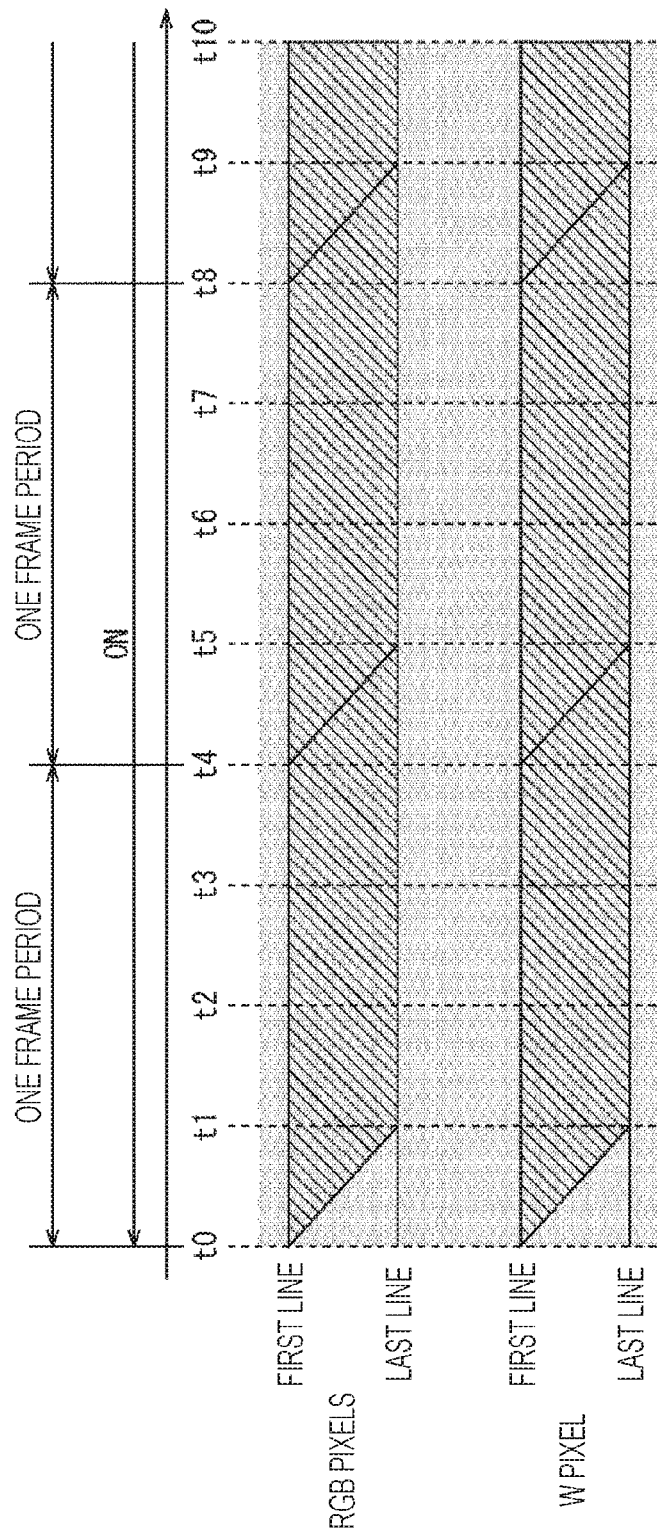
FIG. 24 is a diagram illustrating an example of the emission period of infrared light and the exposure period of each of pixels in a night mode according to the first embodiment.

FIG. 24 illustrates an example of the emission period of infrared light and the exposure period of each of pixels in a case where the mode is set to the night mode. In a case where the mode is set to the night mode, the exposure period is shifted row by row in accordance with a sweep direction from the first row to the last row of the pixel array unit 202 of the imaging element 106, similarly to the case where the mode is set to other modes. In addition, with the pixel-by-pixel shutter turned off, the exposure periods of the color pixels and the W pixels are matched with each other.

For example, the exposure periods of the color pixels and the W pixels are started at predetermined time intervals in the order of the sweep direction in the period from time t0 to time t1.

Next, in the period from time t4 to time t5, the exposure period of the color pixels the W pixels is finished in the order of the sweep direction and the charge signal obtained during the exposure period is read, and then, and a new exposure period is started.

Next, in the period from time t8 to time t9, the exposure period of the color pixels the W pixels is finished in the order of the sweep direction and the charge signal obtained during the exposure period is read, and then, and a new exposure period is started.

After this, similar processing is repeated.

In contrast, infrared light is continuously emitted.

As described above, in a case where the mode is set to the night mode, a monochrome image is generated without using color information. Therefore, with continuous emission of the infrared light, it is possible to enhance the reproducibility of the luminance information and enhance the image quality of the image generated by the imaging apparatus 100.

As described above, with the mode setting to the CNV mode and with emission of infrared light, it is possible to obtain a color image with high image quality even in the dark surroundings without reducing the frame rate.

In addition, there is no need to provide a frame buffer for combining an image captured with emission of infrared light and an image captured without emission of the infrared light, it is possible to suppress expansion of the scale of the circuit and complication of the circuit.

Furthermore, it is possible to obtain a color image with high image quality in both the day mode and the CNV mode without using an IR cut-off filter or inserting/removing the IR cut-off filter.

2. Second Embodiment

Next, a second embodiment of the present technology will be described with reference to FIGS. 25 to 34.

{Configuration of Imaging Apparatus}

Figure 25:
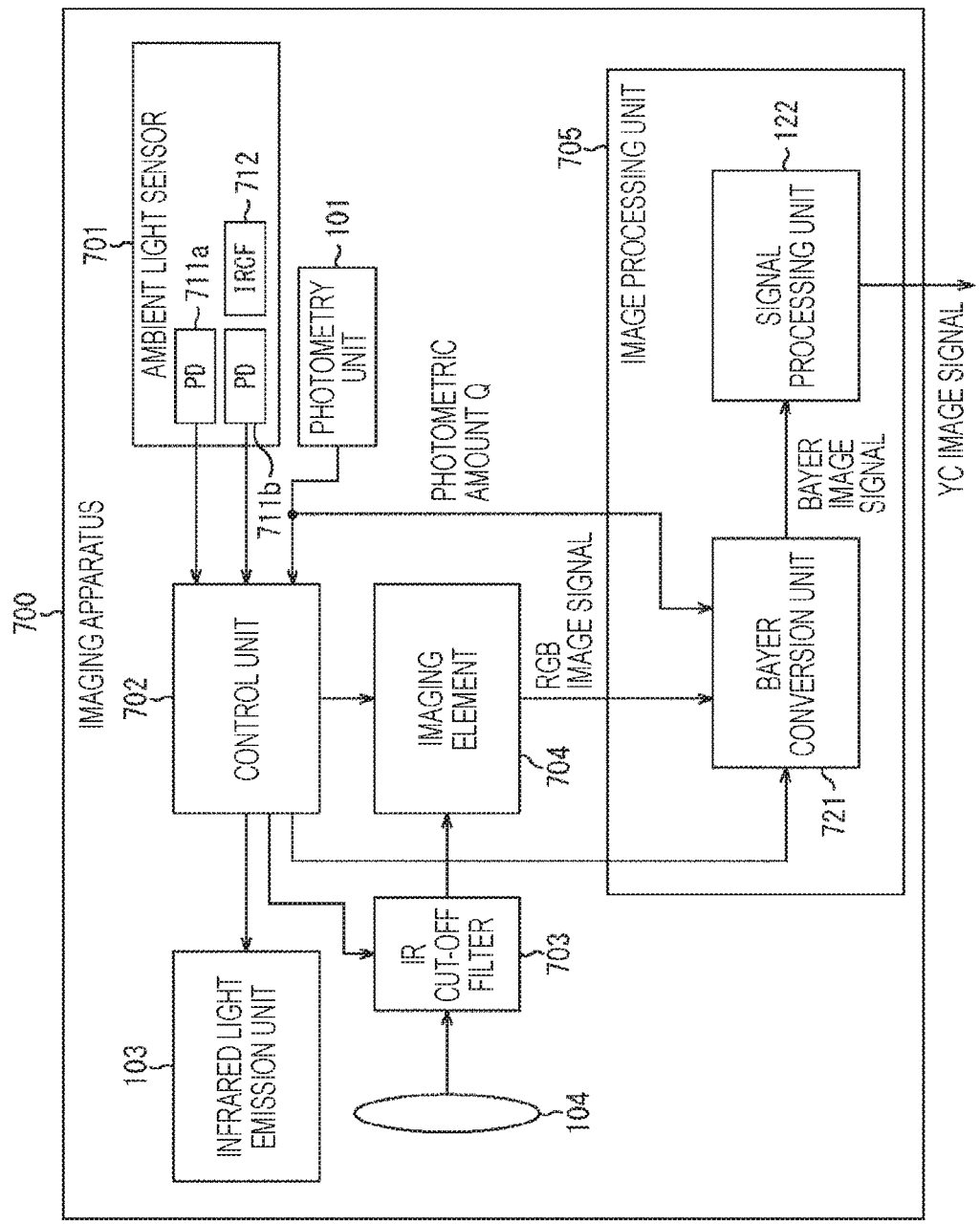
FIG. 25 is a block diagram illustrating an exemplary configuration of an imaging apparatus according to a second embodiment.

FIG. 25 is a block diagram illustrating an exemplary configuration of an imaging apparatus 700 according to the second embodiment of the present technology. Note that in the figure, portions corresponding to those in FIG. 1 are denoted by the same reference numerals.

The imaging apparatus 700 corresponds to the imaging apparatus 100 in FIG. 1 in that it includes the photometry unit 101, the infrared light emission unit 103, and the imaging lens 104. In addition, the imaging apparatus 700 differs from the imaging apparatus 100 in that it includes a control unit 702, an IR cut-off filter 703, an imaging element 704, an image processing unit 705, in place of the control unit 102, the optical filter 105, imaging element 106, and the image processing unit 107, respectively, and that an ambient light sensor 701 is further provided. The image processing unit 705 differs from the image processing unit 107 in that a Bayer conversion unit 721 is provided instead of the Bayer conversion unit 121.

The ambient light sensor 701 includes photodiodes 711a and 711b and an IR cut-off filter (IRCF) 712.

The photodiode 711a measures the intensity of ambient light around the imaging apparatus 700. The photodiode 711a supplies the ambient light intensity PDa indicating the measurement result to the control unit 102.

The photodiode 711b measures the ambient light incident through the IR cut-off filter 712, that is, the intensity of the ambient light from which the infrared light component has been attenuated. The photodiode 711b supplies ambient light intensity PDb indicating the measurement result to the control unit 102.

The control unit 702 controls the entire imaging apparatus 700. For example, the control unit 702 calculates the visible light ratio Rc using the following Formula (33), and supplies a result to the Bayer conversion unit 721.

$$Rc=PDb/PDa \quad (33)$$

Moreover, for example, the control unit 702 sets the imaging mode on the basis of the photometric amount Q and the visible light ratio Rc, and supplies a mode signal indicating the set imaging mode to the Bayer conversion unit 721.

Furthermore, for example, in a case where the mode is set to the day mode or the night mode, the control unit 702 sets a low frequency RGB interpolation filter 801 and the high frequency G interpolation filter 802 (FIG. 27) of the Bayer conversion unit 721 as the interpolation filter A. In contrast, for example, in a case where the mode is set to the CNV mode, the control unit 702 sets the low frequency RGB interpolation filter 801 and the high frequency G interpolation filter 802 of the Bayer conversion unit 721 as the interpolation filter B.

Moreover, the control unit 702 controls the imaging element 704 in accordance with user's operation or the like to generate an image signal, for example. The control unit 702 generates a vertical synchronization signal VSYNC indicating ab imaging timing and supplies it to the imaging element 704, for example. Moreover, the control unit 702 controls on/off of the pixel-by-pixel shutter of the imaging element 704 in accordance with the imaging mode.

Furthermore, for example, the control unit 702 controls the emission period of the infrared light emission unit 103 in accordance with the imaging mode.

Moreover, for example, the control unit 702 inserts the IR cut-off filter 703 between the imaging lens 104 and the imaging element 704 in accordance with the imaging mode, removes the IR cut-off filter 703 from between the imaging lens 104 and the imaging element 704.

The IR cut-off filter 703 is removably arranged between the imaging lens 104 and the imaging element 704. The IR cut-off filter 703 attenuates the infrared light component of the light from the imaging lens 104 and transmits light other than the infrared light component.

Figure 26:
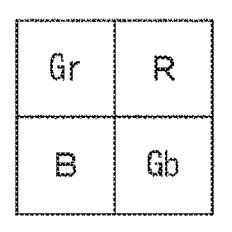

The imaging element 704 differs from the imaging element 106 in the arrangement of pixels. Specifically, the imaging element 704 includes the R pixel, the G pixel, and the B pixel arranged in the Bayer array, as illustrated in FIG. 26. In addition, the G pixel is divided into a Gr pixel and a Gb pixel, and the Gb pixel is set as a pixel for receiving infrared light as described below. In contrast, the R pixel, the Gr pixel, and the B pixel are set as pixels that are not used for receiving the infrared light from the infrared light emission unit 103.

Moreover, the imaging element 704 converts the light received via the imaging lens 104 or via the imaging lens 104 and the IR cut-off filter 703 into an electric signal to generate an RGB image signal. More specifically, an $R_{+IR}$ signal is generated from the R pixel, a $Gr_{+IR}$ signal is generated from the Gr pixel, a $Gb_{+IR}$ signal is generated from the Gb pixel, and a $B_{+IR}$ signal is generated from, the B pixel. The imaging element 704 supplies the generated RGB image signal to the Bayer conversion unit 721.

The Bayer conversion unit 721 converts the RGB image signal into a chrominance signal and a luminance signal, corrects the chrominance signal, and further converts the pixel signals into Bayer image signals arranging the pixel signals in the Bayer array. The Bayer conversion unit 721 supplies the Bayer image signal to the signal processing unit 122.

{Exemplary Configuration of Bayer Conversion Unit}

Figure 27:
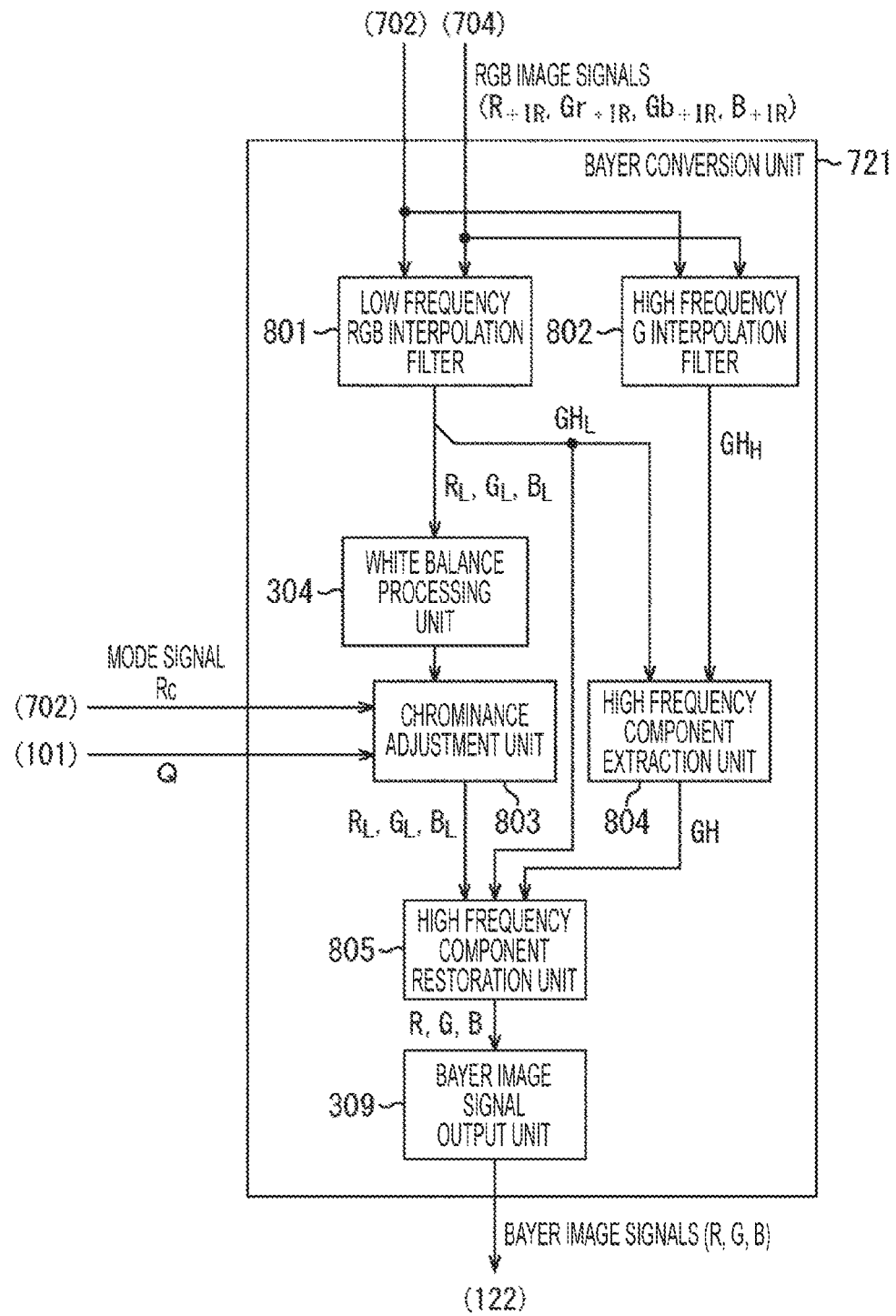
FIG. 27 is a block diagram illustrating an exemplary configuration of a Bayer conversion unit according to the second embodiment.

FIG. 27 is a block diagram illustrating an exemplary configuration of the Bayer conversion unit 721. Note that in the figure, portions corresponding to those in FIG. 6 are denoted by the same reference numerals.

The Bayer conversion unit 721 is similar to the Bayer conversion unit 121 of FIG. 6 in that it includes a white balance processing unit 304 and the Bayer image signal output unit 309. In addition, the Bayer conversion unit 721 differs from the Bayer conversion unit 121 in that it includes the low frequency RGB interpolation filter 801, the high frequency G interpolation filter 802, the chrominance adjustment unit 803, the high frequency component extraction unit 804, and high frequency component restoration unit 805, respectively, in place of the RGBW interpolation filter 301, the W interpolation filter 302, the luminance/chrominance adjustment unit 306, the high frequency component extraction unit 307 and the high frequency component restoration unit 308. In addition, the Bayer conversion unit 721 differs from the Bayer conversion unit 121 in that it does not include the infrared ray separation unit 303 and the ratio calculation unit 305.

The low frequency RGB interpolation filter 801 interpolates all of the color signals for each of pixels signal in the RGB image signal.

For example, even in the case where the low frequency RGB interpolation filter 801 is set as any of the interpolation filter A or the interpolation filter B, pixel signals are sequentially focused and when the focused pixel signal is determined as an interpolation target, the surrounding pixel signal is used with application of the following Formulas (34) to (37) to interpolate the R signal, the Gb signal, the Gr signal and the B signal.

[Mathematical Expression 3]

$$R_L = \sum_{i=0}^{M-1} R_{+IR\_i} \times k_i \quad (34)$$

$$Gr_L = \sum_{i=0}^{M-1} Gr_{+IR\_i} \times k_i \quad (35)$$

$$Gb_L = \sum_{i=0}^{M-1} Gb_{+IR\_i} \times k_i \quad (36)$$

$$B_L = \sum_{i=0}^{M-1} B_{+IR\_i} \times k_i \quad (37)$$

In Formulas (34) to (37), M, i, and ki are similar to the case of the above-described Formulas (1) to (4). Note that, for example, the tap number M is set to 81 (=9 rows×9 columns).

In addition, in a case where the low frequency RGB interpolation filter 801 is set as the interpolation filter A, the filter generates the $G_L$ signal and a $GH_L$ signal for each of pixels using the following Formulas (38) and (39).

$$G_L = (Gr_L + Gb_L)/2 \quad (38)$$

$$GH_L = (Gr_L + Gb_L)/2 \quad (39)$$

That is, in a case where the low frequency RGB interpolation filter 801 is set as the interpolation filter A, both the $G_L$ signal and the $GH_L$ signal are average values of the $Gr_L$ signal and the $Gb_L$ signal of the same pixel.

In addition, in a case where the low frequency RGB interpolation filter 801 is set as the interpolation filter B, the filter generates the $G_L$ signal and a $GH_L$ signal for each of pixels using the following Formulas (40) and (41).

$$G_L = Gr_L \quad (40)$$

$$GH_L = Gb_L \quad (41)$$

That is, in a case where the low frequency RGB interpolation filter 801 is set as the interpolation filter B, the $Gr_L$ signal not including the infrared light component from the infrared light emission unit 103 is selected as the $G_L$ signal. In contrast, the $Gb_L$ signal including the infrared light component from the infrared light emission unit 103 is selected as the $GH_L$ signal.

The low frequency RGB interpolation filter 801 supplies the interpolated $R_L$ signal, the $G_L$ signal, and the $B_L$ signal to the white balance processing unit 304, and supplies the $GH_L$ signal to the high frequency component extraction unit 804 and the high frequency component restoration unit 805.

In this manner, in a case where the low frequency RGB interpolation filter 801 is set as the interpolation filter A, the $R_L$ signal, the $G_L$ signal, and the $B_L$ signal are respectively generated on the basis of the signals $R_{+IR}$ signal, $Gr_{+IR}$ signal, $Gb_{+IR}$ signal, and the $B_{+IR}$ signal. In addition, the $GH_L$ signal is generated on the basis of the $Gr_{+IR}$ signal and the $Gb_{+IR}$ signal.

In this manner, in a case where the low frequency RGB interpolation filter 801 is set as the interpolation filter B, the $R_L$ signal, the $G_L$ signal, and the $B_L$ signal are respectively generated on the basis of the signals $R_{+IR}$ signal, $Gr_{+IR}$ signal, and the $B_{+IR}$ signal. In addition, the $GH_L$ signal is generated on the basis of the $Gb_{+IR}$ signal.

The high frequency G interpolation filter 802 interpolates solely the G signal for each of pixels signal in the RGB image signal.

For example, in a case where the high frequency G interpolation filter 802 is set as the interpolation filter A, the filter interpolates the Gr signal and the Gb signal using the following Formulas (42) and (43).

[Mathematical Expression 4]

$$Gr_H = \sum_{i=0}^{N-1} Gr_{+IR\_i} \times k_i \quad (42)$$

$$Gb_H = \sum_{i=0}^{N-1} Gb_{+IR\_i} \times k_i \quad (43)$$

Note that in the Formulas (42) and (43), N is the tap number. i and ki are similar to the case of the above Formulas (35) and (36), respectively. Note that the tap number N is set to a value smaller than the tap number M of the low frequency RGB interpolation filter, for example. For example, the tap number N is set to 25 (=5 rows×5 columns).

Furthermore, the high frequency G interpolation filter 802 generates a $GH_H$ signal for each of pixels using the following Formula (44).

$$GH_H = (Gr_H + Gb_H)/2 \quad (44)$$

In contrast, in a case where the high frequency G interpolation filter 802 is set as the interpolation filter B, solely the Gb signal containing the infrared light component from the infrared light emission unit 103 is interpolated using the following Formula (45).

[Mathematical Expression 5]

$$GH_H = \sum_{i=0}^{N-1} Gb_{+IR\_i} \times k_i \quad (45)$$

Note that in the Formula (45), N, i, k are the similar to the case of the above-described Formula (43).

The high frequency G interpolation filter 802 supplies each of the interpolated $GH_H$ signals to the high frequency component extraction unit 804.

In this manner, in a case where the high frequency G interpolation filter 802 is set as the interpolation filter A, the $GH_H$ signal is generated on the basis of the $Gr_{+IR}$ signal and the $Gb_{+IR}$ signal. In contrast, in a case where the high frequency G interpolation filter 802 is set as the interpolation filter B, the $GH_H$ signal is generated on the basis of solely the $Gb_{+IR}$ signal.

As described above, the white balance processing unit 304 adjusts the white balance in the $R_L$ signal, the $G_L$ signal, and the $B_L$ signal, and supplies the $R_L$ signal, the $G_L$ signal, and the $B_L$ signal having the adjusted white balance to the chrominance adjustment unit 803.

The chrominance adjustment unit 803 adjusts the chrominance signal on the basis of the visible light ratio Rc and the photometric amount Q in accordance with the imaging mode. Specifically, the chrominance adjustment unit 803 converts the $R_L$ signal, the $G_L$ signal, and the $B_L$ signal in the pixel signal into a luminance signal and a chrominance signal for each of the pixels signals. Then, the chrominance adjustment unit 803 adjusts the chrominance signal on the basis of the visible light ratio Rc and the photometric amount Q in accordance with the imaging mode. Subsequently, the chrominance adjustment unit 803 returns the luminance signal and the chrominance signal to the $R_L$ signal, the $G_L$ signal, and the $B_L$ signal, and then supplies the signals to the high frequency component restoration unit 805.

The high frequency component extraction unit 804 extracts the difference between the $GH_L$ signal from the low frequency RGB interpolation filter 801 and the $GH_H$ signal from the high frequency G interpolation filter 802, as the high frequency component $G_H$. As described above, the tap number N of the high frequency G interpolation filter 802 is smaller than the tap number M of the low frequency RGB interpolation filter 801. Accordingly, the $GH_H$ signal from the G interpolation filter for high frequency 802 contains a frequency component higher than the $GH_L$ signal from the low frequency RGB interpolation filter 801. Therefore, by taking the difference between them, it is possible to extract the high frequency component GH. The high frequency component extraction unit 804 supplies the extracted high frequency component GH to the high frequency component restoration unit 805.

The high frequency component restoration unit 805 restores the high frequency component GH in the $R_L$ signal, the $G_L$ signal, and the $B_L$ signal. The high frequency component restoration unit 805 restores the high frequency component GH using, for example, the following Formulas (46) to (48).

$$R = R_L + GH \times R_L / GH_L \qquad (46)$$

$$G = G_L + GH \times G_L / GH_L \qquad (47)$$

$$B = B_L + GH \times B_L / GH_L \qquad (48)$$

In the Formulas (46) to (48), R, G and B are color signals after restoration. The high frequency components of the individual color signals are lost by the interpolation in the low frequency RGB interpolation filter 801, leading to degradation of the image quality of the image deteriorates with no processing. However, with restoration of the high frequency component by the high frequency component restoration unit 805, image quality is enhanced as compared with the case with no restoration. The high frequency component restoration unit 805 supplies the restored R signal, G signal, and B signal to the Bayer image signal output unit 309.

Note that it is allowable to have a configuration without the Bayer image signal output unit 309 and the image signal may be supplied to the signal processing unit 122 without undergoing Bayer conversion.

{Exemplary Configuration of Chrominance Adjustment Unit}

Figure 28:
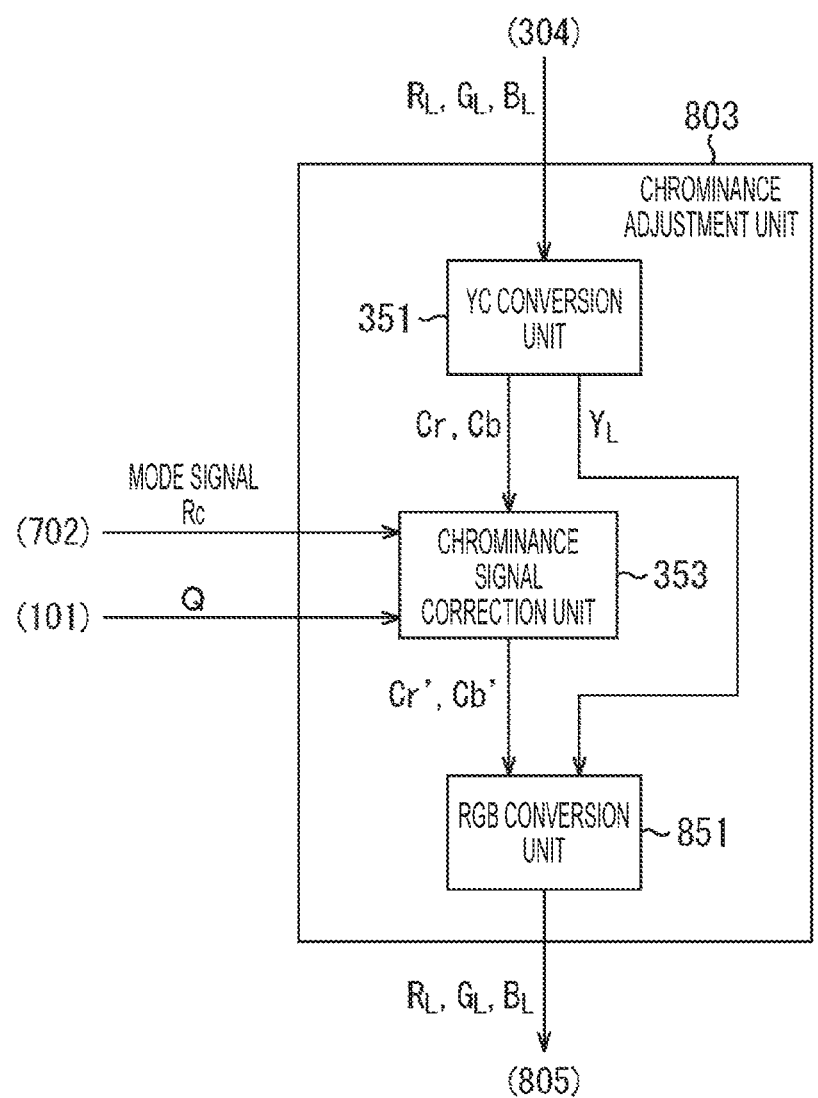
FIG. 28 is a block diagram illustrating an exemplary configuration of a chrominance adjustment unit according to the second embodiment.

FIG. 28 is a block diagram illustrating an exemplary configuration of the chrominance adjustment unit 803. Note that in the figure, portions corresponding to those in FIG. 11 are denoted by the same reference numerals.

The chrominance adjustment unit 803 is similar to the luminance/chrominance adjustment unit 315 of FIG. 11 in that the YC conversion unit 351 and the chrominance signal correction unit 353 are provided. In contrast, the chrominance adjustment unit 803 differs from the luminance/chrominance adjustment unit 315 in that an RGB conversion unit 851 is provided in place of the RGB conversion unit 355, and that the saturation achromatization unit 352 and the luminance signal combining unit 354 has been removed.

The RGB conversion unit 851 obtains the luminance signal $Y_L$ from the YC conversion unit 351 and obtains the chrominance signals Cr' and Cb' from the chrominance signal correction unit 353. Similarly to the RGB conversion unit 355 in FIG. 11, the RGB conversion unit 851 converts the luminance signal $Y_L$ and the chrominance signals Cr' and Cb' into the $R_L$ signal, the $G_L$ signal, and the $B_L$ signal, respectively, using the above-described Formulas (21) to (23). However, the RGB conversion unit 851 uses the luminance signal $Y_L$ instead of the luminance signal $Y_L'$ in the Formulas (21) to (23). The RGB conversion unit 851 supplies the converted $R_L$ signal, $G_L$ signal and $B_L$ signal to the high frequency component restoration unit 805.

{Processing of Imaging Apparatus 700}

Next, the processing of the imaging apparatus 700 will be described with reference to FIGS. 29 to 34.

(Imaging Mode Setting Processing)

Figure 29:
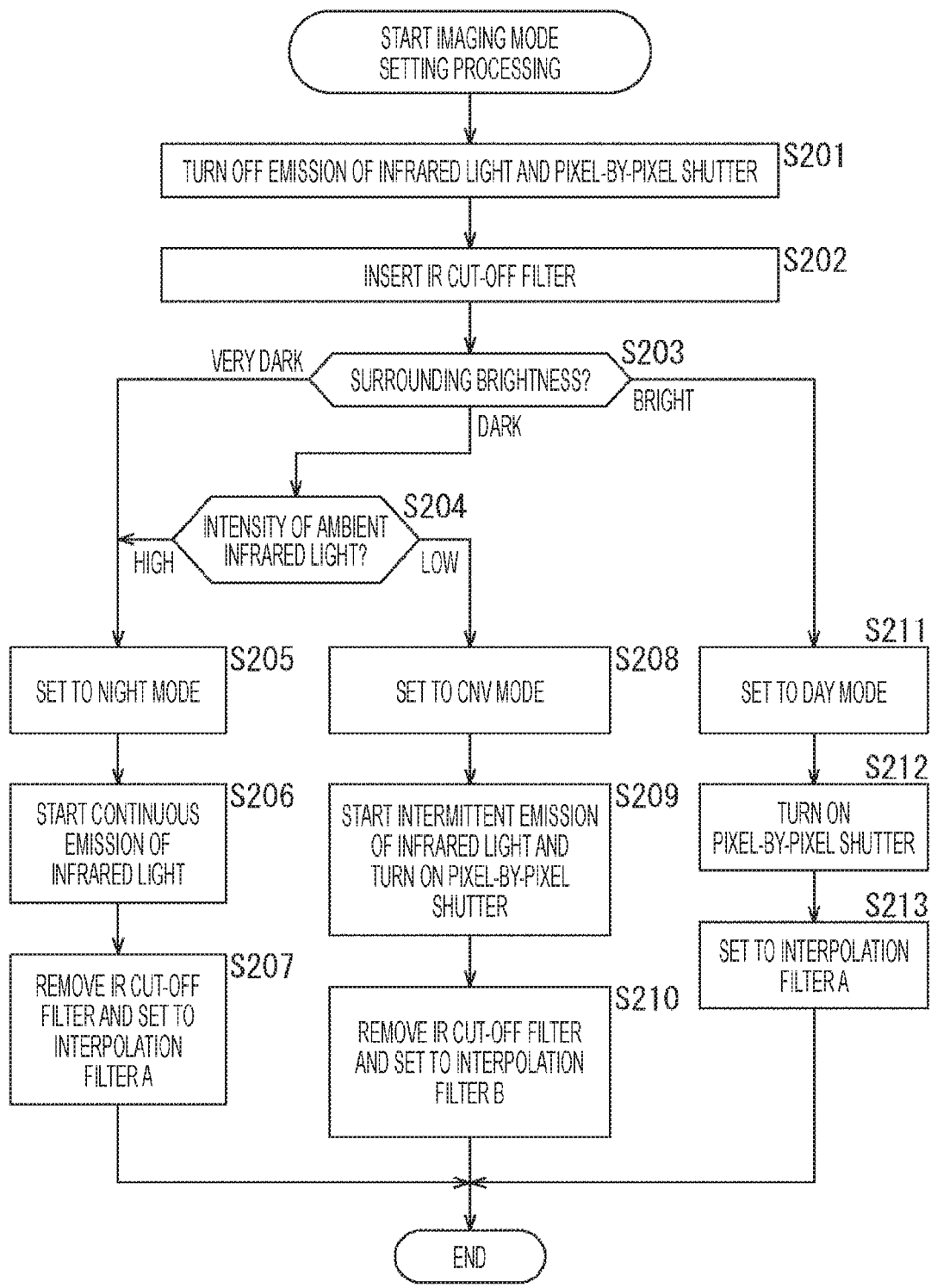
FIG. 29 is a flowchart illustrating exemplary imaging mode setting processing according to the second embodiment.

First, imaging mode setting processing executed by the imaging apparatus 700 will be described with reference to a flowchart in FIG. 29. This processing is executed at a predetermined timing, for example, at the time of starting imaging, every predetermined interval during imaging or the like.

Figure 17:
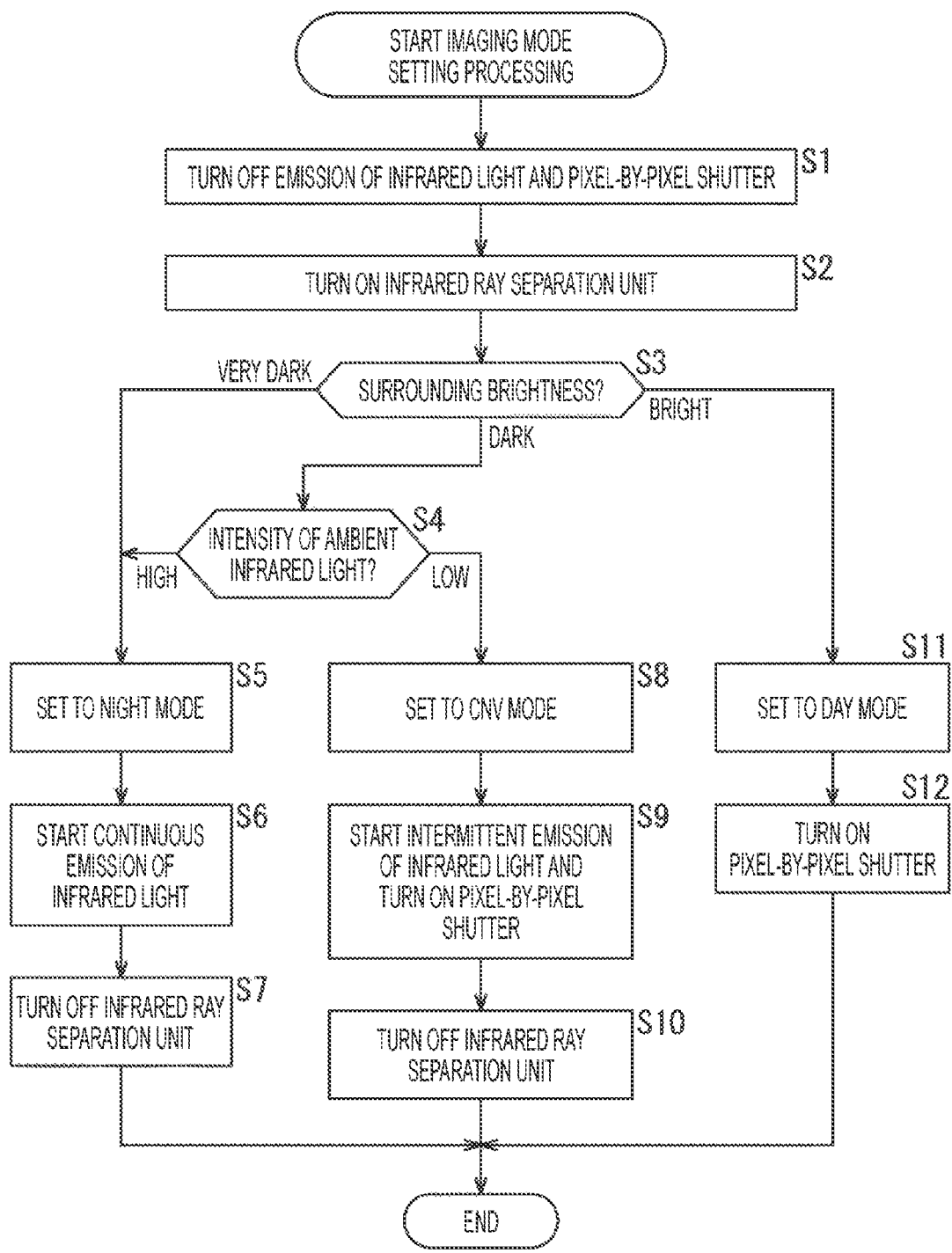
FIG. 17 is a flowchart illustrating exemplary imaging mode setting processing according to the first embodiment.

In step S201, the emission of infrared light and the pixel-by-pixel shutter is turned off similarly to the processing of step S1 in FIG. 17.

In step S202, the control unit 702 inserts the IR cut-off filter 703 between the imaging lens 104 and the imaging element 704.

In step S203, similarly to the processing of step S3 in FIG. 17, the surrounding brightness is determined. In a case where it is determined that the surroundings are dark, the processing proceeds to step S204.

In step S204, the control unit 702 determines the intensity of the ambient infrared light. Specifically, the control unit 702 calculates the visible light ratio Rc using the above-described Formula (33). Subsequently, the control unit 702 determines whether the intensity of the ambient infrared light is high or low on the basis of the visible light ratio Rc by the similar method as the processing of step S4 in FIG. 17. In a case where it is determined that the intensity of the ambient infrared light is high, the processing proceeds to step S205.

In contrast, in a case where it is determined in step S203 that the surroundings are very dark, the processing of step S204 is skipped and the processing proceeds to step S205.

In step S205, the control unit 702 sets the mode to the night mode. That is, the control unit 702 sets the mode to the night mode in a case where the surroundings are in a very dark state, or in a case where the environment is dark and the intensity of the ambient infrared light is high. The control unit 702 supplies a mode signal indicating that the mode is set to the night mode to the chroma gain control unit 401.

In step S206, continuous emission of infrared light is started similarly to the processing of step S6 in FIG. 17. At this time, the pixel-by-pixel shutter remains turned off.

In step S207, the control unit 702 removes the IR cut-off filter 703 and sets the filter to the interpolation filter A. Specifically, the control unit 702 removes the IR cut-off filter 703 from between the imaging lens 104 and the imaging element 704. Moreover, the control unit 702 sets the low frequency RGB interpolation filter 801 and the high frequency G interpolation filter 802 as the interpolation filter A.

Thereafter, the imaging mode setting processing is finished.

In contrast, in a case where it is determined in step S204 that the intensity of the ambient infrared light is low, the processing proceeds to step S208.

In step S208, the control unit 702 sets the mode to the CNV mode. That is, the control unit 702 sets the mode to the CNV mode in a case where the surroundings are dark and the intensity of the ambient infrared light is low. The control unit 702 supplies a mode signal indicating that the mode is set to the CNV mode to the chroma gain control unit 401.

In step S209, the intermittent emission of infrared light is started similarly to the processing of step S9 in FIG. 17, and the pixel-by-pixel shutter is turned on.

In step S210, the control unit 702 removes the IR cut-off filter 703 and sets the filter to the interpolation filter B. Specifically, the control unit 702 removes the IR cut-off filter 703 from between the imaging lens 104 and the imaging element 704. Moreover, the control unit 702 sets the low frequency RGB interpolation filter 801 and the high frequency G interpolation filter 802 as the interpolation filter B.

Thereafter, the imaging mode setting processing is finished.

In contrast, in a case where it is determined in step S203 that the surroundings are bright, the processing proceeds to step S211.

In step S211, the control unit 702 sets the mode to the day mode. The control unit 702 supplies a mode signal indicating that the mode has been set to the day mode to the chroma gain control unit 401.

In step S212, the pixel-by-pixel shutter is turned off similarly to the processing of step S12 in FIG. 17. At this time, the infrared light emission unit 103 remains turned off.

In step S213, the control unit 702 sets the low frequency RGB interpolation filter 801 and the high frequency G interpolation filter 802 as the interpolation filter A. At this time, the IR cut-off filter 703 remains inserted between the imaging lens 104 and the imaging element 704.

Thereafter, the imaging mode setting processing is finished.

(Imaging Processing)

Figure 30:
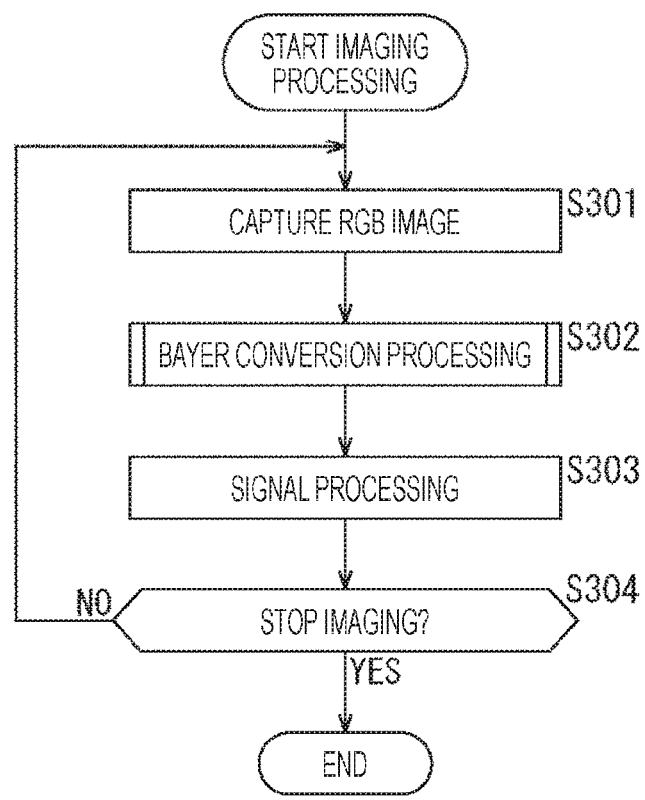
FIG. 30 is a flowchart illustrating exemplary imaging processing according to the second embodiment.
Figure 31:
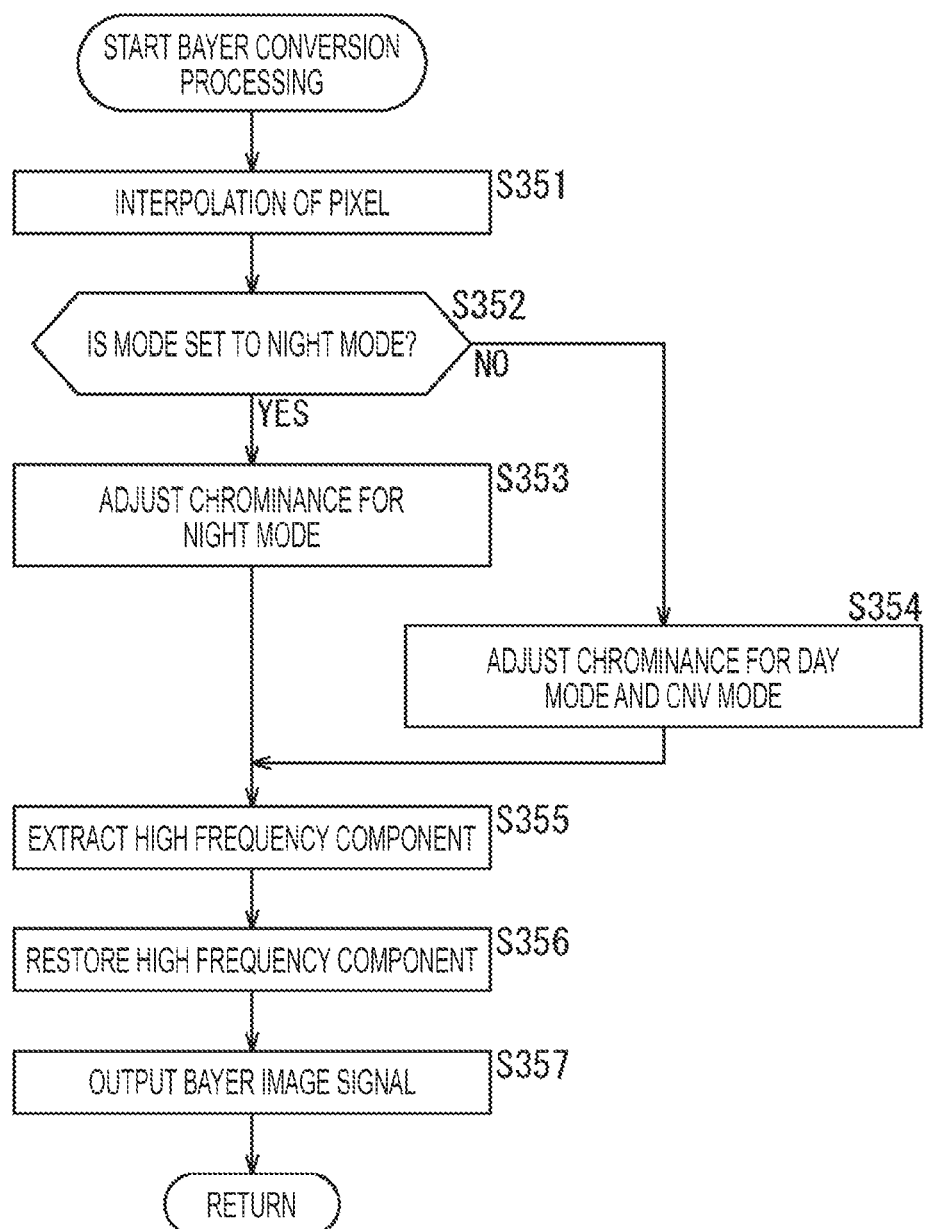
FIG. 31 is a flowchart illustrating exemplary Bayer conversion processing according to the second embodiment.

First, imaging processing executed by the imaging apparatus 700 will be described with reference to a flowchart in FIG. 30.

In step S301, the imaging element 704 captures an RGB image. Specifically, in a case where the mode is set to the day mode, the imaging element 704 captures an image of the light received via the imaging lens and the IR cut-off filter 703. In contrast, in a case where the mode is set to the CNV mode or the night mode, the imaging element 704 captures an image of the light received via the imaging lens without interposing the IR cut-off filter 703. The imaging element 704 supplies the RGB image signal obtained as a result of imaging to the low frequency RGB interpolation filter 801 and the high frequency G interpolation filter 802.

In step S302, the imaging apparatus 700 executes Bayer conversion processing. Now, details of the Bayer conversion processing will be described with reference to the flowchart of FIG. 31.

In step S351, the low frequency RGB interpolation filter 801 and the high frequency G interpolation filter 802 perform pixel interpolation.

More specifically, in a case where the low frequency RGB interpolation filter 801 is set to the interpolation filter A, the low frequency RGB interpolation filter 801 interpolates all of the color signals for each of pixels using the above-described Formulas (34) to (39). In contrast, in a case where the low frequency RGB interpolation filter 801 is set to the interpolation filter B, the low frequency RGB interpolation filter 801 uses the above-described Formulas (34) to (37), and Formulas (40) and (41) to interpolate all of the color signals for each of the pixels. The low frequency RGB interpolation filter 801 supplies the interpolated $R_L$ signal, the $G_L$ signal, and the $B_L$ signal to the white balance processing unit 304, and supplies the $GH_L$ signal to the high frequency component extraction unit 804 and the high frequency component restoration unit 805.

In a case where the high frequency B interpolation filter 802 is set to the interpolation filter A, the high frequency G interpolation filter 802 interpolates the G signal using the above-described Formulas (42) to (44). In contrast, in a case where the high frequency G interpolation filter 802 is set to the interpolation filter A, the high frequency G interpolation filter 802 interpolates the G signal using the above-described Formula (45). The high frequency G interpolation filter 802 supplies each of the interpolated $GH_H$ signals to the high frequency component extraction unit 804.

As described above, the white balance processing unit 304 adjusts the white balance in the $R_L$ signal, the $G_L$ signal, and the $B_L$ signal, and supplies the $R_L$ signal, the $G_L$ signal, and the $B_L$ signal having the adjusted white balance to the YC conversion unit 351.

In step S352, the chroma gain control unit 401 determines whether the mode is set to the night mode. In a case where it is determined that the mode is set to the night mode, the processing proceeds to step S353.

In step S353, the chrominance adjustment unit 803 adjusts the chrominance for the night mode.

Specifically, as described above, the YC conversion unit 351 converts the $R_L$ signal, the $G_L$ signal, and the $B_L$ signal into a luminance signal $Y_L$ and chrominance signals Cr and Cb for each of pixels. The YC conversion unit 351 supplies the chrominance signal Cr to the multiplier 402, supplies the chrominance signal Cb to the multiplier 403, and supplies the luminance signal $Y_L$ to the RGB conversion unit 851.

The chroma gain control unit 401 sets the chroma gain Gc to zero. The chroma gain control unit 401 supplies the set chroma gain Gc to the multipliers 402 and 403.

The multiplier 402 multiplies the chrominance signal Cr by the chroma gain Gc (=0), and supplies the chrominance signal Cr' as a multiplication result to the RGB conversion unit 851.

The multiplier 403 multiplies the chrominance signal Cb by the chroma gain Gc (=0), and supplies the chrominance signal Cb' as the multiplication result to the RGB conversion unit 851.

As described above, the RGB conversion unit 851 converts the luminance signal $Y_L$' and the chrominance signals Cr' and Cb' into the $R_L$ signal, the $G_L$ signal, and the $B_L$ signal for each of pixels, and supplies the signals to the high frequency component restoration unit 805.

Note that the image containing the $R_L$ signal, the $G_L$ signal, and the $B_L$ signal is a monochrome image since the chrominance signals Cr' and Cb' are zero.

Thereafter, the processing proceeds to step S355.

In contrast, in a case where it is determined in step S352 that the mode is set to the day mode or the CNV mode, the processing proceeds to step S354.

In step S354, the chrominance adjustment unit 803 adjusts the luminance and chrominance for the day mode and the CNV mode.

Specifically, as described above, the YC conversion unit 351 converts the $R_L$ signal, the $G_L$ signal, and the $B_L$ signal into a luminance signal $Y_L$ and chrominance signals Cr and Cb for each of pixels. The YC conversion unit 351 supplies the chrominance signal Cr to the multiplier 402, supplies the chrominance signal Cb to the multiplier 403, and supplies the luminance signal $Y_L$ to the RGB conversion unit 851.

As described above, the chroma gain control unit 401 sets the chroma gain Gc using the graph of FIG. 13 on the basis of the photometric amount Q and the visible light ratio Rc. The chroma gain control unit 401 supplies the set chroma gain Gc to the multipliers 402 and 403.

The multiplier 402 multiplies the chrominance signal Cr by the chroma gain Gc and supplies the chrominance signal Cr' as a result of the multiplication to the RGB conversion unit 851.

The multiplier 403 multiplies the chrominance signal Cb by the chroma gain Gc, and supplies the chrominance signal Cb' as a result of the multiplication to the RGB conversion unit 851

As described above, the RGB conversion unit 851 converts the luminance signal $Y_L$' and the chrominance signals Cr' and Cb' into the $R_L$ signal, the $G_L$ signal, and the $B_L$ signal for each of pixels, and supplies the signals to the high frequency component restoration unit 805.

Thereafter, the processing proceeds to step S355.

In step S355, the high frequency component extraction unit 804 extracts the high frequency component GH on the basis of the $GH_H$ signal and the $GH_L$ signal as described above. The high frequency component extraction unit 804 supplies the extracted high frequency component GH to the high frequency component restoration unit 805.

In step S356, the high frequency component restoration unit 805 restores the high frequency component GH on the basis of the $R_L$ signal, the $G_L$ signal, and the $B_L$ signal as described above. The high frequency component restoration unit 805 supplies the restored R signal, G signal, and B signal in which the high frequency components have been restored to the Bayer image signal output unit 309.

Figure 21:
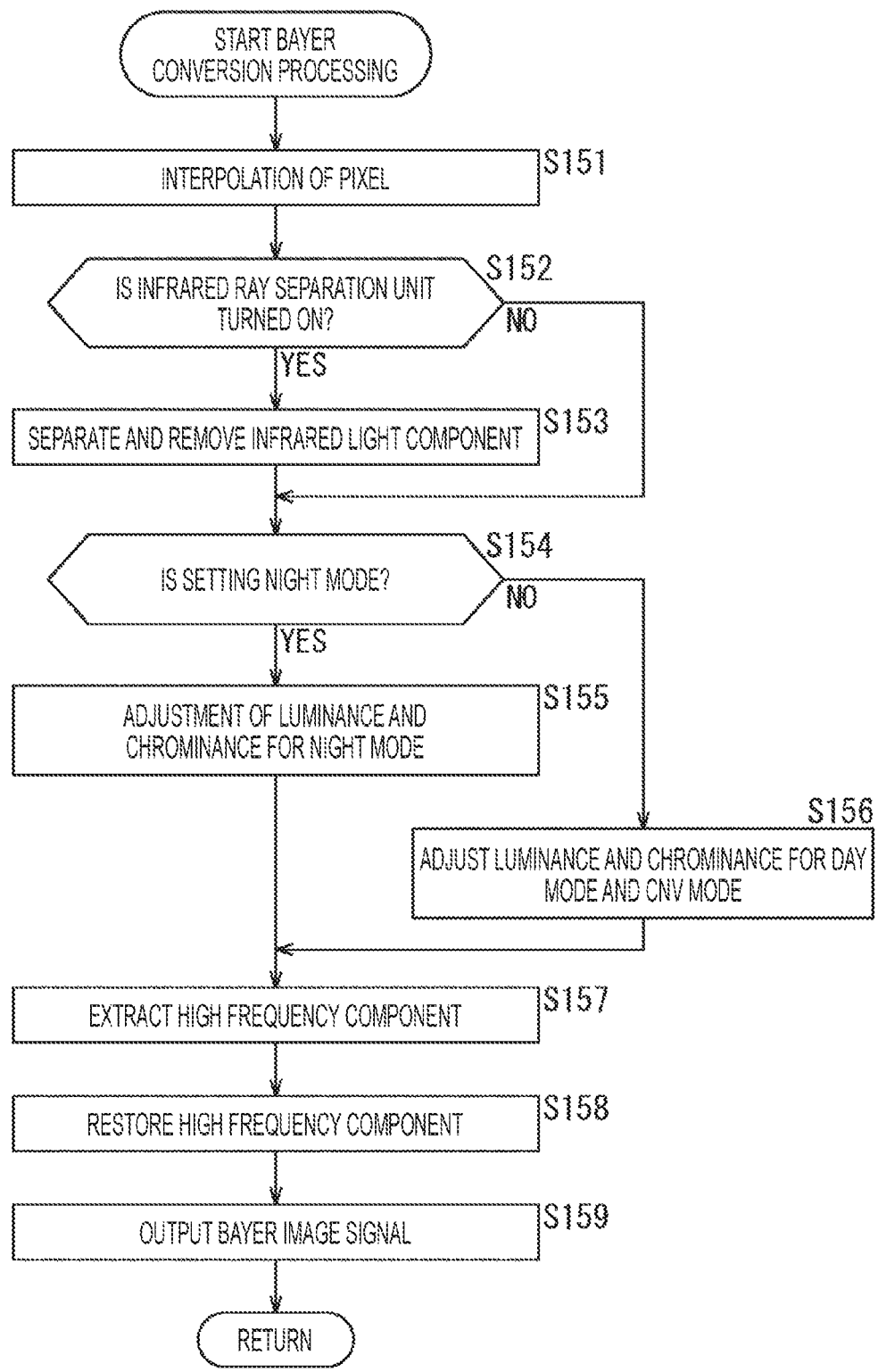
FIG. 21 is a flowchart illustrating exemplary Bayer conversion processing according to the first embodiment.

In step S357, a Bayer image signal is output similarly to the processing of step S158 in FIG. 21.

Thereafter, the Bayer conversion processing is finished.

Figure 20:
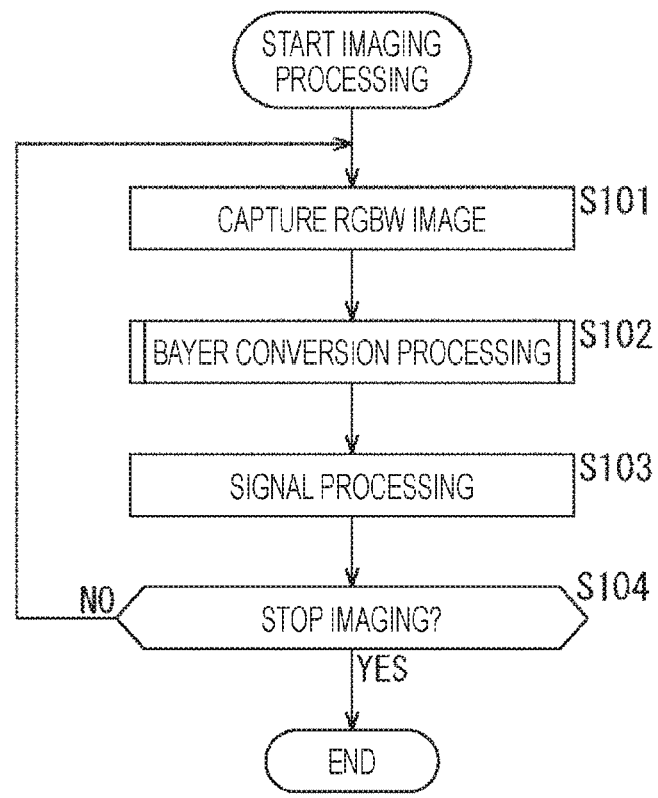
FIG. 20 is a flowchart illustrating exemplary imaging processing according to the first embodiment.

Returning to FIG. 30, in step S303, signal processing is performed similarly to the processing of step S103 in FIG. 20.

In step S304, it is determined whether to stop imaging similarly to the processing of step S104 in FIG. 20. In a case where it is determined that imaging is not to be stopped, the processing returns to step S301, and the processing of steps S301 to S304 is repeatedly executed until it is determined in step S304 that imaging is to be stopped.

In contrast, in a case where it is determined in step S304 that imaging is to be stopped, the imaging processing is finished.

Here, an example of the emission period of infrared light and the exposure period of each of pixels in each of the imaging modes will be described with reference to FIGS. 32 to 34.

Figure 32:
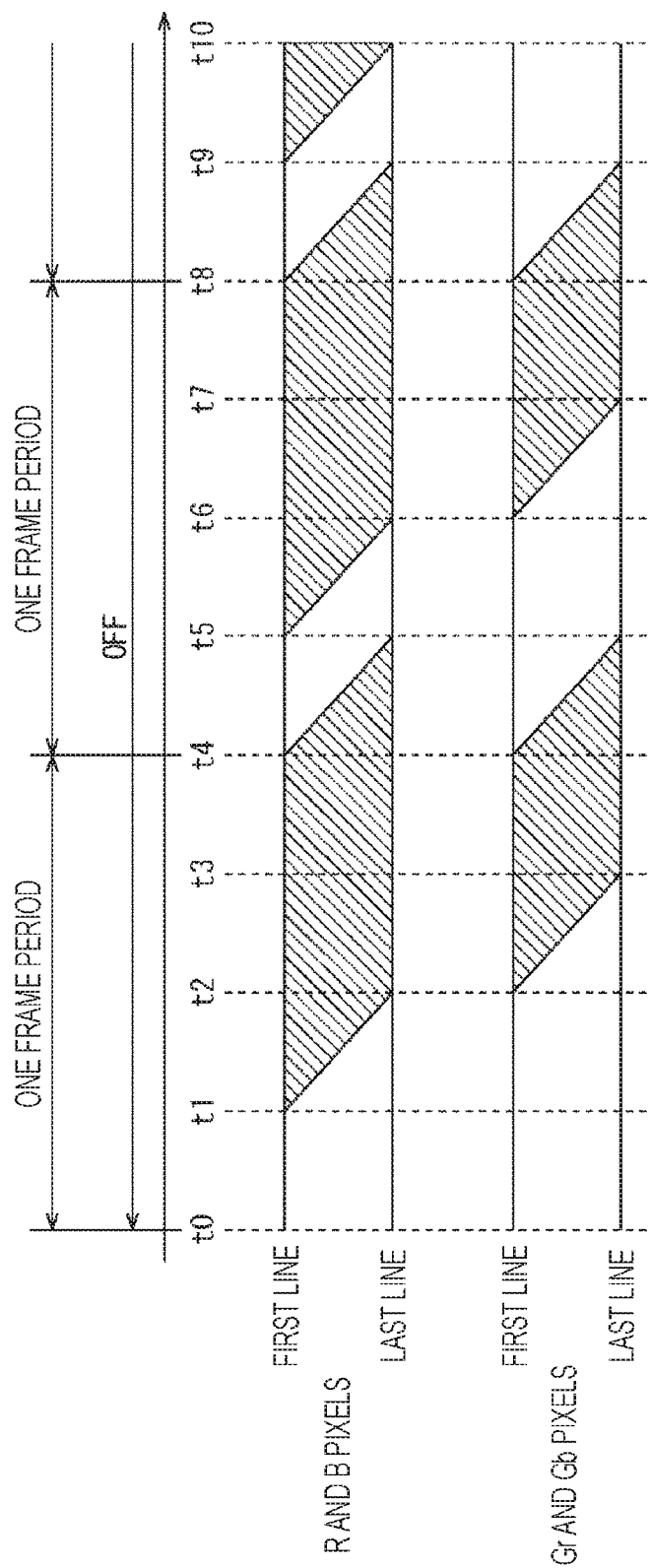
FIG. 32 is a diagram illustrating an example of an emission period of infrared light and an exposure period of each of pixels in the day mode according to the second embodiment.

FIG. 32 illustrates an example of an emission period of infrared light and an exposure period of each of pixels in a case where the mode is set to the day mode.

In this example, the exposure periods of the R pixel and the B pixel are set to the same period as the exposure period of the color pixels (R, G, and B pixels) in FIG. 22 described above. In addition, the exposure periods of the Gr pixel and the Gb pixel are set to the same period as the exposure period of the W pixel in FIG. 22 described above.

Note that in a case where the mode is set to day mode, the intensity of ambient light is sufficient, and thus, emission of infrared light is not performed.

As described above, in a case where the mode is set to the day mode, the average signal output of the Gr pixel and the Gb pixel is larger than the average signal output of the R pixel and the B pixel under the general environment, and thus, the exposure period of the R and B pixels is set to be longer than the exposure period of the Gr and Gb pixels.

Note that it is also possible to set to equalize the length of the exposure periods of all the pixels.

Figure 33:
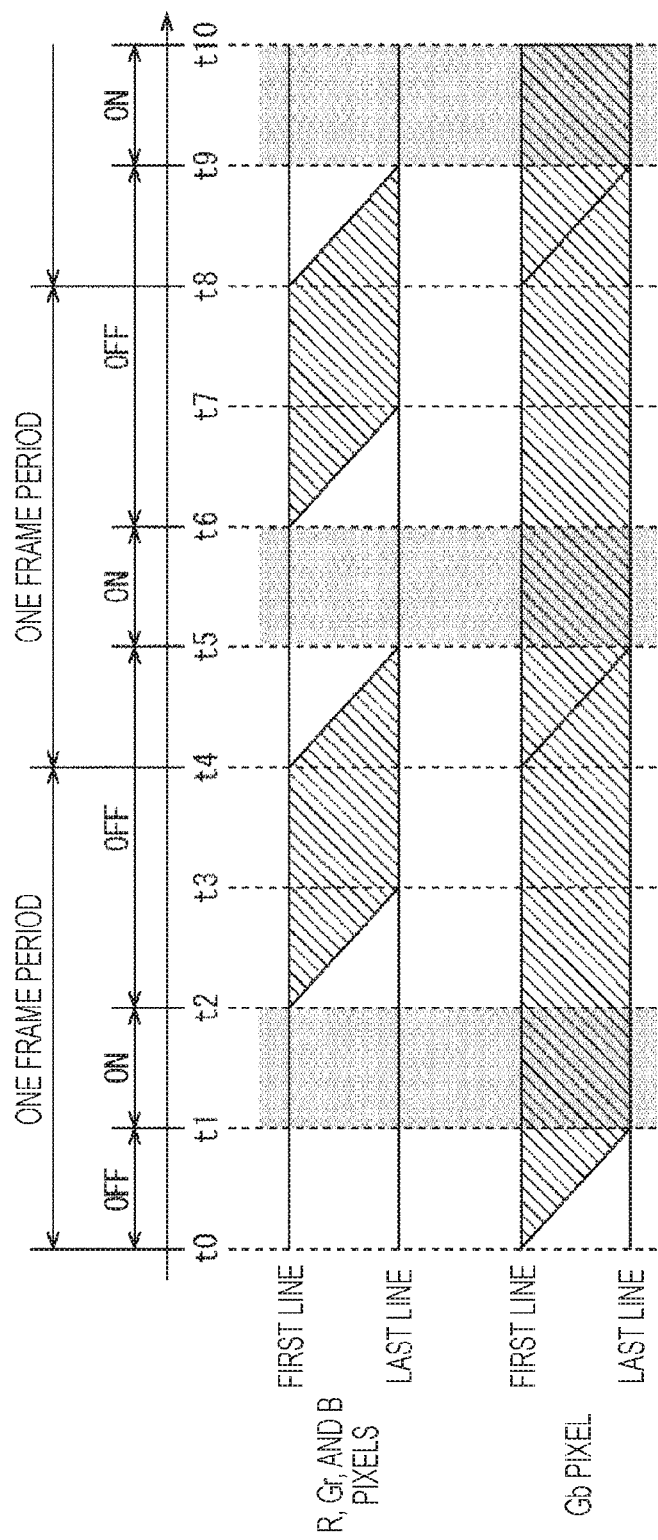
FIG. 33 is a diagram illustrating an example of an emission period of infrared light and an exposure period of each of pixels in the CNV mode according to the second embodiment.

FIG. 33 illustrates an example of the emission period of infrared light and the exposure period of each of pixels in a case where the mode is set to the CNV mode.

In this example, the exposure periods of the R, Gr, and B pixels are set to the same period as the exposure period of the color pixels (R, G, and B pixels) in FIG. 23 described above. In contrast, the exposure period of the Gb pixel is set to the same period as the exposure period of the W pixel in FIG. 23 described above.

In contrast, the infrared light is emitted in the same period as the above-described FIG. 23. That is, infrared light is intensively emitted within a period (single exposure period) in which all the Gb pixels out of each of frame periods are exposed and none of the R, Gr, and B pixels are exposed.

Note that there is no need to emit the infrared light in the entire period of the single exposure period, and infrared light may be emitted in a portion of the single exposure period.

As described above, in a case where the mode is set to the CNV mode, the Gb pixel alone receives the infrared light from the infrared light emission unit 103, and none of the R pixel, Gr pixel, and the B pixel receives the infrared light from the infrared light emission unit 103.

Here, in a case where the mode is set to the CNV mode, the low frequency RGB interpolation filter 801 and the high frequency G interpolation filter 802 are set as the interpolation filter B. Then, in a case where the filter is set to the interpolation filter B, the color information is generated from the pixel signals of the R pixel, the Gr pixel, and the B pixel. These pixels, however, do not receive the infrared light, it is possible to prevent degradation of color reproducibility.

In contrast, in a case where the filter is set to the interpolation filter B, luminance information is generated mainly from pixel signals of the Gb pixels. More precisely, the high frequency component of the luminance information is generated mainly from the pixel signal of the Gb pixel, while the low frequency component of the luminance information is generated mainly from the pixel signals of the R pixel, Gr pixel, and the B pixel. Then, with a configuration in which Gb pixel receives the infrared light, the reproducibility of the luminance component, the high frequency component thereof in particular, is enhanced even when the surroundings are dark.

This results in enhancement of the image quality of the image generated by the imaging apparatus 700.

Figure 34:
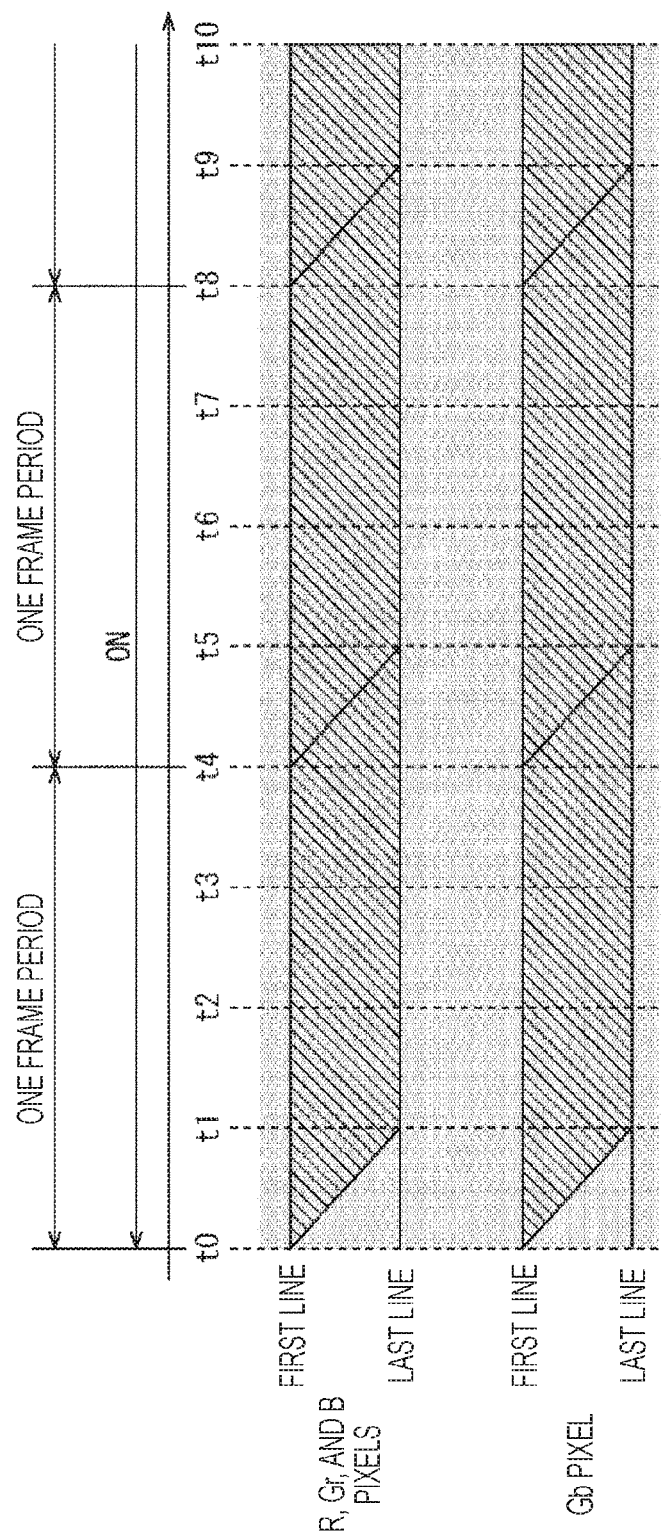
FIG. 34 is a diagram illustrating an example of an emission period of infrared light in the night mode and an exposure period of each of pixels according to the second embodiment.

FIG. 34 illustrates an example of the emission period of infrared light and the exposure period of each of pixels in a case where the mode is set to the night mode.

In this example, the exposure periods of the R, Gr, Gb, and B pixels are set to the same period as the exposure period of the R, G, B, and W pixels in FIG. 24 described above.

In contrast, infrared light is continuously emitted.

As described above, in a case where the mode is set to the night mode, a monochrome image is generated without using color information. Therefore, with continuous emission of the infrared light, it is possible to enhance the reproducibility of the luminance information and enhance the image quality of the image generated by the imaging apparatus 700.

As described above, with the mode setting to the CNV mode and with emission of infrared light, it is possible to obtain a color image with high image quality even in the dark surroundings without reducing the frame rate.

In addition, there is no need to provide a frame buffer for combining an image captured with emission of infrared light and an image captured without emission of the infrared light, it is possible to suppress expansion of the scale of the circuit and complication of the circuit.

Furthermore, it is possible to obtain a color image with high image quality in both the day mode and the CNV mode by inserting/removing the IR cut-off filter.

3. Modification

Hereinafter, a modification of the above-described embodiments of the present technology will be described.

For example, an IR cut-off filter may be used to enhance the color reproducibility performance also in a case where the above-described pixel arrangement of FIG. 4 is employed.

Figure 35:
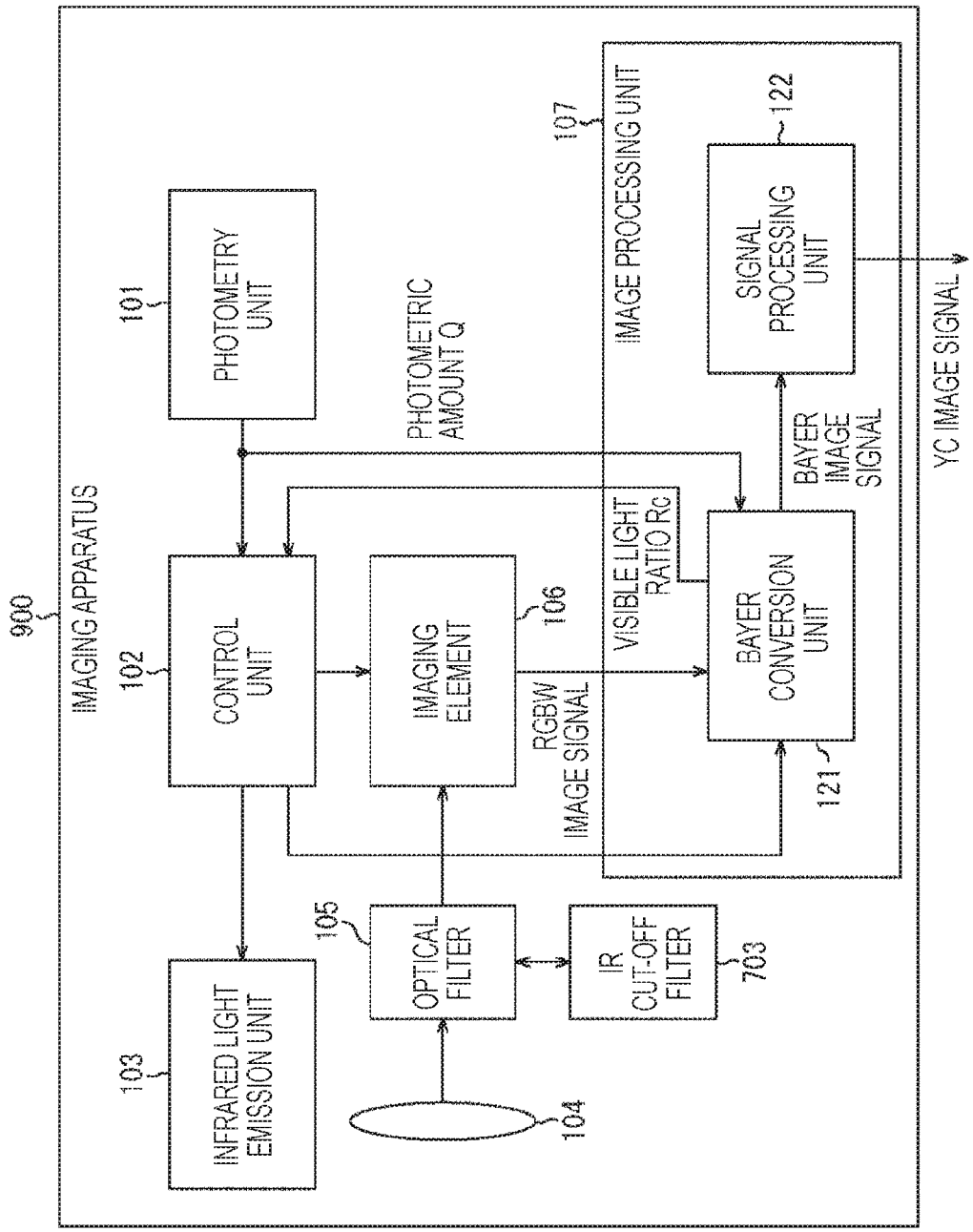
FIG. 35 is a block diagram illustrating a modification of the imaging apparatus according to the first embodiment.

FIG. 35 is a block diagram illustrating an exemplary configuration of an imaging apparatus 900 as a modification of the imaging apparatus 100 in FIG. 1. Note that in the figure, portions corresponding to those in FIGS. 1 and 25 are denoted by the same reference numerals.

The imaging apparatus 900 differs from the imaging apparatus 100 in that it includes an IR cut-off filter 703 provided in the imaging apparatus 700 in FIG. 25. In addition, it is possible to mechanically switch filters to be arranged between the imaging lens 104 and the imaging element 106, from among the optical filter 105 and the IR cut-off filter 703, for example.

For example, it is possible to arrange the IR cut-off filter 703 between the imaging lens 104 and the imaging element 106 in the daytime to attenuate the infrared light component incident on the imaging element 106, thereby enhancing color reproducibility. In contrast, the optical filter 105 is arranged between the imaging lens 104 and the imaging element 106 at night, and the above-described processing is performed.

Figure 36:
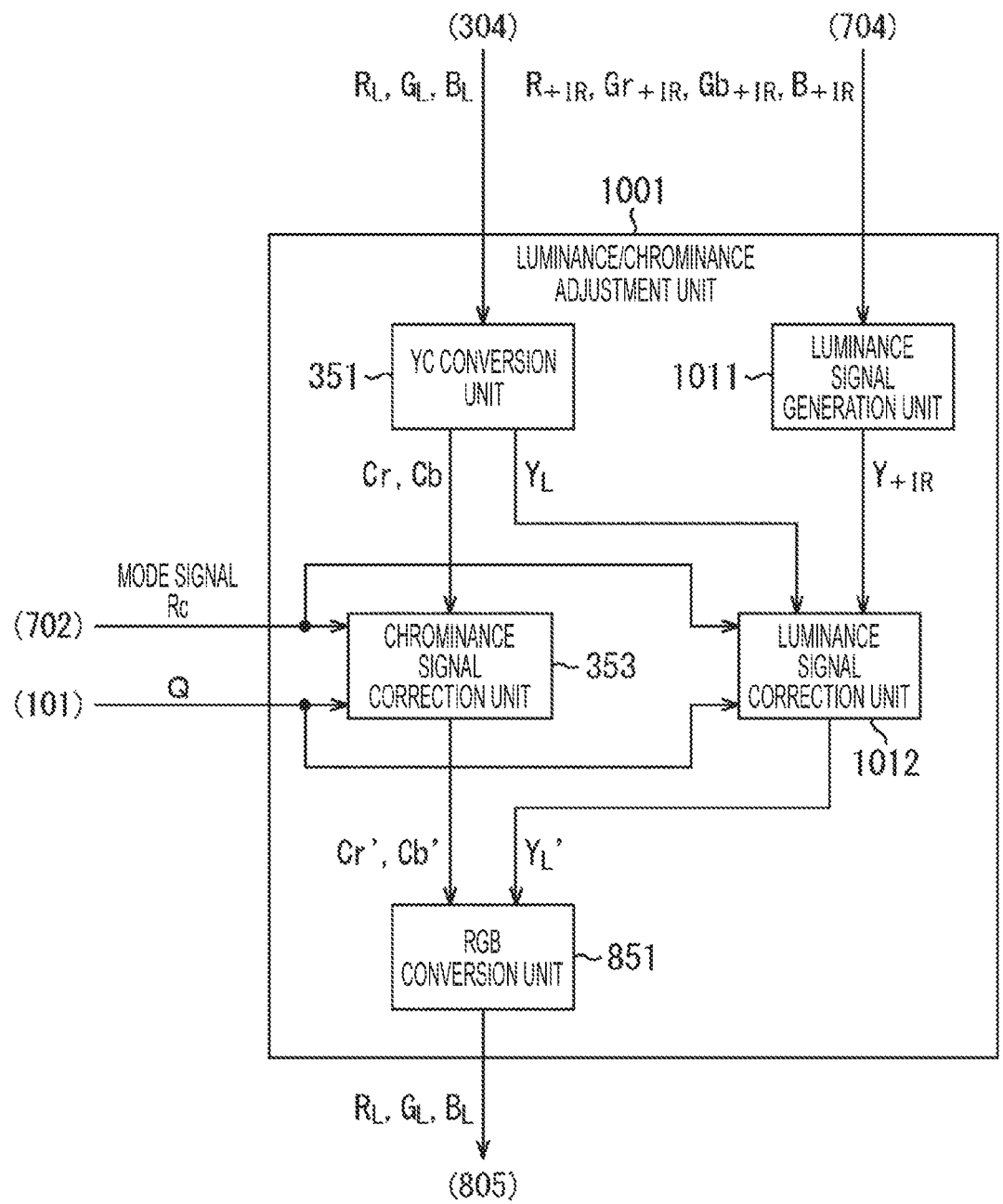
FIG. 36 is a block diagram illustrating an exemplary configuration of a luminance/chrominance adjustment unit.

Moreover, the Bayer conversion unit 721 in FIG. 27 may include a luminance/chrominance adjustment unit 1001 in FIG. 36 in place of the chrominance adjustment unit 803, the imaging apparatus 700 in FIG. 25 may also perform correction of the luminance signals in addition to the chrominance signals, for example. Note that in FIG. 36, portions corresponding to those in FIG. 28 are denoted by the same reference numerals.

The luminance/chrominance adjustment unit 1001 in FIG. 36 differs from the chrominance adjustment unit 803 in FIG. 28 in that a luminance signal generation unit 1011 and a luminance signal correction unit 1012 are added.

The luminance signal generation unit 1011 generates a luminance signal $Y_{+IR}$ from the $R_{+IR}$ signal, the $Gr_{+IR}$ signal, the $Gb_{+IR}$ signal and the $B_{+IR}$ signal supplied from the imaging element 704 using the following Formula (49).

$$Y_{+IR}=(R_{+IR}+Gr_{+IR}+Gb_{+IR}+B_{+IR})/4 \qquad (49)$$

The luminance signal generation unit 1011 supplies the generated luminance signal $Y_{+IR}$ to the luminance signal correction unit 1012.

The luminance signal correction unit 1012 has the similar configuration as the luminance signal combining unit 354 in FIG. 14. Then, the luminance signal correction unit 1012 sets the combining ratio α on the basis of the imaging mode, the photometric amount Q, and the visible light ratio Rc. In addition, the luminance signal correction unit 1012 combines the luminance signal $Y_L$ and the luminance signal $Y_{+IR}$ to generate the luminance signal $Y_L'$ with the set combining ratio α using the following Formula (50), and supplies the generated signal to the RGB conversion unit 851.

$$Y_L'=\alpha \times Y_L+(1-\alpha)\times Y_{+IR} \qquad (50)$$

Similarly to the RGB conversion unit 355 in FIG. 11, the RGB conversion unit 851 converts the luminance signal $Y_L'$ and the chrominance signals Cr' and Cb' into the $R_L$ signal, the $G_L$ signal, and the $B_L$ signal, respectively, using the above-described Formulas (21) to (23). The RGB conversion unit 851 supplies the converted $R_L$ signal, $G_L$ signal and $B_L$ signal to the high frequency component restoration unit 805.

Furthermore, the arrangement of the above-described pixels is merely illustrative an and other arrangements can be employed. For example, IR pixels used for detecting infrared light may be used instead of W pixels, as infrared light receiving pixels. In this case, it is conceivable that the arrangement of the pixels is, for example, an arrangement using IR pixels instead of Gb pixels in FIG. 26.

In addition, in the CNV mode, the luminance information may be generated mainly from pixel signals of infrared light receiving pixels by a method different from the above-described method, and the color information may be mainly generated from pixel signals of pixels not used for receiving infrared light. Alternatively, the luminance information may be generated mainly from pixel signals of infrared light receiving pixels in the CNV mode and the color information may be mainly generated from pixel signals of pixels not used for receiving infrared light.

Furthermore, it is also allowable to provide just the day mode and the CNV mode without providing the night mode. For example, the surrounding brightness may be divided into two stages of "bright" and "dark", and it is allowable to set the mode to the day mode in a case where the surroundings are bright, and set the mode to the CNV mode in a case where the surroundings are dark.

In addition, while the above description is an exemplary case where the YC image signal is output from the imaging apparatus 100 and the imaging apparatus 700, it is also allowable to output the image signal in another format. For example, an image signal in the Bayer array or an image signal including each of the R, G and B signals for each of pixels may be output.

4. Application Example

{Exemplary Configuration of Computer}

A series of processing described above can be executed in hardware or with software. In a case where the series of processing is executed with software, a program included in the software is installed in a computer. Herein, the computer includes a computer incorporated in a dedicated hardware, and for example, a general-purpose personal computer on which various types of functions can be executed with installation of various programs.

Figure 37:
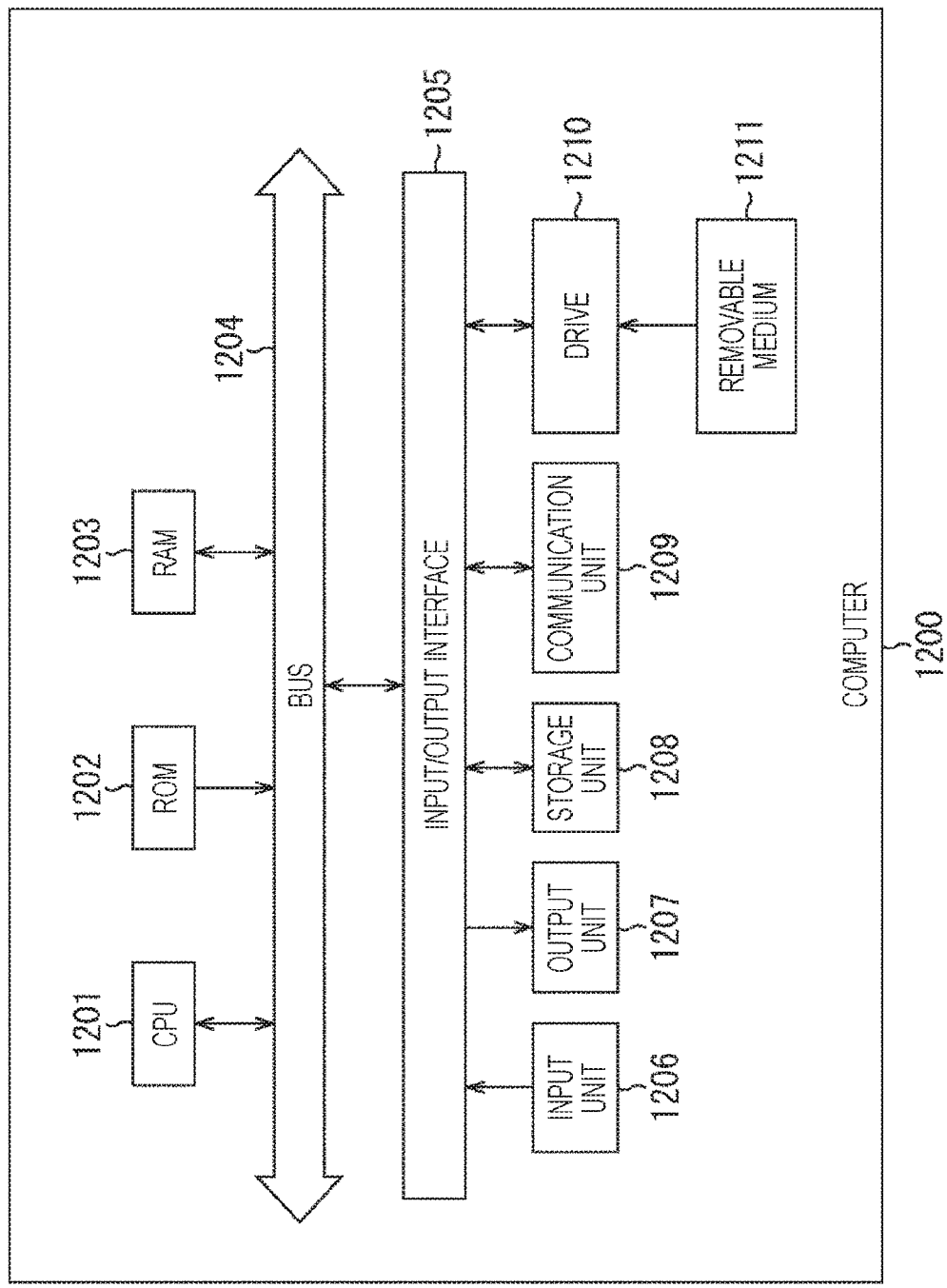
FIG. 37 is a block diagram illustrating an exemplary configuration of a computer.

FIG. 37 is a block diagram illustrating an exemplary configuration of hardware of a computer 1200 in which the series of processing described above is executed by a program.

In the computer 1200, a central processing unit (CPU) 1201, a read only memory (ROM) 1202, a random access memory (RAM) 1203 are interconnected with each other via a bus 1204.

The bus 1204 is further connected with an input/output interface 1205. The input/output interface 1205 is connected with an input unit 1206, an output unit 1207, a storage unit 1208, a communication unit 1209, and a drive 1210.

The input unit 1206 includes a key board, a mouse, a microphone, and the like. The output unit 1207 includes a display, a speaker, and the like. The storage unit 1208 includes a hard disk, a non-volatile memory, and the like. The communication unit 1209 includes a network interface and the like. The drive 1210 drives a removable medium 1211 including a magnetic disk, an optical disk, a magneto-optical disk, a semiconductor memory, or the like.

On the computer 1200 configured as above, the series of above-described processing is executed by operation such that the CPU 1201 loads, for example, a program stored in the storage unit 1208 onto the RAM 1203 via the input/output interface 1205 and the bus 1204 and executes the program.

The program executed by the computer 1200 (CPU 1201) can be stored, for example, in the removable medium 1211 as a package medium and be provided. Alternatively, the program can be provided via a wired or wireless transmission medium including a local area network, the Internet, and digital satellite broadcasting.

On the computer 1200, the program can be installed in the storage unit 1208 via the input/output interface 1205, by attaching the removable medium 1211 to the drive 1210. In addition, the program can be received at the communication unit 1209 via a wired or wireless transmission medium and be installed in the storage unit 1208. Alternatively, the program can be installed in the ROM 1202 or the storage unit 1208 beforehand.

Note that the program executed by the computer 1200 may be a program processed in a time series in an order described in the present description, or can be a program processed in required timing such as being called.

Moreover, in the present description, the system represents a set of multiple constituents (devices, modules (components), or the like). In other words, all the constituents may be in a same housing but they do not have to be in the same housing. Accordingly, a plurality of apparatuses, housed in separate housings, connected via a network can be a system. An apparatus in which a plurality of modules is housed in one housing can also be a system.

Furthermore, that embodiments of the present technology are not limited to the above-described embodiments but can be modified in a variety of ways within a scope of the present technology.

For example, the present technology can be configured as a form of cloud computing in which one function is shared in cooperation for processing among a plurality of apparatuses via a network.

Moreover, each of steps described in the above flowcharts can be executed on one apparatus or shared by a plurality of apparatuses for processing.

Furthermore, in a case where one step includes a plurality of stages of processing, the plurality of stages of processing included in the one step can be executed on one apparatus or can be shared by a plurality of apparatuses.

In addition, note that effects described herein are provided for purposes of exemplary illustration and are not intended to be limiting. Still other effects may also be contemplated.

In addition, the present technology may also be configured as follows, for example.

(1)
An imaging apparatus including:
an imaging element including a first pixel and a second pixel; and
a control unit that controls an exposure period of the imaging element and an emission period of infrared light from an infrared light emission unit,
in which the control unit controls to provide an exposure period of the first pixel and the second pixel in each of frame periods, provide a single exposure period in which the first pixel alone is exposed, and emit the infrared light within the single exposure period.

(2)
The imaging apparatus according to (1), further including an image processing unit that generates luminance information mainly on the basis of a first pixel signal from the first pixel and generates color information mainly on the basis of a second pixel signal from the second pixel.

(3)
The imaging apparatus according to (2),
in which the image processing unit generates high frequency luminance information mainly on the basis of the first pixel signal and generates color information and low frequency luminance information mainly on the basis of the second pixel signal.

(4)
The imaging apparatus according to any of (1) to (3),
in which the first pixel includes a white pixel, and
the second pixel includes a color pixel used for detecting a predetermined color.

(5)
The imaging apparatus according to any of (1) to (3),
in which the first pixel includes an IR pixel used for detecting infrared light, and
the second pixel includes a color pixel used for detecting a predetermined color.

(6)
The imaging apparatus according to any of (1) to (3),
in which the first pixel includes a first G pixel used for detecting a green color, and
the second pixel includes an R pixel used for detecting a red color, a second G pixel, and a B pixel used for detecting a blue color.

(7)
The imaging apparatus according to any of (1) to (6),
in which the exposure period of the first pixel is longer than the exposure period of the second pixel.

(8)
The imaging apparatus according to (1),
in which the control unit controls the exposure period of the imaging element and the emission period of the infrared light from the infrared light emission unit on the basis of surrounding brightness and ambient infrared light intensity being an intensity of the infrared light contained in the ambient light.

(9)
The imaging apparatus according to (8),
in which the control unit controls, in a first state where the surrounding brightness is a first threshold or more and below a second threshold and the ambient infrared light intensity is below a third threshold, so as to provide an exposure period of the first pixel and the second pixel for each of frame periods, provide a single exposure period in which the first pixel alone is exposed, and emit infrared light within the single exposure period.

(10)
The imaging apparatus according to (9),
in which the control unit controls to suppress emission of the infrared light in a second state in which the surrounding brightness is the second threshold or above.

(11)
The imaging apparatus according to (10), further including a filter insertable and removable at a portion between a lens and the imaging element and configured to attenuate an infrared light component,
in which the first pixel includes a first G pixel used for detecting a green color, the second pixel includes an R pixel used for detecting a red color, a second G pixel, and a B pixel used for detecting a blue color, and
the control unit inserts the filter between the lens and the imaging element in the second state and removes the filter from between the lens and the imaging element in a state different from the second state.

(12)
The imaging apparatus according to (10) or (11),
in which the exposure period of the first pixel is shorter than the exposure period of the second pixel in the second state.

(13)
The imaging apparatus according to any one of (9) to (12),
in which the control unit controls to continuously emit the infrared light in a third state being one of a state in which the surrounding brightness is below the first threshold or a state in which the surrounding brightness is the first threshold or above and below the second threshold and the ambient infrared light intensity is the third threshold or above.

(14)

The imaging apparatus according to (13), further including an image processing unit that generates a monochrome image, in the third state, on the basis of the first pixel signal from the first pixel and the second pixel signal from the second pixel, and generates a color image, in a state different from the third state, on the basis of the first pixel signal and the second pixel signal.

(15)

The imaging apparatus according to (13) or (14), in which the exposure periods of the first pixel and the second pixel are matched with each other in the third state.

(16)

An imaging control method including:

an exposure control step of controlling to provide an exposure period of a first pixel and a second pixel of an imaging element in each of frame periods and provide a single exposure period being a period in which the first pixel alone is exposed; and an emission control step of controlling an infrared light emission unit so as to emit infrared light within the single exposure period.

(17)

A program causes a computer to execute processing including:

an exposure control step of controlling to provide an exposure period of a first pixel and a second pixel of an imaging element in each of frame periods and provide a single exposure period being a period in which the first pixel alone is exposed; and an emission control step of controlling an infrared light emission unit so as to emit infrared light within the single exposure period.

REFERENCE SIGNS LIST

100 Imaging apparatus
101 Photometry unit
102 Control unit
103 Infrared light emission unit
104 Imaging lens
105 Optical filter
106 Imaging element
107 Image processing unit
121 Bayer conversion unit
122 Signal processing unit
201 Row scanning circuit
202 Pixel array unit
203 Timing control circuit
205 Column scanning circuit
211 Pixel
301 RGBW interpolation filter
302 W interpolation filter
303 Infrared ray separation unit
305 Ratio calculation unit
306 Luminance/chrominance adjustment unit
307 High frequency component extraction unit
308 High frequency component restoration unit
309 Bayer image signal output unit
351 YC conversion unit
353 chrominance signal correction unit
354 Luminance signal combining unit
355 RGB conversion unit
401 Chroma gain control unit
451 Combining ratio control unit
700 Imaging apparatus
701 Ambient light sensor
702 Control unit
703 IR cut-off filter
704 Imaging element
705 Image processing unit
721 Bayer conversion unit
801 Low frequency RGB interpolation filter
802 High frequency G interpolation filter
803 chrominance adjustment unit
804 High frequency component extraction unit
805 High frequency component restoration unit
851 RGB conversion unit
900 Imaging apparatus
1001 Luminance/chrominance adjustment unit
1011 Luminance signal generation unit
1012 Luminance signal correction unit

The invention claimed is:

1. An imaging apparatus, comprising:
an infrared light emission unit configured to emit infrared light;
an imaging element including a first pixel and a second pixel; and
a control unit configured to:
control a first exposure period of the imaging element;
control an emission period of the infrared light, wherein
the first exposure period of the imaging element and the emission period of the infrared light are controlled based on surrounding brightness and ambient infrared light intensity, and
the ambient infrared light intensity corresponds to an intensity of the infrared light present in ambient light;
control a second exposure period of the first pixel and a third exposure period of the second pixel in each frame period of a plurality of frame periods;
control a single exposure period in which the first pixel is exposed; and
emit the infrared light within the single exposure period.

2. The imaging apparatus according to claim 1, further comprising an image processing unit configured to:
generate luminance information based on a first pixel signal from the first pixel; and
generate color information based on a second pixel signal from the second pixel.

3. The imaging apparatus according to claim 2, wherein the image processing unit is further configured to:
generate high frequency luminance information based on the first pixel signal; and
generate the color information and low frequency luminance information based on the second pixel signal.

4. The imaging apparatus according to claim 1, wherein the first pixel includes a white pixel, and
the second pixel includes a color pixel utilized for detection of a specific color.

5. The imaging apparatus according to claim 1, wherein the first pixel includes an IR pixel utilized for detection of the infrared light, and
the second pixel includes a color pixel utilized for detection of a specific color.

6. The imaging apparatus according to claim 1, wherein the first pixel includes a first G pixel utilized for detection of a green color, and
the second pixel includes one of a R pixel utilized for detection of a red color, a second G pixel, or a B pixel utilized for detection of a blue color.

7. The imaging apparatus according to claim 1, wherein the second exposure period of the first pixel is longer than the third exposure period of the second pixel.

8. The imaging apparatus according to claim 1, wherein the control unit is further configured to:
in a first state in which the surrounding brightness is one of equal to or greater than a first threshold value and below a second threshold value, and the ambient infrared light intensity is below a third threshold value:
control the second exposure period of the first pixel and the third exposure period of the second pixel for each frame period of the plurality of frame periods,
control the single exposure period in which the first pixel is exposed, and
emit the infrared light within the single exposure period.

9. The imaging apparatus according to claim 8, wherein the control unit is further configured to suppress emission of the infrared light in a second state in which the surrounding brightness is one of equal to or greater than the second threshold value.

10. The imaging apparatus according to claim 9, further comprising:
a lens; and
a filter, insertable and removable, at a portion between the lens and the imaging element, wherein
the filter is configured to attenuate an infrared light component,
the first pixel includes a first G pixel utilized for detection of a green color,
the second pixel includes one of a R pixel utilized for detection of a red color, a second G pixel, or a B pixel utilized for detection of a blue color, and
the control unit is further configured to:
insert the filter between the lens and the imaging element in the second state; and
remove the filter from between the lens and the imaging element in a third state different from the second state.

11. The imaging apparatus according to claim 9, wherein the second exposure period of the first pixel is shorter than the third exposure period of the second pixel in the second state.

12. The imaging apparatus according to claim 8, wherein the control unit is further configured to control continuous emission of the infrared light in a second state, and the second state corresponds to one of:
a third state in which the surrounding brightness is below the first threshold value, or
a fourth state in which the surrounding brightness is one of equal to or greater than the first threshold value and below the second threshold value, and the ambient infrared light intensity is one of equal to or greater than the third threshold value.

13. The imaging apparatus according to claim 12, further comprising an image processing unit configured to:
generate a monochrome image based on a first pixel signal from the first pixel and a second pixel signal from the second pixel in the second state, and
generate a color image based on the first pixel signal and the second pixel signal in a fifth state, wherein the third state is different from the fifth state.

14. The imaging apparatus according to claim 12, wherein the second exposure period of the first pixel is same as the third exposure period of the second pixel in the third state.

15. An imaging control method, comprising:
controlling a first exposure period of an imaging element;
controlling an emission period of infrared light from an infrared light emission unit, wherein
the first exposure period of the imaging element and the emission period of the infrared light are controlled based on surrounding brightness and ambient infrared light intensity, and
the ambient infrared light intensity corresponds to an intensity of the infrared light present in ambient light;
controlling a second exposure period of a first pixel and a third exposure period of a second pixel of the imaging element in each frame period of a plurality of frame periods;
controlling a single exposure period in which the first pixel is exposed; and
controlling, by the infrared light emission unit, emission of infrared light within the single exposure period.

16. A non-transitory computer-readable medium having stored thereon computer-executable instructions which, when executed by a processor, cause the processor to execute operations, the operations comprising:
controlling a first exposure period of an imaging element;
controlling an emission period of infrared light, wherein
the first exposure period of the imaging element and the emission period of the infrared light is controlled based on surrounding brightness and ambient infrared light intensity, and
the ambient infrared light intensity corresponds to an intensity of the infrared light present in ambient light;
controlling a second exposure period of a first pixel and a third exposure period of a second pixel of the imaging element in each frame period of a plurality of frame periods;
controlling a single exposure period in which the first pixel is exposed; and
controlling emission of the infrared light within the single exposure period.

17. An imaging apparatus, comprising:
an infrared light emission unit configured to emit infrared light;
an imaging element including a first pixel and a second pixel;
a control unit configured to:
control a first exposure period of the imaging element;
control an emission period of the infrared light;
control a second exposure period of the first pixel and a third exposure period of the second pixel in each frame period of a plurality of frame periods;
control a single exposure period in which the first pixel is exposed; and
emit the infrared light within the single exposure period; and
an image processing unit configured to:
generate high frequency luminance information based on a first pixel signal from the first pixel; and
generate color information and low frequency luminance information based on a second pixel signal from the second pixel.

* * * * *